(12) United States Patent
Li et al.

(10) Patent No.: US 12,177,028 B2
(45) Date of Patent: Dec. 24, 2024

(54) HARQ-ACK TRANSMISSION AND RETRANSMISSION IN WIRELESS COMMUNICATION SYSTEM

(71) Applicant: Apple Inc., Cupertino, CA (US)

(72) Inventors: Yingyang Li, Cupertino, CA (US); Yongjun Kwak, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 300 days.

(21) Appl. No.: 17/441,476

(22) PCT Filed: Jun. 19, 2020

(86) PCT No.: PCT/US2020/038798
§ 371 (c)(1),
(2) Date: Sep. 21, 2021

(87) PCT Pub. No.: WO2020/257692
PCT Pub. Date: Dec. 24, 2020

(65) Prior Publication Data
US 2022/0416953 A1 Dec. 29, 2022

Related U.S. Application Data

(60) Provisional application No. 62/864,291, filed on Jun. 20, 2019.

(51) Int. Cl.
*H04L 1/18* (2023.01)
*H04L 1/1829* (2023.01)
(Continued)

(52) U.S. Cl.
CPC .......... *H04L 1/1854* (2013.01); *H04L 1/1861* (2013.01); *H04L 1/1896* (2013.01); *H04W 72/23* (2023.01); *H04L 1/1812* (2013.01)

(58) Field of Classification Search
None
See application file for complete search history.

(56) References Cited

U.S. PATENT DOCUMENTS

2020/0067651 A1* 2/2020 Takeda ................. H04L 1/1812
2020/0358487 A1* 11/2020 Yang .................... H04L 1/1819
(Continued)

FOREIGN PATENT DOCUMENTS

CN 107005509 8/2017

OTHER PUBLICATIONS

[No Author Listed], "3rd Generation Partnership Project; Technical Specification Group Radio Access Network; Study on NR-based Access to Unlicensed Spectrum; (Release 16)," 3GPP TR 38.889 V1.1.0, Dec. 2018, 119 pages.
(Continued)

Primary Examiner — Scott M Sciacca
(74) Attorney, Agent, or Firm — Fish & Richardson P.C.

(57) ABSTRACT

Methods, systems, and computer programs for enhancing HARQ-ACK timing procedure. In one aspect, a method can include encoding, by a next generation NodeB (gNB), one or more sets of physical downlink shared channels (PDSCHs) with respect to a listen before talk (LBT) operation on an unlicensed spectrum, transmitting, by the gNB, the encoded one or more sets of PDSCHs to the UE, and determining, by the gNB, scheduling for receiving a HARQ-ACK from the UE corresponding to the one or more sets of PDSCHs based on the LBT operation.

20 Claims, 28 Drawing Sheets

(51) Int. Cl.
  *H04L 1/1867* (2023.01)
  *H04W 72/04* (2023.01)
  *H04W 72/23* (2023.01)
  *H04L 1/1812* (2023.01)

(56) References Cited

U.S. PATENT DOCUMENTS

2022/0225390 A1\* 7/2022 Harada ................ H04W 72/23
2022/0294573 A1\* 9/2022 Lei ........................ H04L 1/1621

OTHER PUBLICATIONS

Intel Corporation, "Enhancements to HARQ for NR-unlicensed," 3GPP TSG RAN WG1 Meeting #97, R1-1906787, Reno, USA, May 13-17, 2019, 13 pages.
InterDigital, Inc., "Enhanced HARQ procedures for NR-U," 3GPP TSG RAN WG1 #97, R1-1906764, Reno, USA, Mary 13-17, 2019, 3 pages.
International Preliminary Report on Patentability in International Appln. No. PCT/US2020/038798, Dec. 30, 2021, 11 pages.
International Search Report and Written Opinion in International Appln. No. PCT/US2020/038798, dated Oct. 23, 2020, 17 pages.
Qualcomm Inc., "New WID on NR-based Access to Unlicensed Spectrum," 3GPP TSG RAN Meeting #82, RP-182878, Sorrento, Italy, Dec. 10-13, 2018, 7 pages.
Samsung, "HARQ enhancements for NR-U," 3GPP TSG RAN WG1 #97, R1-1906922, Reno, USA, May 13-17, 2019, 7 pages.

\* cited by examiner

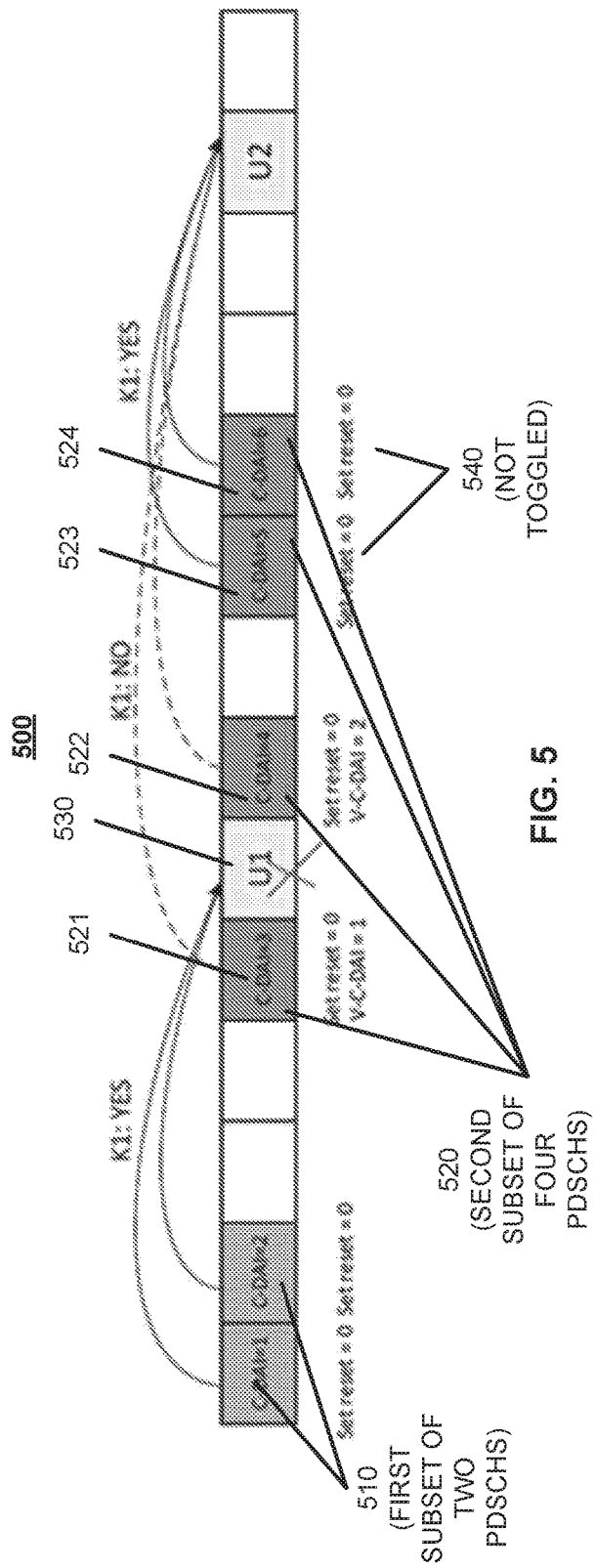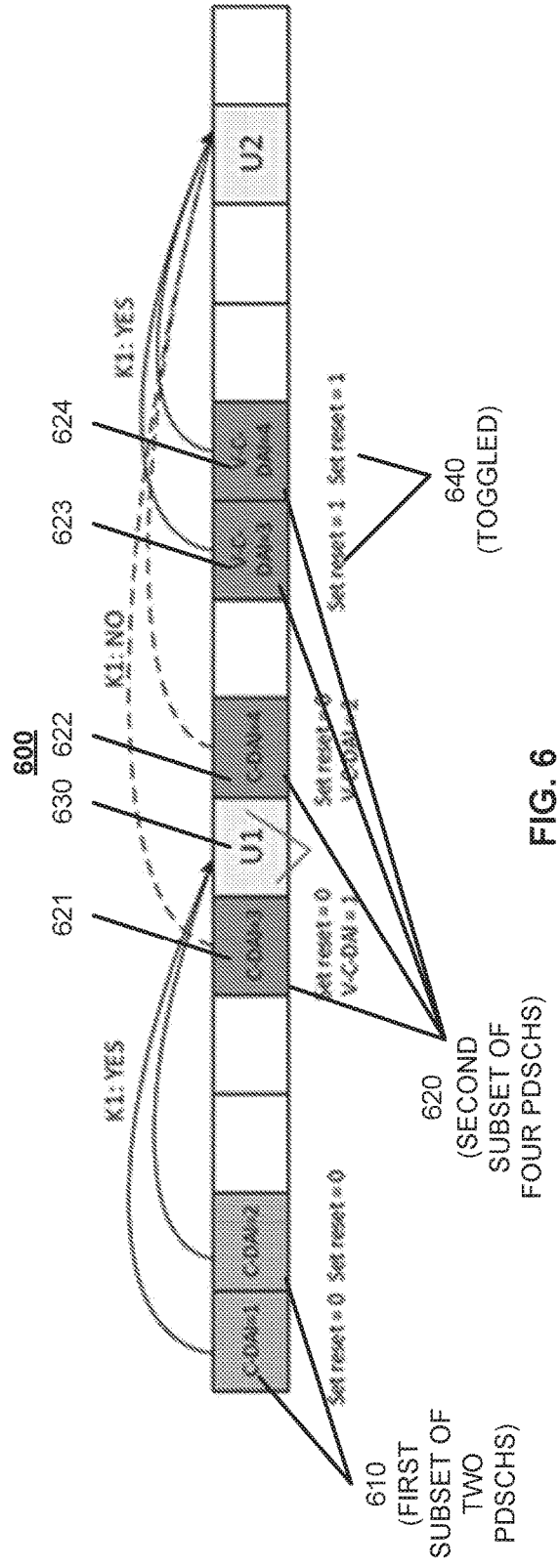

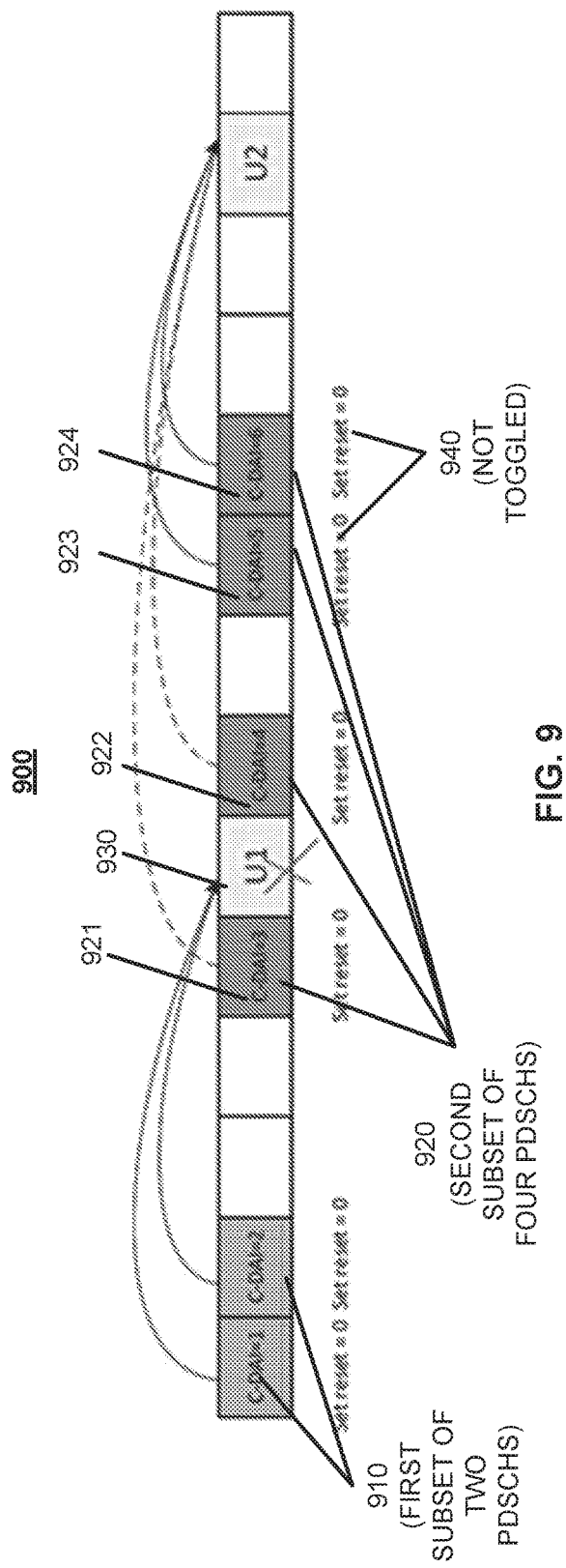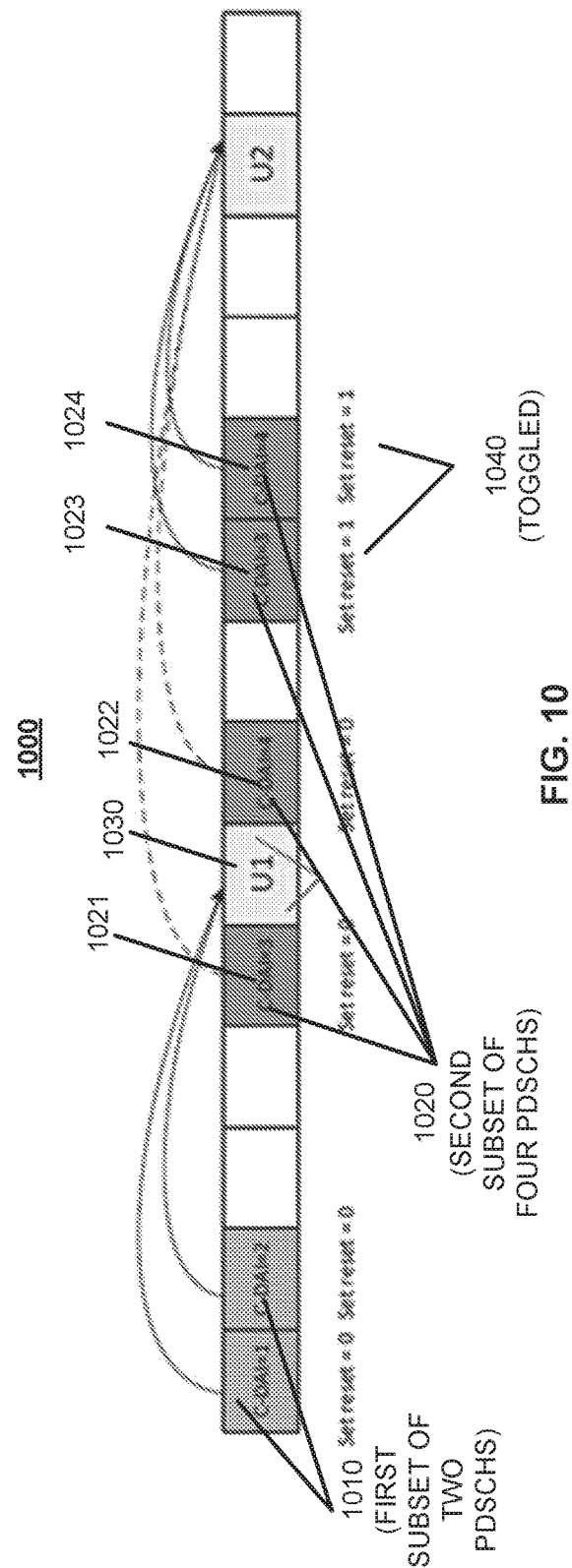

HARQ-ACK TRANSMISSION AND RETRANSMISSION IN WIRELESS COMMUNICATION SYSTEM

CLAIM OF PRIORITY

The present application is a U.S. National Phase application under 35 U.S.C. § 371 of International Patent Application No. PCT/US2020/038798, filed on Jun. 19, 2020, which claims the benefit of U.S. Provisional Patent Application No. 62/864,291 filed Jun. 20, 2019, the disclosures of each of which are incorporated herein by reference in their entirety.

BACKGROUND

Each year, the number of mobile devices connected to wireless communication networks significantly increases. In order to keep up with the demand in mobile data traffic, necessary changes have to be made to system requirements to be able to meet these demands. Three critical areas that need to be enhanced in order to deliver this increase in traffic are larger bandwidth, lower latency, and higher data rates.

SUMMARY

A major limiting factor in wireless innovation is the availability in spectrum. To mitigate this, the unlicensed spectrum has been an area of interest to expand the availability of wireless networks such as LTE networks. "In this context, one of the major enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

Now that the main building blocks for the framework of NR networks have been established, a natural enhancement is to allow mobile devices using the NR networks to also operate on unlicensed spectrum. The work to introduce shared/unlicensed spectrum in 5G NR has already been kicked off, and a new work item on "NR-Based Access to Unlicensed Spectrum" was approved in TSG RAN Meeting #82.

An objective of this work includes a specification of HARQ operation. NR HARQ feedback mechanisms are the baseline for NR-U operation with extensions in line with agreements during the study phase (NR-U TR section 7.2.1.3.3), including immediate transmission of HARQ ACKs/NACKs for the corresponding data in the same channel occupancy time (COT) as well as transmission of HARQ ACKs/NACKs in a subsequent COT.

One of the challenges in this case is that this system must maintain fair coexistence with other incumbent technologies, and in order to do so, some restriction may need to be taken into account when designing this system, depending on the particular band in which it may operate on. For example, if operating in the 5 GHz band, a listen before talk (LBT) procedure needs to be performed to acquire the medium before a transmission can occur. For this reason, the HARQ feedback mechanism, which is tight to specific timing and operation when operating NR in licensed band must be enhanced and modified to accommodate for this constrain when performing transmission on an unlicensed band. In order to overcome this issue, the present disclosure provides details on how to enhance the scheduling procedure and HARQ timing procedure of NR in order to allow for an efficient way to facilitate mobile device operation in the unlicensed spectrum.

In a NR system operating on unlicensed spectrum, since a transmission is conditional to the success of the LBT procedure, the NR HARQ feedback mechanism is no longer applicable. Motivated by this, this disclosure provides details on how to enhance the HARQ timing procedure of NR in order to allow an efficient way to operate in unlicensed spectrum.

According to one innovative aspect of the present disclosure, a method for enhancing a HARQ-ACK timing procedure is disclosed. In one aspect, the method can include actions of assigning, by an access node, a set index to a set of PDSCHs, determining, by the access node, a first HARQ-ACK for the set of PDSCHs associated with the set index, determining, by the access node, whether a second HARQ-ACK for a different set of PDSCHs is to be transmitted, and based on determining, by the access node, that a HARQ-ACK for the different set of PDSCHs is to be transmitted, transmitting, by the access node, scheduling data to the user equipment (UE) that, when processed by the UE, causes the UE to schedule transmission of the first HARQ-ACK and the second HARQ-ACK.

Other versions include corresponding systems, apparatus, and computer programs to perform the actions of methods defined by instructions encoded on computer readable storage devices.

These and other versions may optionally include one or more of the following features. For instance, in some implementations, the scheduling data is downlink control information (DCI), and the DCI can include data representing the set index and a previous set index, a C-DAI that is incremented based on a last DCI of the previous set index, and a T-DAI that indicates a total number of DCIs in the set index and the previous set.

In some implementations, the set of PDSCHs can include PDSCHs with allocated PUCCH resource for a first time, PDSCHs that were never assigned a PUCCH resource, or PDSCHs already assigned a PUCCH resource at an earlier time but failed in trigger successful HARQ-ACK transmission.

In some implementations, the scheduling data is one or more DCIs, and a first DCI of the DCIs triggers HARQ-ACK transmission for one or multiple sets of PDSCHs and a different DCI of the DCIs (i) triggers HARQ-ACK transmission for one set of PDSCHs or (ii) triggers HARQ-ACK transmission for all sets of PDSCHs.

In some implementations, the scheduling data is one or more DCIs, and one particular DCI of the DCIs includes data representing the set index and a reset indicator, a C-DAI that is incremented across each DCI with the set index with reset indicator not toggled. In such implementations, the reset indicator of the particular DCI can be toggled and the particular DCI has C-DAI equal to 1 and a T-DAI indicating the total number of DCIs associated with the same set index and having a reset indicator not toggled.

In some implementations, the scheduling data is a DCI, a PUSCH is scheduled to a UE by a DCI. In such implementations, the (i) HARQ-ACK transmission by the UE on PUSCH can be triggered by the DCI or (ii) HARQ-ACK transmission by the UE on PUSCH is triggered if the PUSCH is overlapped with a PUCCH for HARQ-ACK transmission.

In some implementations, one bit can be added in a DCI to indicate reporting the HARQ-ACK for earlier PDSCHs and T-DAI is reinterpreted to indicate the set index of the set of PDSCHs.

In some implementations, one bit can be added in a DCI to indicate whether to report HARQ-ACK for a latest PDSCH of a HARQ process whose HARQ-ACK is expected to transmit in a previous PUCCH for the first time HARQ-ACK feedback.

In some implementations, one bit can be added in a DCI to indicate whether a previous PUCCH carrying HARQ-ACK was correctly received by the access node.

In some implementations, a number of PDSCHs counted by one or more C-DAI/T-DAI is based on whether access node processing time between a previous PUCCH and the current DCIs scheduling PDSCHs having a HARQ-ACK on a current PUCCH falls below a predetermined threshold level of processing time.

In some implementations, a reset indicator, in a DCI scheduling the set of PDSCHs, is used to determine HARQ-ACK transmission of the set of PDSCHs.

In some implementations, for a semi-static HARQ-ACK transmission, receiving, by the access node, an ACK transmitted by the UE for a HARQ process only one time.

In some implementations, for semi-static HARQ-ACK transmission: determining, by the access node, whether HARQ-ACK was correctly received; and based on determining, by the access node, that the HARQ-ACK was not correctly received, updating a triggering DCI to include a most recently assigned value of NDI for a HARQ process.

In some implementations, for semi-static HARQ-ACK transmission: determining, by the access node, whether HARQ-ACK was correctly received, and based on determining, by the access node, that the HARQ-ACK was correctly received, updating a triggering DCI to include a toggled NDI for the HARQ process.

In some implementations, the access node is a next generation NodeB (gNB).

According to another innovative aspect of the present disclosure, a method for enhancing a hybrid automatic repeat request (HARQ) acknowledgment (ACK) timing procedure executed by user equipment (UE) in a wireless network including a next generation NodeB (gNB) and the UE is disclosed. In one aspect, the method can include actions of receiving, by the UE, one or more sets of physical downlink shared channels (PDSCHs) using unlicensed spectrum of the wireless network, and determining, by the UE, to cause transmission of a HARQ-ACK or a retransmission of a HARQ-ACK corresponding to the one or more sets of PDSCHs based on a listen before talk (LBT) operation.

Other versions include corresponding systems, apparatus, and computer programs to perform the actions of methods defined by instructions encoded on computer readable storage devices.

These and other versions may optionally include one or more of the following features. For instance, in some implementations, the unlicensed spectrum includes unlicensed spectrum via Licensed-Assisted Access (LAA) or unlicensed spectrum via carrier aggregation (CA).

In some implementations, the transmission of the HARQ-ACK or the retransmission of the HARQ-ACK is based on a dynamic HARQ-ACK codebook or a semi-static HARQ-ACK codebook.

In some implementations, a set index was assigned to the one or more sets of PDSCHs by an access node, and wherein the transmission of the HARQ-ACK or the retransmission of the HARQ-ACK is based on the set of PDSCHs with a corresponding set index.

In some implementations, the one or more sets of PDSCHs include a current set of PDSCH and one or more previous sets of PDSCH.

In some implementations, a downlink control information (DCI) includes data representing a current set index and a previous set index, a C-DAI that is incremented based on a last DCI of the previous set, and a T-DAI that indicates a total number of DCIs in the previous set and the current set.

In some implementations, a DCI includes data representing the set index and a reset indicator, a C-DAI that is incremented across each DCI with the set index with reset indicator not toggled. In such implementations, the reset indicator of the particular DCI is toggled and the particular DCI has C-DAI equal to 1 and a T-DAI indicating the total number of DCIs associated with the same set index and having a reset indicator not toggled.

In some implementations, one bit can be included in a DCI to indicate reporting the HARQ-ACK for earlier PDSCHs. In such implementation, a T-DAI can be reinterpreted to indicate the set index of the set of PDSCHs.

In some implementations, determining, by the UE, to cause transmission of the HARQ ACK or a retransmission of a HARQ-ACK corresponding to the one or more sets of PDSCHs can include receiving, by the UE, a normal DCI to trigger HARQ-ACK transmission for one or more of the sets of PDSCHs, or receiving, by the UE, a fallback DCI to trigger HARQ-ACK transmission for one of the sets of PDSCHs.

In some implementations, determining, by the UE, to cause transmission of the HARQ ACK or a retransmission of a HARQ-ACK corresponding to the one or more sets of PDSCHs can include receiving, by the UE, a first DCI to trigger HARQ-ACK transmission for one or more of the sets of PDSCHs, and receiving, by the UE, a different DCI to trigger HARQ-ACK transmission for another one of the sets of PDSCHs.

In some implementations, receiving, by UE, a DCI to schedule a PUSCH, wherein the HARQ-ACK transmission or the HARQ-ACK retransmission on the PUSCH can include determining, by the UE, whether one-shot HARQ-ACK feedback is indicated by the DCI, and based on determining that the one-shot HARQ-ACK feedback is indicated by the DCI, transmitting, by the UE, HARQ-ACKs for each associated HARQ processes.

In some implementations, receiving, by UE, a DCI to schedule a PUSCH, wherein the HARQ-ACK transmission or the HARQ-ACK retransmission on the PUSCH can include determining, by the UE, whether one-shot HARQ-ACK feedback is indicated by the DCI, and based on determining that the one-shot HARQ-ACK feedback is not indicated by the DCI, transmitting, by the UE, HARQ-ACKs on the PUSCH only if the PUSCH is overlapped with a PUCCH for HARQ-ACK.

In some implementations, receiving, by the UE, a DCI to schedule a PUSCH, wherein the HARQ-ACK transmission or the HARQ-ACK retransmission on the PUSCH is determined according to one of the following: HARQ-ACK transmission on PUSCH is triggered by the DCI, or HARQ-ACK transmission on PUSCH is triggered if the PUSCH is overlapped with a PUCCH for HARQ-ACK transmission.

Accordingly to another innovative aspect of the present disclosure, a method for enhancing a hybrid automatic repeat request (HARQ) acknowledgment (ACK) timing procedure executed by a next generation NodeB (gNB) in a wireless network including the gNB and a user equipment (UE) is disclose. In one aspect, a method can include encoding, by the gNB, one or more sets of physical downlink shared channels (PDSCHs) with respect to a listen before talk (LBT) operation on an unlicensed spectrum, transmitting, by the gNB, the encoded one or more sets of PDSCHs to the UE, and determining, by the gNB, scheduling for receiving a HARQ-ACK from the UE corresponding to the one or more sets of PDSCHs based on the LBT operation.

Other versions include corresponding systems, apparatus, and computer programs to perform the actions of methods defined by instructions encoded on computer readable storage devices.

These and other versions may optionally include one or more of the following features. For instance, in some implementations, the unlicensed spectrum includes unlicensed spectrum via Licensed-Assisted Access (LAA) or unlicensed spectrum via carrier aggregation (CA).

In some implementations, the method can further include receiving, by the gNB, transmission of a HARQ-ACK or receiving a retransmission of a HARQ-ACK, wherein the HARQ-ACK was transmitted or retransmitted based on a dynamic HARQ-ACK codebook or a semi-static HARQ-ACK codebook.

In some implementations, receipt of the transmission of the HARQ-ACK or receipt of the retransmission of the HARQ-ACK from the UE occurs in response to the receipt of the one or more transmitted sets of PDSCHs.

In some implementations, the method can include initiating, by the gNB, the LBT operation, and determining, by the gNB, a shared channel occupancy time (COT) for the LBT operation.

In some implementations, the method can include assigning, by the gNB, a set index to the one or more sets of PDSCHs. In such implementations, the HARQ-ACK for transmission by the UE is determined, by the UE, based on the set of PDSCHs with a corresponding set index received by the UE.

In some implementations, the one or more sets of PDSCHs include a current set of PDSCH and a previous sets of PDSCH.

In some implementations, a downlink control information (DCI) indicates a current set index and a previous set index, a C-DAI is incremented based on a last DCI of the previous set, and a T-DAI indicates a total number of DCIs until now in the previous set and the current set.

In some implementations, the method can further include encoding, by the gNB, for transmission to the UE: a first DCI configured to trigger HARQ-ACK transmission for one or more of the sets of PDSCHs or a second DCI configured to trigger HARQ-ACK transmission for one of the sets of PDSCHs.

In some implementations, encoding, by the gNB, for transmission to the UE: a first DCI configured to trigger HARQ-ACK transmission for one or more of the sets of PDSCHs, and a second DCI configured to trigger HARQ-ACK transmission for one of the sets of PDSCHs.

In some implementations, encoding, by the gNB for transmission to the UE, a DCI configured to schedule a PUSCH, wherein the scheduling for the HARQ-ACK on the PUSCH can include assigning data to the DCI that causes the UE to use one-shot HARQ-ACK feedback for each associated HARQ processes.

In some implementations encoding, by the gNB for transmission to the UE, a DCI configured to schedule a PUSCH, wherein the scheduling for the HARQ-ACK on the PUSCH comprises: assigning data to the DCI that causes the UE to transmit HARQ-ACKs on PUSCH only if the PUSCH is overlapped with a PUCCH for HARQ-ACK.

In some implementations, encoding, by the gNB for transmission to the UE, a DCI configured to schedule a PUSCH, wherein the scheduling for the HARQ-ACK on the PUSCH comprises one of: instruct the UE to perform HARQ-ACK transmission on PUSCH that is triggered by the DCI, or instruct the UE to perform HARQ-ACK transmission on PUSCH that is triggered only if the PUSCH is overlapped with a PUCCH for HARQ-ACK transmission.

These and other aspects of the present disclosure are discussed in more detail in the detailed description below with reference to the accompanying drawings.

BRIEF DESCRIPTION OF THE DRAWINGS

FIG. 5 depicts an illustration representing an example of a HARQ-ACK transmission for a set of PDSCHs.

FIG. 6 depicts an illustration representing an example of a HARQ-ACK transmission for a set of PDSCHs.

FIG. 9 depicts an illustration representing another example of HARQ-ACK transmission for a set of PDSCHs.

FIG. 10 depicts an illustration representing another example of HARQ-ACK transmission for a set of PDSCHs.

DETAILED DESCRIPTION

Figure 1:
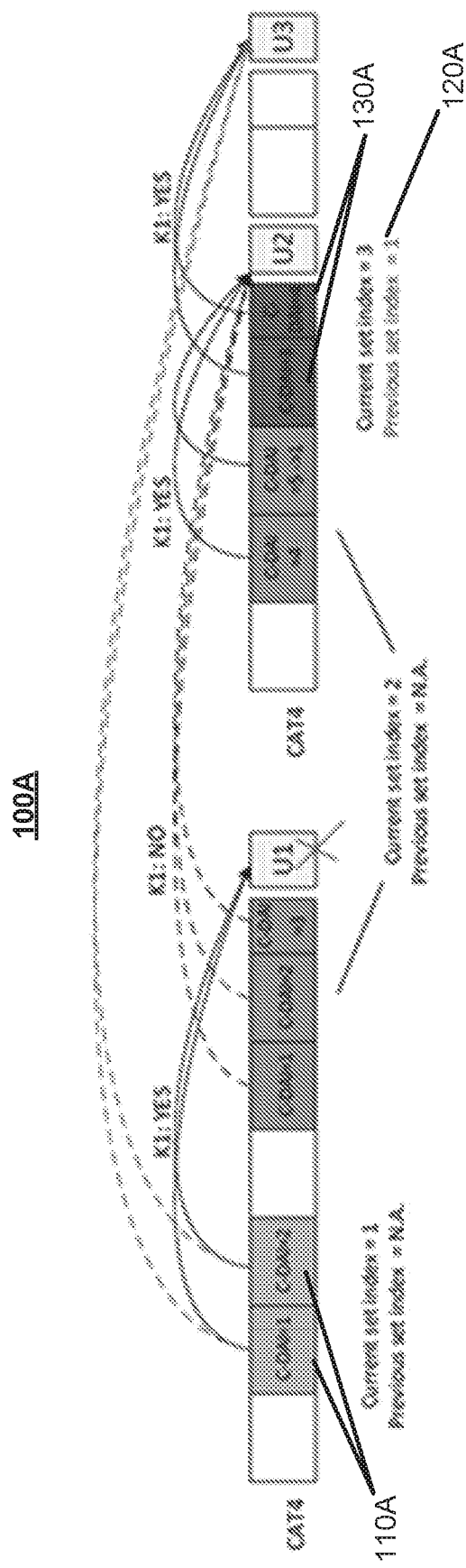
FIG. 1A depicts an illustration representing an example of a HARQ-ACK codebook based on current set index and previous set index.
FIG. 1B depicts an illustration representing an example of a HARQ-ACK codebook with undefined K1 values.

In NR Rel-15, both dynamic HARQ-ACK codebook and semi-static HARQ-ACK codebook are supported. However, using the present disclosure, these two schemes can be enhanced by taking into account the effects of missing PUCCH transmission at UE and/or PUCCH decoding error at gNB. Consequently, the enhanced schemes can better support the operation for NR unlicensed (NR-U).

In a PUCCH transmission timing, the UE may fail to pass LBT hence there is no way to actually transmit the PUCCH carrying a set of HARQ-ACK. To avoid enforcing gNB to retransmit all the PDSCHs corresponding to the set of HARQ-ACK, it needs to support transmission of the set of HARQ-ACK at a later time.

For a PUCCH transmission from UE, due to the potential hidden nodes or other factors, it is possible gNB cannot correctly decode the PUCCH. For example, a gNB may not have information available that indicates the success/failure status of the related PDSCHs. To avoid enforcing gNB to retransmit all the PDSCHs corresponding to the set of HARQ-ACK, it needs to support transmission of the set of HARQ-ACK at a later time.

Dynamic HARQ-ACK Transmission

In dynamic HARQ-ACK codebook, e.g. type 2 HARQ-ACK codebook in NR Rel-15, counter downlink assignment index (C-DAI) is used to sort the HARQ-ACK bits, and total DAI (T-DAI) is used to derive the codebook size. In case a set of HARQ-ACKs fails for transmission, one issue is how to make sure gNB and UE has the same understanding on the missing of this set of HARQ-ACKs, otherwise, gNB and UE may not have same understanding a HARQ-ACK codebook size when the set of HARQ-ACKs is transmitted or retransmitted in a future time possibly together with other old or new HARQ-ACK bits. One more issue is how to deal with C-DAI and T-DAI when the set of HARQ-ACK is transmitted or retransmitted in a future time possibly together with other old or new HARQ-ACK bits.

In one implementation, a set index is assigned to a set of PDSCHs. gNB can assign a different set index for different set of PDSCHs scheduled at a different time. For example, a set of PDSCHs have the same set index if the initial HARQ-ACK transmission of them uses the same PUCCH channel. gNB can trigger HARQ-ACK transmission for a current set of PDSCH and if needed a previous set of PDSCH. When a PDSCH is scheduled by a DCI, the DCI will include all or part of the following information, by dedicated field(s) or jointly interpreted with other information. For example, in some implementations, the DCI can include data or information representing all or a part of the following information:

An indication for the current set of PDSCHs, e.g. a current set index;

An indication to a previous set of PDSCH whose HARQ-ACK needs to be transmitted or retransmitted together with the current set of PDSCHs, e.g. a previous set index;

C-DAI: if above previous set index indicates a valid previous set, C-DAI will be incremented based on the last DCI of the previous set, so that C-DAI of both previous set and current set can be continuous; otherwise, C-DAI starts from value 1;

T-DAI: if above previous set index indicate a valid previous set, T-DAI will indicate the total number of DCIs until now in the previous set and the current set; otherwise, T-DAI only indicates the total number of DCIs until now in the current set.

As illustrated by case 100A in FIG. 1A, a first set of PDSCH 110A with C-DAI=1 and 2 with current set index=1 fails in HARQ-ACK transmission in PUCCH resource U1. After knowing this case, gNB decides to retransmit it together with a new set of PDSCH with current set index=3 by setting previous set index=1 120A. C-DAI of the new set will be counted as 3 and 4 130A, which follows the 2 PDSCHs from previous set 1.

In one implementation, in a DCI scheduling a PDSCH, if there is no information on PDSCH-to-HARQ-ACK timing (K1), the current set index still indicates a valid set index. HARQ-ACK for the set of PDSCH without valid PDSCH-to-HARQ-ACK timing will be transmitted together with a set of PDSCHs with valid PDSCH-to-HARQ-ACK timing with the same current set index. PDSCH-to-HARQ-ACK timing and PUCCH resource for the HARQ-ACK transmission is indicated by the DCI scheduling a PDSCH with valid PDSCH-to-HARQ-ACK timing for the same set of PDSCHs. C-DAI and T-DAI will count PDSCHs with the same current set index continuously, possibly together with a previous set of PDSCHs which is transmitted in the previous channel Occupancy Time (COT). Within a same set of PDSCHs, a PDSCH without valid PDSCH-to-HARQ-ACK timing can be scheduled only earlier than a PDSCH with valid PDSCH-to-HARQ-ACK timing. Alternatively, within a same set of PDSCHs, a PDSCH without valid PDSCH-to-HARQ-ACK timing can be scheduled earlier than, later than or at the same timing with a PDSCH with valid PDSCH-to-HARQ-ACK timing. For example, for a UE configured with carrier aggregation, a PDSCH with valid PDSCH-to-HARQ-ACK timing is scheduled on a carrier, while another PDSCH in the same timing can be scheduled without valid PDSCH-to-HARQ-ACK timing in another carrier.

FIG. 1B illustrates the case 100B that a PDSCH without valid PDSCH-to-HARQ-ACK timing is scheduled later than the PDSCH with valid PDSCH-to-HARQ-ACK timing. This case can be used when the K1 value is not applicable when the PDSCH is scheduled.

In another implementation, a set index is assigned to a set of PDSCHs. HARQ-ACK is determined for the set of PDSCHs with same set index. The set of PDSCHs include all PDSCHs with same set index whose HARQ-ACK are not successfully transmitted yet, unless some other criteria for dropping HARQ-ACK for a PDSCH is satisfied. There can be multiple sets of PDSCHs with different set indexes, e.g. a 2-bit set index can support up to 4 set of PDSCHs, where the size of the set indexes can be configured by RRC (either by UE-specific manner or by cell-specific manner) or fixed in the specification. A set of PDSCHs may include multiple subsets of PDSCHs. Herein, a subset of PDSCHs may be allocated a PUCCH resource for the first time, or may never be assigned a PUCCH resource yet, or may be already assigned a PUCCH resource in earlier time for one or more times but failed in HARQ-ACK transmission due to LBT failure and/or gNB detection error. There can be no limitations on the time resources of the different sets of PDSCHs. The different set of PDSCHs can be mapped different time window not overlapped. The subset of PDSCHs from different set of PDSCHs can be mapped different time window not overlapped, while the subsets of PDSCHs from different set of PDSCHs can be interleaved. Alternatively, the PDSCHs from different sets of PDSCHs can be interleaved.

Preferably, a subset of a set of PDSCHs can include the PDSCHs whose HARQ-ACKs are expected to transmit on the same PUCCH resource for the first time HARQ-ACK feedback. As shown case 200 in FIG. 2, the PDSCHs 210 with C-DAI equals to 1, 2, 3 can be considered as in the same subset as PDSCHs 212 with C-DAI equals to 4, 5. Value 5 is indicated as value 1 if modulo 4 operation is done. Preferably, there is enough gNB processing time between a PUCCH resource for a subset and a DCI scheduling PDSCH in a followed subset. However, the exact timing between different subsets and the related PUCCHs is not limited in this disclosure and can be up to gNB implementation.

The following information can be indicated to derive the HARQ-ACKs for a set of PDSCHs to be transmitted on a currently indicated PUCCH. Such information can include, for example:
An indication for a set of PDSCHs, e.g. a set index (SI), HARQ-ACK for all PDSCHs scheduled by DCI with same set index (not reset yet, e.g. reset indicator is not toggled) should be reported at currently indicated PUCCH resource;
An indication to reset the set of PDSCHs, e.g. reset indicator (RI) for the set of PDSCHs. RI can operate in a toggle or not toggle manner like new data indicator (NDI) field. Once RI is toggled. HARQ-ACK for all earlier PDSCHs with RI not toggled are omitted in HARQ-ACK transmission. That is, if a PDSCH X and all following PDSCH(s) in the set of PDSCHs are scheduled with DCIs indicating same RI as the RI for the set of PDSCHs, the reported HARQ-ACK codebook includes HARQ-ACK for the PDSCH X;
C-DAI for the set of PDSCHs: C-DAI is incremented across all DCIs with the set index if RI is not toggled. The first DCI with toggled RI will have C-DAI equal to 1;
T-DAI for the set of PDSCHs: T-DAI indicates the total number of DCIs till now across all DCIs with the set index with RI not toggled. If a UE operates on a single carrier, T-DAI may not need to be explicitly transmitted. In fact, T-DAI equals to C-DAI in this case. Therefore, C-DAI also serves the function of T-DAI.

Herein, the currently indicated PUCCH resource can be derived by the last DCI(s) received by the UE.

In one implementation A, when a PDSCH is scheduled to a UE by a DCI, only HARQ-ACKs for the current set of PDSCHs can be reported by the UE in the currently indicated PUCCH by the DCI. Herein, the SI of the current PDSCH set is included in the DCI. The DCI can include at least the following information controlling HARQ-ACK transmission. e.g. by dedicated field(s) or jointly interpreted with other information,
SI for the current set of PDSCHs;
RI for the current set of PDSCHs;
C-DAI for the current set of PDSCHs;
T-DAI for the current set of PDSCHs, if present.

Alternatively, the DCI can include at least the following information controlling HARQ-ACK transmission, e.g. by dedicated field(s) or jointly interpreted with other information,
SI for the current set of PDSCHs;
C-DAI for the current set of PDSCHs.

Alternatively, the DCI can include at least the following information controlling HARQ-ACK transmission, e.g. by dedicated field(s) or jointly interpreted with other information,
C-DAI for the current set of PDSCHs.

If there is no RI indicated in the DCI, it can only applies to fallback DCI. A UE can use RI in a normal DCI indicating same SI to derive the RI for the set of PDSCH. If there is no SI indicated in the DCI, the SI can be a predefined value, e.g. the first set, or a RRC configured value.

Alternatively, with the information controlling HARQ-ACK transmission in a DCI in the above implementation A, a UE can report HARQ-ACK for all sets of PDSCHs.

In one implementation B, when a PDSCH is scheduled by a DCI, HARQ-ACK for one or multiple sets of PDSCHs are reported by UE. For a set of PDSCHs, the HARQ-ACKs are derived by the SI, RI, C-DAI and T-DAI (if present) of the set of PDSCHs. If HARQ-ACK of only one set of PDSCHs is reported, it is the current set of PDSCH. Herein, the SI of the current PDSCH set is indicated in the DCI. The DCI can include at least the following information controlling HARQ-ACK transmission, e.g. by dedicated field(s) or jointly interpreted with other information:
SI for the current set of PDSCHs;
Indication for other set(s) of PDSCHs to be reported together with current set of PDSCH;
RI for the current set of PDSCHs;
C-DAI for the current set of PDSCHs;
T-DAI for the current set of PDSCHs, if present.

Alternatively, the DCI can include at least the following information controlling HARQ-ACK transmission. e.g. by dedicated field(s) or jointly interpreted with other information:
SI for the current set of PDSCHs;
Indication for other set(s) of PDSCHs to be reported together with current set of PDSCHs;
RI for each set of PDSCHs whose HARQ-ACKs are to be reported on the currently indicated PUCCH. The number of RI equals to maximum number of sets of PDSCHs. Alternatively, the number of RI equals to maximum number of sets of PDSCHs whose HARQ-ACK can be reported in a same PUCCH, e.g. UE is configured to report HARQ-ACK for at most 2 of 4 sets of PDSCHs;
C-DAI for the current set of PDSCHs;

T-DAI for the current set of PDSCHs, if present.

Alternatively, the DCI can include at least the following information controlling HARQ-ACK transmission, e.g. by dedicated field(s) or jointly interpreted with other information:

SI for the current set of PDSCHs.

Indication for other set(s) of PDSCHs to be reported together with current set of PDSCHs;

RI for each set of PDSCHs whose HARQ-ACKs are to be reported on the currently indicated PUCCH. The number of RI equals to maximum number of sets of PDSCHs. Alternatively, the number of RI equals to maximum number of sets of PDSCHs whose HARQ-ACK can be reported in a same PUCCH, e.g. UE is configured to report HARQ-ACK for at most 2 of 4 sets of PDSCHs;

C-DAI for the current set of PDSCHs;

T-DAI for each set of PDSCHs whose HARQ-ACKs are to be reported on the currently indicated PUCCH, if present. The number of T-DAI equals to maximum number of sets of PDSCHs. Alternatively, the number of T-DAI equals to maximum number of sets of PDSCHs whose HARQ-ACK can be reported in a same PUCCH, e.g. UE is configured to report HARQ-ACK for at most 2 of 4 sets of PDSCHs.

Regarding indication for other set(s) of PDSCHs to be reported together with current set of PDSCH, it can be indicated using a bitmap with 1-by-1 mapping for the other set(s) of PDSCHs. If maximum N sets of PDSCHs can be used in PDSCH scheduling, the indication can use N−1 bits. If maximum 2 sets of PDSCHs can be used in PDSCH scheduling, the indication can be one bit to indicate whether the other set different from the current set is to be reported. Alternatively, the indication can be number of other sets to be reported. If it indicates zero, it is to only report for the current set. If it indicates one, it is to report for both sets. Alternatively, the indication can be number of sets to be reported. If it indicates one set, it is to only report for the current set. If it indicates two sets, it is to report for both sets.

Alternatively, the DCI can include at least the following information controlling HARQ-ACK transmission, e.g. by dedicated field(s) or jointly interpreted with other information:

SI for the current set of PDSCHs;

RI for each set of PDSCHs. The number of RI equals to maximum number of sets of PDSCHs;

C-DAI for the current set of PDSCHs;

T-DAI for the current set of PDSCHs, if present.

Alternatively, the DCI can include at least the following information controlling HARQ-ACK transmission, e.g. by dedicated field(s) or jointly interpreted with other information:

SI for the current set of PDSCHs;

RI for each set of PDSCHs. The number of RI equals to maximum number of sets of PDSCHs;

C-DAI for the current set of PDSCHs;

T-DAI for each set of PDSCHs, if present. The number of T-DAI equals to maximum number of sets of PDSCHs.

Regarding RI for each set of PDSCHs, if HARQ-ACK needs to be reported for a set of PDSCHs, the indicated RI for the set is same as RI in the latest DCI(s) scheduling PDSCH in the set, e.g. not toggled. If HARQ-ACK does not need to be reported for a set of PDSCH, the indicated RI for the set is toggled compared to the RI in the latest DCI(s) scheduling PDSCH in the set.

In implementation B triggering HARQ-ACK transmission for one or multiple sets of PDSCHs, for a set Y of PDSCHs other than the current set of PDSCHs:

If there is no RI for set Y indicated in the current DCI, RI for set Y can be derived by the last received DCI(s) scheduling PDSCH of the set Y;

if there is no T-DAI for set Y indicated in the current DCI, T-DAI for set Y can be derived by the last received DCI(s) scheduling PDSCH of the set Y.

In one implementation, in case HARQ-ACK for multiple sets of PDSCHs are reported by UE, HARQ-ACKs for the multiple sets of PDSCHs are sorted in an increasing order or decreasing order of set index.

Alternatively, in case HARQ-ACK for multiple sets of PDSCHs are reported by UE, HARQ-ACKs for the current set of PDSCHs are sorted first, followed by the HARQ-ACKs for the other set(s) of PDSCHs in an increasing order or decreasing order of set index.

A UE may need to monitor a normal DL DCI and a fallback DL DCI for the PDSCH scheduling. Herein, a normal DL DCI is the DCI which provides more flexible control on the PDSCH transmission for larger throughput. A normal DCI can have a larger payload size, e.g. DCI 1_1 in NR Rel-15. On the other hand, a fallback DCI is targeted for reliable transmission of PDCCH and PDSCH. A fallback DCI can be have a smaller payload size for better link performance, e.g. DCI 1_0 in NR Rel-15. According to above analysis, small payload size of DCI 1_0 helps to improve link performance of DCI 1_0. One way to reduce the size of fallback DCI is to reduce the information controlling HARQ-ACK transmission.

In one implementation, for a fallback DCI, e.g. DCI 1_0, only HARQ-ACKs for the current set of PDSCHs are reported by UE. For a fallback DCI, only information controlling HARQ-ACK transmission for a current set of PDSCHs is indicated, as provided in above implementation A. While, for a normal DCI, e.g. DCI 1_1, HARQ-ACK for one or multiple sets of PDSCHs are reported by UE. For a normal DCI, information controlling HARQ-ACK transmission for one or multiple sets of PDSCHs are indicated, as provided in above implementation B.

In one implementation, for a normal DCI, e.g. DCI 1_1, HARQ-ACK for one or multiple sets of PDSCHs are reported by UE. For a normal DCI, information controlling HARQ-ACK transmission for one or multiple sets of PDSCHs are indicated, as provided in above implementation B. While, for a fallback DCI, e.g. DCI 1_0, HARQ-ACK for all sets of PDSCHs are reported by UE. For a fallback DCI, only information controlling HARQ-ACK transmission for a current set of PDSCHs is indicated, as provided in above implementation A. Alternatively, a fallback DCI includes at least the following information controlling HARQ-ACK transmission, e.g. by dedicated field(s) or jointly interpreted with other information:

SI for the current set of PDSCHs;

RI for each set of PDSCHs. The number of RI equals maximum number of sets of PDSCHs;

C-DAI for the current set of PDSCHs;

In one implementation, a UE determines the set(s) of PDSCHs for which HARQ-ACKs are reported according to information in the last received DCI(s). If the last DCI is DCI 1_0, the UE can determine the set(s) of PDSCHs for which HARQ-ACKs are reported according to a most recent DCI 1_1 scheduling PDSCHs. The DCI 1_1 can schedule a PDSCH of the current set of PDSCHs. Alternatively, if HARQ-ACK feedback of multiple sets of PDSCHs are triggered, the DCI 1_1 can schedule a PDSCH of one of the multiple sets of PDSCHs. If all DCIs received by UE are DCI 1_0, UE can report the HARQ-ACKs following the indication in DCI 1_0.

In one implementation, the same information controlling HARQ-ACK transmission (only for a current set of PDSCHs as implementation A, or for one or multiple sets of PDSCHs as implementation B) is included in a normal DCI and a fallback DCI.

Figures 2, 3:
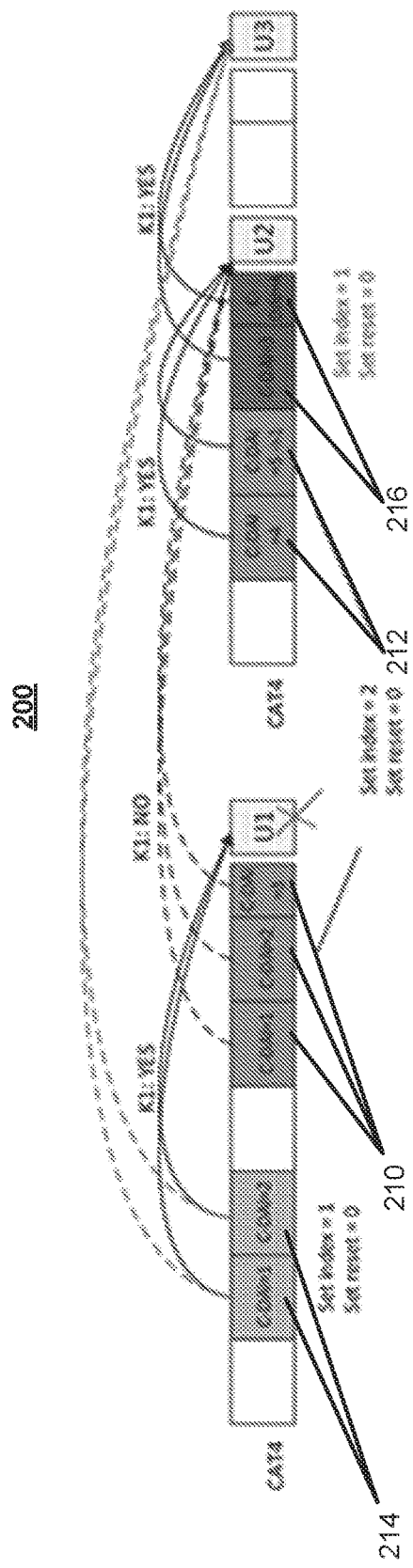
FIG. 2 depicts an illustration representing an example of a HARQ-ACK codebook based on set index and restart indication not toggled
FIG. 3 depicts an illustration representing an example of a HARQ-ACK codebook based on set index and restart indication toggled.

As shown in FIG. 2, the PDSCHs 214 with C-DAI=1 and 2 with set index=1 with reset indicator=0 fails in HARQ-ACK transmission in PUCCH resource U1. After knowing this case, gNB decides to retransmit it together with HARQ-ACK for PDSCHs 216, the same set index=1 is assigned for the PDSCHs 216 with reset indicator=0 (e.g. not toggled). In this case, C-DAI of the PDSCHs 216 will be counted as 3 and 4 which follows the two PDSCHs 214 with set index 1. By this way, HARQ-ACK transmission in PUCCH resource U3 include HARQ-ACK for all 4 PDSCHs.

On the other hand, as shown in 300 of FIG. 3, if gNB receives the HARQ-ACK for the PDSCHs 310 with set index 1 and gNB still wants to use set index 1 312, gNB can indicate set index=1 with reset indicator=1 (e.g. toggled) 314 for the PDSCHs 316. In this case, C-DAI of the PDSCHs 316 will be counted as 1 and 2, e.g. C-DAI counting is restarted. By this way, HARQ-ACK transmission in PUCCH resource U3 only includes HARQ-ACK for PDSCHs 316.

In one implementation, as shown in FIGS. 2 and 3, in a DCI scheduling a PDSCH, if there is no information on PDSCH-to-HARQ-ACK timing, the set index still indicate a valid set index. HARQ-ACK for the set of PDSCH without valid PDSCH-to-HARQ-ACK timing will be transmitted together with a set of PDSCHs with valid PDSCH-to-HARQ-ACK timing with same set index. PDSCH-to-HARQ-ACK timing and PUCCH resource for the HARQ-ACK transmission is indicated by the DCI scheduling a PDSCH with valid PDSCH-to-HARQ-ACK timing for the same set of PDSCHs. C-DAI and T-DAI will count PDSCHs with the same set index continuously. Within a same set of PDSCHs, a PDSCH without valid PDSCH-to-HARQ-ACK timing can be scheduled only earlier than a PDSCH with valid PDSCH-to-HARQ-ACK timing. Alternatively, within a same set of PDSCHs, a PDSCH without valid PDSCH-to-HARQ-ACK timing can be scheduled earlier than, later than or at the same timing with a PDSCH with valid PDSCH-to-HARQ-ACK timing. For example, for a UE configured with carrier aggregation, a PDSCH with valid PDSCH-to-HARQ-ACK timing is scheduled on a carrier, while another PDSCH in the same timing can be scheduled without valid PDSCH-to-HARQ-ACK timing in another carrier.

When a PDSCH is scheduled by a DCI, it could also support triggering one-shot HARQ-ACK feedback for all HARQ processes. One-shot HARQ-ACK feedback has the benefit of fixed codebook size hence is more robust. For example, a dedicated bit in a DCI can indicate either a normal dynamic HARQ-ACK feedback or a one-shot HARQ-ACK feedback. Alternatively, a combination of certain values of multiple fields in a DCI may indicate one-shot HARQ-ACK feedback; otherwise it is normal dynamic HARQ-ACK feedback.

In one implementation C, when a PDSCH is scheduled by a DCI, if one-shot HARQ-ACK feedback is indicated, the DCI can include at least the following information controlling HARQ-ACK transmission, e.g. by dedicated field(s) or jointly interpreted with other information:

SI for the current set of PDSCHs;
RI for the current set of PDSCHs;
RI for the other set(s) of PDSCHs;
C-DAI for the current set of PDSCHs;
T-DAI for the current set of PDSCHs, if present.

Equivalently, the DCI can include:
SI for the current set of PDSCHs;
RI for each set of PDSCHs;
C-DAI for the current set of PDSCHs;
T-DAI for the current set of PDSCHs, if present.

A UE will form a HARQ-ACK codebook which includes HARQ-ACK for all the HARQ processes. If the RI of a latest PDSCH associated with a HARQ process is not toggled compared to the RI in the triggering DCI for the set of PDSCHs which includes the latest PDSCH of the same HARQ process, the UE retransmits the actual HARQ-ACK for the HARQ process. If the RI of a latest PDSCH associated with a HARQ process is toggled compared to the RI in the triggering DCI for the same set of PDSCHs which includes the latest PDSCH of the same HARQ process, the UE transmits NACK/DTX for the HARQ process. For all other HARQ processes, the UE transmits NACK/DTX.

In the DCI, C-DAI/T-DAI may not be useful in the current one-shot HARQ-ACK feedback, however, it is still beneficial to transmit such information. For example, if the one-shot HARQ-ACK transmission from UE fails due to either UL LBT failure or wrong detection at gNB side, it is up to gNB implementation to trigger a normal dynamic HARQ-ACK feedback or another one-shot HARQ-ACK feedback in a future time.

Certain fields in DCI can be interpreted based on normal dynamic HARQ-ACK feedback or one-shot HARQ-ACK feedback is indicated. The common fields in a DCI in implementation B and C are not reinterpreted. The common fields can include:

Indication on normal dynamic HARQ-ACK feedback or one-shot HARQ-ACK feedback.
SI for the current set of PDSCHs;
C-DAI for the current set of PDSCHs;
T-DAI for the current set of PDSCHs, if present.

If a DCI is triggering normal dynamic HARQ-ACK feedback, the following information can be signaled: 'Indication for other set(s) of PDSCHs to be reported together with current set of PDSCH' and 'RI for the current set of PDSCHs'. While, if DCI is triggering one-shot HARQ-ACK feedback, 'RI for each set of PDSCHs' can be signaled. Alternatively, the common fields can include:

Indication on normal dynamic HARQ-ACK feedback or one-shot HARQ-ACK feedback;
SI for the current set of PDSCHs;
RI for the current set of PDSCHs;
C-DAI for the current set of PDSCHs;
T-DAI for the current set of PDSCHs, if present.

If a DCI is triggering normal dynamic HARQ-ACK feedback, 'Indication for other set(s) of PDSCHs to be reported together with current set of PDSCH' can be signaled. While, if DCI is triggering one-shot HARQ-ACK feedback, 'RI for other set(s) of PDSCHs except the current set of PDSCHs' can be signaled. Specifically, if only two sets are used, a DCI indicates one-bit Indication for the other set of PDSCHs if it is triggering normal dynamic HARQ-ACK feedback. While, it indicates one-bit RI for the other set of PDSCHs if DCI is triggering one-shot HARQ-ACK feedback.

In one implementation, the above one-shot HARQ-ACK feedback can be triggered by both normal DCI and fallback DCI. Alternatively, the above one-shot HARQ-ACK feedback can be triggered by normal DCI only. By this way, one bit is saved in fallback DCI for better link performance. Alternatively, a fallback DCI always triggers one-shot HARQ-ACK feedback, while a normal DCI can indicate either a one-shot HARQ-ACK feedback or a normal dynamic HARQ-ACK feedback.

When a PUSCH is scheduled by a DCI, it can also support triggering one-shot HARQ-ACK feedback for all HARQ processes on PUSCH. For example, a dedicated bit in the DCI can indicate one-shot HARQ-ACK feedback on the scheduled PUSCH. Alternatively, a combination of certain values of multiple fields in the DCI may indicate one-shot HARQ-ACK feedback on the scheduled PUSCH.

In one implementation, when a PUSCH is scheduled to a UE by a DCI, if one-shot HARQ-ACK feedback is indicated, HARQ-ACKs for all the HARQ processes can be reported by the UE. Otherwise, the UE transmits HARQ-ACKs on PUSCH only if the PUSCH is overlapped with a PUCCH for HARQ-ACK. In addition to the indication triggering one-shot HARQ-ACK feedback, the DCI can include at least the following information controlling HARQ-ACK transmission, e.g. by dedicated field(s) or jointly interpreted with other information:
  RI for the current set of PDSCHs;
  RI for the other set(s) of PDSCHs;
  Equivalently, the DCI can include:
  RI for each set of PDSCHs.

A UE will form a HARQ-ACK codebook which includes HARQ-ACK for all the HARQ processes. If the RI of a latest PDSCH associated with a HARQ process is not toggled compared to the RI in the triggering DCI for the set of PDSCHs which includes the latest PDSCH of the same HARQ process, the UE retransmits the actual HARQ-ACK for the HARQ process. If the RI of a latest PDSCH associated with a HARQ process is toggled compared to the RI in the triggering DCI for the same set of PDSCHs which includes the latest PDSCH of the same HARQ process, the UE transmits NACK/DTX for the HARQ process. For all other HARQ processes, the UE transmits NACK/DTX.

If one-shot HARQ-ACK feedback is not indicated in the DCI which schedules a PUSCH, and if the PUSCH is overlapped with a PUCCH for HARQ-ACK, the DCI can include the following information to derive the size of normal dynamic codebook, e.g. as NR Rel-15.
  T-DAI for the dynamic HARQ-ACK codebook if CBG based PDSCH transmission is not configured, or for the first HARQ-ACK sub-codebook if CBG based PDSCH transmission is configured;
  T-DAI for the second HARQ-ACK sub-codebook if CBG based PDSCH transmission is configured.

Certain field(s) in DCI which schedules a PUSCH can be differently interpreted based on whether normal dynamic HARQ-ACK feedback or one-shot HARQ-ACK feedback is indicated. If the DCI indicates normal dynamic HARQ-ACK feedback, it is interpreted as T-DAI. If the DCI indicates one-shot HARQ-ACK feedback, it is interpreted as 'RI for the current set of PDSCHs' and 'RI for the other set(s) of PDSCHs', or as 'RI for each set of PDSCHs'.

In one implementation, when a PUSCH is scheduled by a DCI, HARQ-ACK transmission on PUSCH is triggered if the PUSCH is overlapped with a PUCCH for HARQ-ACK transmission. If one-shot HARQ-ACK feedback is indicated by the DCI, HARQ-ACKs for all HARQ processes are transmitted on PUSCH. Otherwise, HARQ-ACKs with normal dynamic codebook are transmitted on PUSCH.

In one implementation, when a PUSCH is scheduled by a DCI, HARQ-ACK transmission on PUSCH is triggered by the DCI, no matter the PUSCH is overlapped with a PUCCH for HARQ-ACK transmission or not.

If indicated by the DCI, HARQ-ACK for one set of PDSCHs are reported by UE. The DCI can include at least the following information controlling HARQ-ACK transmission, e.g. by dedicated field(s) or jointly interpreted with other information:
  SI for the set of PDSCHs;
  RI for the set of PDSCHs;
  T-DAI for the set of PDSCHs.

Alternatively, the DCI may include at least the following information controlling HARQ-ACK transmission, e.g. by dedicated field(s) or jointly interpreted with other information:
  SI for the a set of PDSCHs;
  T-DAI for the set of PDSCHs.

If indicated by the DCI, HARQ-ACK for one or multiple sets of PDSCHs are reported by UE. The DCI can include at least the following information controlling HARQ-ACK transmission, e.g. by dedicated field(s) or jointly interpreted with other information:
  SI for the a first set of PDSCHs whose HARQ-ACKs are to be reported;
  Indication for other set(s) of PDSCHs whose HARQ-ACKs are to be reported;
  RI for the first set of PDSCHs;
  T-DAI for the first set of PDSCHs.

Alternatively, the DCI will include at least the following information controlling HARQ-ACK transmission, e.g. by dedicated field(s) or jointly interpreted with other information:
  SI for the a first set of PDSCHs whose HARQ-ACKs are to be reported;
  Indication for other set(s) of PDSCHs whose HARQ-ACKs are to be reported;
  RI for each set of PDSCHs whose HARQ-ACKs are to be reported;
  T-DAI for the first set of PDSCHs.

Alternatively, the DCI will include at least the following information controlling HARQ-ACK transmission, e.g. by dedicated field(s) or jointly interpreted with other information:
  Indication for the set(s) of PDSCHs whose HARQ-ACKs are to be reported;
  RI for each set of PDSCHs whose HARQ-ACKs are to be reported;
  T-DAI for each set of PDSCHs whose HARQ-ACKs are to be reported.

Alternatively, the DCI will include at least the following information controlling HARQ-ACK transmission, e.g. by dedicated field(s) or jointly interpreted with other information:
  SI for a first set of PDSCHs;
  RI for each set of PDSCHs;
  The number of RI equals to maximum number of sets of PDSCHs;
  T-DAI for the first set of PDSCHs.

Alternatively, the DCI will include at least the following information controlling HARQ-ACK transmission, e.g. by dedicated field(s) or jointly interpreted with other information:
  RI for each set of PDSCHs. The number of RI equals to maximum number of sets of PDSCHs;
  T-DAI for each set of PDSCHs. The number of T-DAI equals to maximum number of sets of PDSCHs.

In one implementation, the above one-shot HARQ-ACK feedback can be triggered by both normal DCI and fallback DCI. Alternatively, the above one-shot HARQ-ACK feedback can be triggered by normal DCI only. By this way, one bit is saved in fallback DCI for better link performance.

Figure 4:
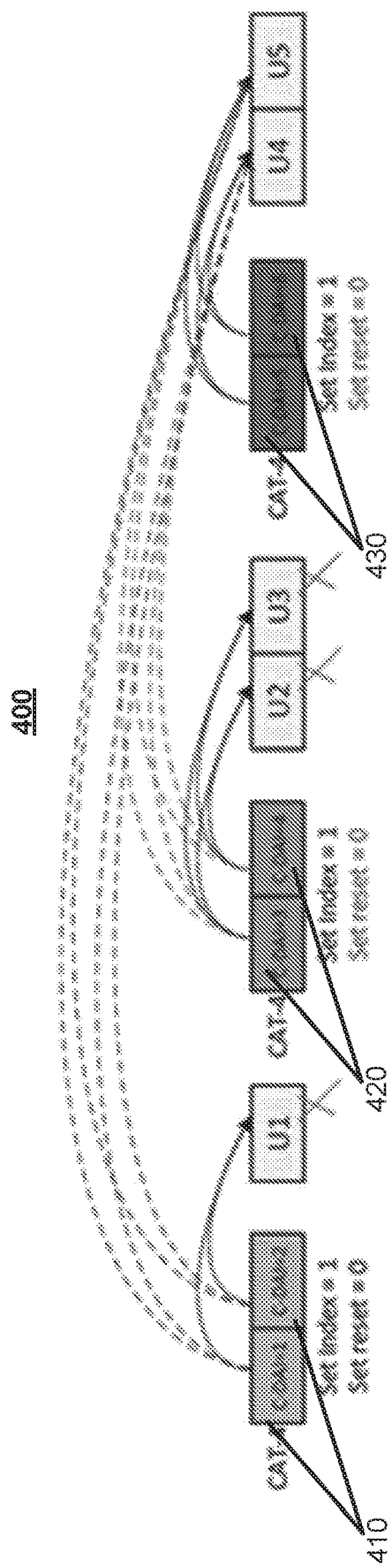
FIG. 4 depicts an illustration representing an example of multiple K1 values indicated by a DCI.

In one implementation, assuming a DCI can indicate one or multiple values of K1 for PDSCH-to-HARQ-ACK timings, the HARQ-ACK codebook can still be determined by set index, reset indicator, C-DAI/T-DAI. As shown in 400 FIG. 4, the PDSCHs 410 with C-DAI=1 and 2 with set index=1 with reset indicator=0 fails in HARQ-ACK transmission in PUCCH resource U1. After knowing this case, gNB decides to retransmit it together with HARQ-ACK for two PDSCHs 420, the same set index=1 is assigned for the PDSCHs 420 with reset indicator=0 (e.g. not toggled). C-DAI of the PDSCHs 420 will be counted as 3 and 4 which follows the PDSCHs 410 with set index 1. By this way, HARQ-ACK transmission in PUCCH resource U2 or U3 includes HARQ-ACK for 4 PDSCHs. However, though gNB provides two opportunities for LBT operation of PUCCH, it is still possible that LBT can be failed or gNB doesn't receive the PUCCH. In this case, gNB decides to retransmit HARQ-ACK for all 4 PDSCHs together with HARQ-ACK for PDSCHs 430, the same set index=1 is assigned for the PDSCHs 430 with reset indicator=0 (e.g. not toggled). In this case, C-DAI of the PDSCHs 430 will be counted as 5 and 6 which follows the PDSCHs 420 with set index 1. Value 5 and 6 are indicated as value 1 and 2 if modulo 4 operation is done. By this way, HARQ-ACK transmission in PUCCH resource U4 or U5 includes HARQ-ACK for all 6 PDSCHs.

In one implementation, when gNB schedules a PDSCH by a DCI, gNB may want to trigger transmission or retransmission of HARQ-ACK for earlier PDSCHs without HARQ-ACK for current PDSCHs. A separated bit can be included in DCI to indicate such operation. If this separated bit is set, it is to report the HARQ-ACK for earlier PDSCHs only. K1 indicates a PDSCH-to-HARQ-ACK timing related to the currently scheduled PDSCH and ARI indicates a PUCCH resource. The derived PUCCH resource by K1 and ARI is actually used for the HARQ-ACK transmission of earlier PDSCHs only. TPC, set index, and restart indication are determined as is. T-DAI can be reinterpreted as an indicator of set index of a set of earlier PDSCHs for which the HARQ-ACK is triggered; however, C-DAI is still used as counter for HARQ-ACK ordering of current PDSCH(s). Preferably, the indicated set index by T-DAI is different from the set index in the DCI. That is, the DCI is triggering HARQ-ACK transmission for a set of PDSCHs with a different set index from the current scheduled PDSCH. Otherwise, it may cause confusion on how to interpret the reset indicator. If this separated bit is not set, HARQ-ACK for earlier PDSCHs, if existed, are transmitted together with currently scheduled PDSCH as disclosed in other implementations.

Preferably, a subset of a set of PDSCHs can include the PDSCHs whose HARQ-ACKs are expected to transmit on the same PUCCH resource for the first time HARQ-ACK feedback. As shown in FIG. 5, 6, 7, 8, 9, or 10, 2 PDSCHs 510, 610, 710 810, 910, 1010 belong to a first subset, while 4 PDSCHs 520, 620, 720, 820, 920, 1020 belong to a second subset. For consecutive subsets, there may be not enough gNB processing time between a PUCCH resource for the first subset(s) and one or more DCIs scheduling PDSCHs in the second subset. The first subset(s) may be strictly a single subset of the set of PDSCHs, or the first subset(s) can be actually multiple consecutive subsets having the same value of reset indicator. The value of reset indicator in the above mentioned one or more DCIs can be different from the value of reset indicator in the other DCIs of the second subset. Reset indicator in the other DCIs of the second subset is used to determine HARQ-ACK transmission of all PDSCHs in the second subset. If no DCI in the $2^{nd}$ subset other than the above mentioned one or more DCIs is received, reset indicator in the above mentioned one or more DCIs is used to determine HARQ-ACK transmission of the second subset. Alternatively, reset indictor in a later DCI scheduling the set of PDSCHs is used to derive the effective reset indicator of the second subset.

In the above mentioned one or more DCIs, since gNB doesn't know whether HARQ-ACK of PDSCHs in the first subset(s) can be received or not due to insufficient processing time, gNB can keep reset indicator unchanged. Alternatively, gNB and UE may just neglect the value of reset indicator in the above mentioned one or more DCIs. According to a DCI in the $2^{nd}$ subset other than the above mentioned one or more DCIs, if the reset indicator is not toggled, HARQ-ACK for all the above consecutive subsets are transmitted. Otherwise, if the reset indicator is toggled, only HARQ-ACK for all PDSCHs in the second subset is reported. If no DCI in the $2^{nd}$ subset other than the above mentioned one or more DCIs is received, UE can skip HARQ-ACK transmission, or UE can report HARQ-ACK for PDSCHs in the first subset(s) and also for PDSCHs scheduled by the above mentioned one or more DCIs in a PUCCH indicated by a DCI of the second subset. If no DCI in the $2^{nd}$ subset other than the above mentioned one or more DCIs is received, assuming UE doesn't transmit PUCCH carrying HARQ-ACK, an additional DCI must trigger HARQ-ACK retransmission by scheduling the same set of PDSCHs at a later time. That is, reset indicator of the later DCI equals to the effective reset indicator of the second subset, and also determine whether to retransmit HARQ-ACK for PDSCHs in the first subset(s).

In one implementation, for the above consecutive subsets, two different indications of C-DAI/T-DAI can be indicated at least in the above mentioned one or more DCIs. The above two indications of C-DAI/T-DAI can be explicitly included as separate fields in a DCI. Alternatively, one indication of C-DAI/T-DAI (indication A) is included as a field in a DCI, while the other indication of C-DAI/T-DAI (indication B) is only indicated in the above mentioned one or more DCIs by reinterpreting other existing field(s), for example, TPC or RAI. In all the above consecutive subsets, at least one C-DAI/T-DAI is indicated. In the DCIs which are not the above mentioned one or more DCIs, there is just one-DAI/T-DAI is indicated. For those DCI, gNB may indicate indication A or indication B depending on the HARQ-feedback situation. The gNB may toggle the reset indicator to indicate if indication B is included, while indication A is included otherwise. From a UE perspective, depending on whether reset indicator is toggled or not, the UE may know which indication is received between indication A and indication B. Indication A of C-DAI/T-DAI counts number of PDSCHs in all the above consecutive subsets, still denoted as C-DAI/T-DAI in the following. Indication B of C-DAI/T-DAI only counts the number of PDSCHs in the second subset, denoted V-C-DAI/V-T-DAI.

In the above mentioned one or more DCIs, gNB can set a special value of K1, e.g. no valid PDSCH-to-HARQ-ACK-timing indicated, so that ARI and/or TPC can be reinterpreted to indicate V-C-DAI/V-T-DAI. As shown in FIG. 5, 500 or 6, 600, the first two PDSCHs 521/522, 621/622 of the second subset of four PDSCHs 520, 620 are next to PUCCH U1 530, 630, gNB cannot prepare scheduling information in these two DCIs considering HARQ- ACK information carried in U1 530, 630 due to the insufficient processing time. In these two DCIs, C-DAI=3 & 4 are indicated following the first subset of two PDSCHs 510, 610 with C-DAI=1 & 2. Additionally, V-C-DAI=1 & 2 are indicated in DCI, where ARI or TPC fields are not needed so that V-C-DAI can be indicated instead of AIR or TPC without changing the total number of bits for DCI. Reset indicator are unchanged (e.g. value 0, not toggled). Starting from the 3$^{rd}$ PDSCH 523, 623 of the second subsets of PDSCHs 520, 620, gNB can know the reception status of U1 530, 630 due to the sufficient processing time for U1 530, 630 decoding. The interpretation as C-DAI or V-C-DAI for the DCIs scheduling the last two PDSCHs 523/524, 623/624 of the second subset of PDSCHs depends on whether reset indicator 540, 640 is toggled or not.

In FIG. 5, U1 530 is not received (illustrated via X on element 530), gNB can trigger UE to report HARQ-ACK for PDSCH with C-DAI=1 & 2 again, so gNB keeps same value of reset indicator 540 (e.g. value 0, not toggled) and indicates C-DAI=5 & 6 (1 & 2 after modulo operation) in the DCIs scheduling 3$^{rd}$ and 4$^{th}$ PDSCHs 523, 524, which counts all PDSCHs in the two subsets. To report HARQ-ACK, the UE can include HARQ-ACKs for all 6 PDSCHs by following the C-DAI indication.

However, in FIG. 6, U1 630 is received (illustrated via a check mark on element 630), UE doesn't need to report HARQ-ACK for PDSCH with C-DAI=1 & 2 any more, so gNB can toggle reset indicator 640 (e.g. value 1) and indicate V-C-DAI=3 & 4 in the DCIs scheduling 3$^{rd}$ and 4$^{th}$ PDSCHs 623, 624, which only counts PDSCHs in the current subset. To report HARQ-ACK, UE can include HARQ-ACKs for the 4 PDSCHs 620 by following V-C-DAI indication of the PDSCHs 620.

In one implementation, for the above consecutive subsets, C-DAI/T-DAI counts number of PDSCHs in all the above consecutive subsets. If the reset indicator in the DCIs in the second subset other than the above mentioned one or more DCIs is toggled, UE can implicitly adjust the value of C-DAI in the DCIs in the second subset based on the number of PDSCHs in the first subset(s) and use the adjusted C-DAI for determining HARQ codebook.

For example, as shown in FIG. 7, 700 or 8, 800, the first two PDSCHs 721/722, 821/822 of the second subset of four PDSCHs 720, 820 are near to PUCCH U1 730, 830, gNB cannot prepare scheduling information in these two DCIs considering HARQ-ACK information carried in U1. In these two DCIs, C-DAI=3 & 4 are indicated which count the two earlier PDSCHs with C-DAI=1 & 2. Reset indicator are unchanged (e.g. value 0, not toggled). Starting from the 3$^{rd}$ PDSCH 723, 823, gNB can know the reception status of U1 730, 830. The DCIs scheduling last 2 PDSCHs 723/724, 823/824 of the second subset of PDSCHs 720, 820 have C-DAI=5 & 6.

Figure 7:
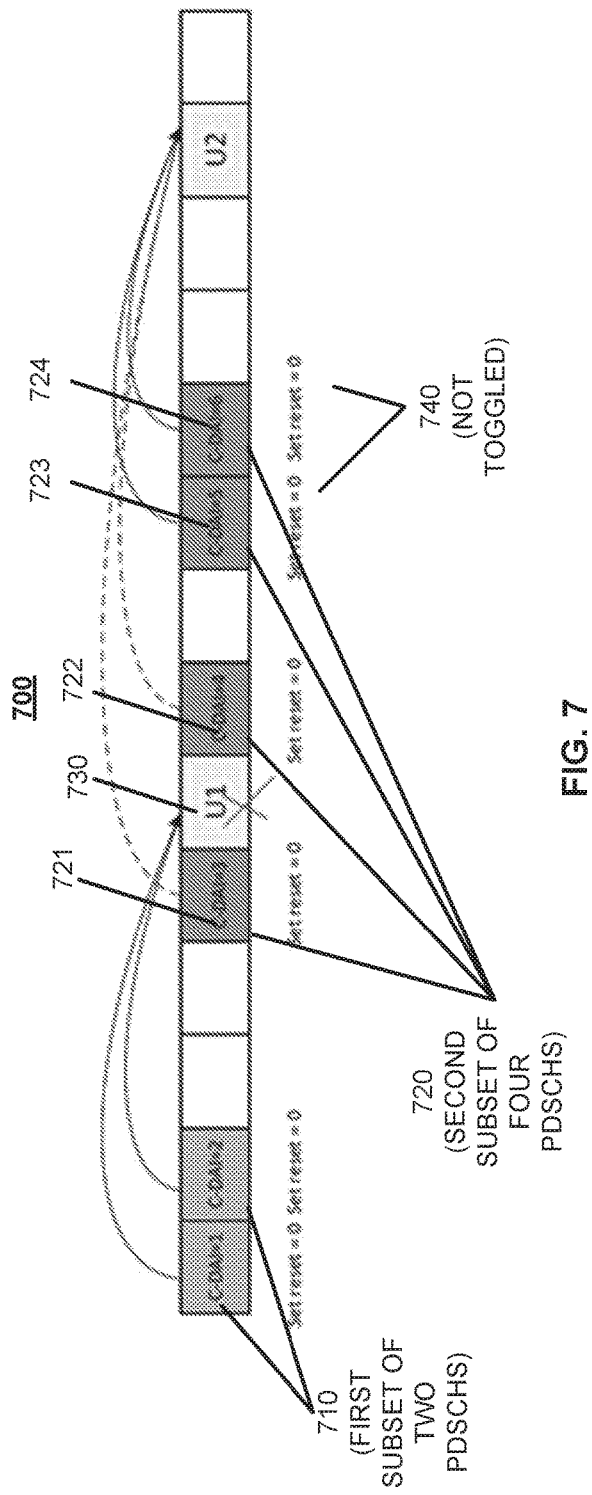
FIG. 7 depicts an illustration representing another example of HARQ-ACK transmission for a set of PDSCHs.

In FIG. 7, if U1 730 is not correctly received (illustrated by the X on element 730), gNB can trigger UE to report HARQ-ACK for PDSCH with C-DAI=1 & 2 again. gNB keeps same value of reset indicator 740 (e.g. value 0, not toggled) in DCI scheduling the last two PDSCHs 723, 724 of the second subset of four PDSCHs 720 with C-DAI=5 & 6. UE transmits HARQ-ACK of all 6 PDSCHs by C-DAI and does HARQ-ACK transmission on U2.

Figure 8:
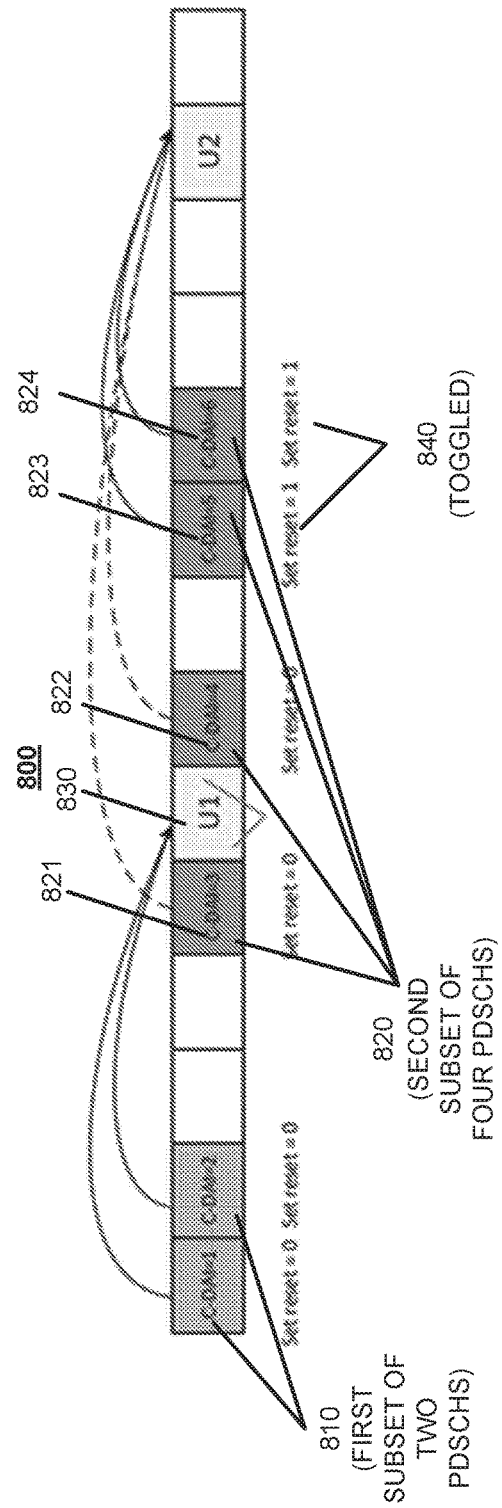
FIG. 8 depicts an illustration representing another example of HARQ-ACK transmission for a set of PDSCHs.

In FIG. 8, if U1 830 is correctly received (illustrated by the check mark on element 830), UE doesn't need to report HARQ-ACK for PDSCH with C-DAI=1 & 2 anymore. Therefore, gNB can toggle the reset 840 (e.g. value 1) in the DCI scheduling last two PDSCHs 823, 824 of the second subset of four PDSCHs 820. Since the reset indicator 840 is toggled, UE can assume that HARQ-ACKs for the first subset 810 have been correctly received by the gNB. Then, UE can know the first PDSCH 821 in the second subset 820 has a C-DAI=3. Finally, UE can know there are four PDSCHs 821, 822, 823, 824 in the second subset 820 ordered by C-DAI=3, 4, 5, 6. In this, UE can just report 4 HARQ-ACKs for the second subset 820 in U2 even though the last C-DAI value is 6.

In one implementation, for the above consecutive subsets, C-DAI/T-DAI in the above mentioned one or more DCIs count the number of PDSCHs in all the above consecutive subsets. If the reset indicator in the other DCIs in the second subset 520,620, 720, 820 is not toggled, C-DAI/T-DAI in the DCIs counts the number of PDSCHs in all the above consecutive subsets. If reset indicator in the other DCIs in the second subset 520,620, 720, 820 is toggled, C-DAI/T-DAI in the DCIs only counts the number of PDSCHs in the second subset 520,620, 720, 820. If reset indicator in the other DCIs in the second subset 520,620, 720, 820 is toggled, UE can adjust value of C-DAI in the above mentioned one or more DCIs based on the number of PDSCHs in the first subset(s) 510, 610, 710, 810.

As shown in FIG. 9, 900 or 10, 1000, the first two PDSCHs 921/922, 1021/1022 of the second subset of PDSCHs 920, 1020 are near to PUCCH U1 930, 1030, gNB cannot prepare scheduling information in these two DCIs referring HARQ-ACK information carried in U1. In these two DCIs, C-DAI=3 & 4 are indicated which count the two earlier PDSCHs with C-DAI=1 & 2. The reset indicator is unchanged (e.g. value 0, not toggled). Starting from the 3$^{rd}$ PDSCH 923, 1023 of the second subsets of PDSCHs 920, 1020, gNB can know the reception status of U1 930, 1030. Values of C-DAI in the DCIs scheduling last 2 PDSCHs 923/924, 1023/1024 of the second subset of PDSCHs 920, 1020 depends on the reset indicator.

In FIG. 9, U1 930 is not correctly received (illustrated using X over element 930), gNB can trigger UE to report HARQ-ACK for PDSCH with C-DAI=1 & 2 again. The gNB keeps same value of reset indicator 940 (e.g. value 0, not toggled) in DCI scheduling the last two PDSCHs 923, 924 of the second subset of PDSCHs 1020, which are assigned with C-DAI=5 & 6. UE transmits HARQ-ACK of all 6 PDSCHs by C-DAI and does HARQ-ACK transmission on U2.

In FIG. 10, U1 1030 is correctly received (illustrated using check mark over element 1030), UE doesn't need to report HARQ-ACK for PDSCH with C-DAI=1 & 2 any more, so gNB can toggle reset indicator 1040 (e.g. value 1) in the DCI scheduling last two PDSCHs 1023, 1024 of the second group of PDSCH 1020. The last two PDSCHs 1023, 1024 have C-DAI=3 & 4. Since reset indicator 1040 is toggled, UE can determine that HARQ ACKs for the first subset of PDSCH 1010 have been correctly received by the gNB. Then, the UE can interpret the C-DAI of the first two PDSCHs 1021, 1022 of the second subset 1020 by 2, so that new C-DAI values becomes 1 & 2. C-DAI of the 4 PDSCHs 1021, 1022, 1023, 1024 of the second subset 1020 becomes 1, 2, 3, 4. By this way, UE can transmit HARQ-ACK of the four PDSCHs of the second subset 1020 by C-DAI.

In one implementation, a single set of PDSCH is used in HARQ-ACK transmission. Therefore, the HARQ-ACK codebook is determined by reset indicator, C-DAI/T-DAI. In this case, information on set index is not needed in a DCI. For example, the scheme shown in FIG. 5, 6, 7, 8, 9, or 10 can operate if only one set of PDSCH is used in HARQ-ACK transmission. Equivalently, concept of set of PDSCH doesn't need to be defined at all.

Semi-Static HARQ-ACK Transmission Based on HARQ Processes

In semi-static HARQ-ACK codebook, one way to make a fixed codebook size is to transmit HARQ-ACK for all configured HARQ processes or a subset of configured HARQ processes. In this scheme, HARQ-ACK bits for an already transmitted HARQ process in a previous HARQ-ACK transmission are still included in the current HARQ-ACK codebook. One critical issue is to make gNB and UE have the same understanding on the transmitted HARQ-ACK bits for a HARQ process.

The triggering DCI may schedule a PDSCH or only trigger HARQ-ACK transmission of earlier scheduled PDSCHs. For a first HARQ process used by a PDSCH received by UE, if HARQ-ACK of the PDSCH is to be reported on the current HARQ-ACK transmission for the first time HARQ-ACK feedback, HARQ-ACK for the first HARQ process is generated according to the reception status of the PDSCH. Otherwise, the HARQ-ACK for the latest PDSCH of a second HARQ process received by UE is expected to be already transmitted in a previous HARQ-ACK transmission for the first time HARQ-ACK feedback. This can happen if UE receives a trigger DCI which schedules a PDSCH with a different HARQ process or only trigger HARQ-ACK transmission. There are 4 cases for the second HARQ process illustrated in FIG. 11, 1100 and described in more detail below:

a. Case 1) 1110: for the HARQ process, UE already sent its HARQ-ACK and gNB correctly received the HARQ-ACK 1112;

b. Case 2) 1120: for the HARQ process, UE sent its HARQ-ACK, but gNB fails 1122 to receive this HARQ-ACK;

c. Case 3) 1130: for the HARQ process, UE fails to pass LBT 1132, hence it cannot transmit PUCCH carrying the HARQ-ACK;

d. Case 4) 1140: for the HARQ process, UE misses DCI with a toggled NDI, hence UE never transmits a PUCCH indicated by the DCI since UE doesn't know there is a new PDSCH scheduled by gNB 1142.

Without other enhancements, a UE cannot distinguish case 4) from case 1). In one implementation, once UE already sent ACK for a HARQ process in a previous PUCCH, UE should report NACK/DTX for the same HARQ process if no new PDSCH received for the HARQ-ACK process and there is new PUCCH for HARQ-ACK transmission. By this way, UE always reports NACK/DTX for case 1) and 4), though UE cannot distinguish case 1) and 4). After receiving the NACK/DTX, if it is actually case 4), gNB can schedule retransmission for the PDSCH. Such a scheme works, however, UE will also report NACK/DTX in case 2) which causes redundant retransmission of a PDSCH.

Figure 11:
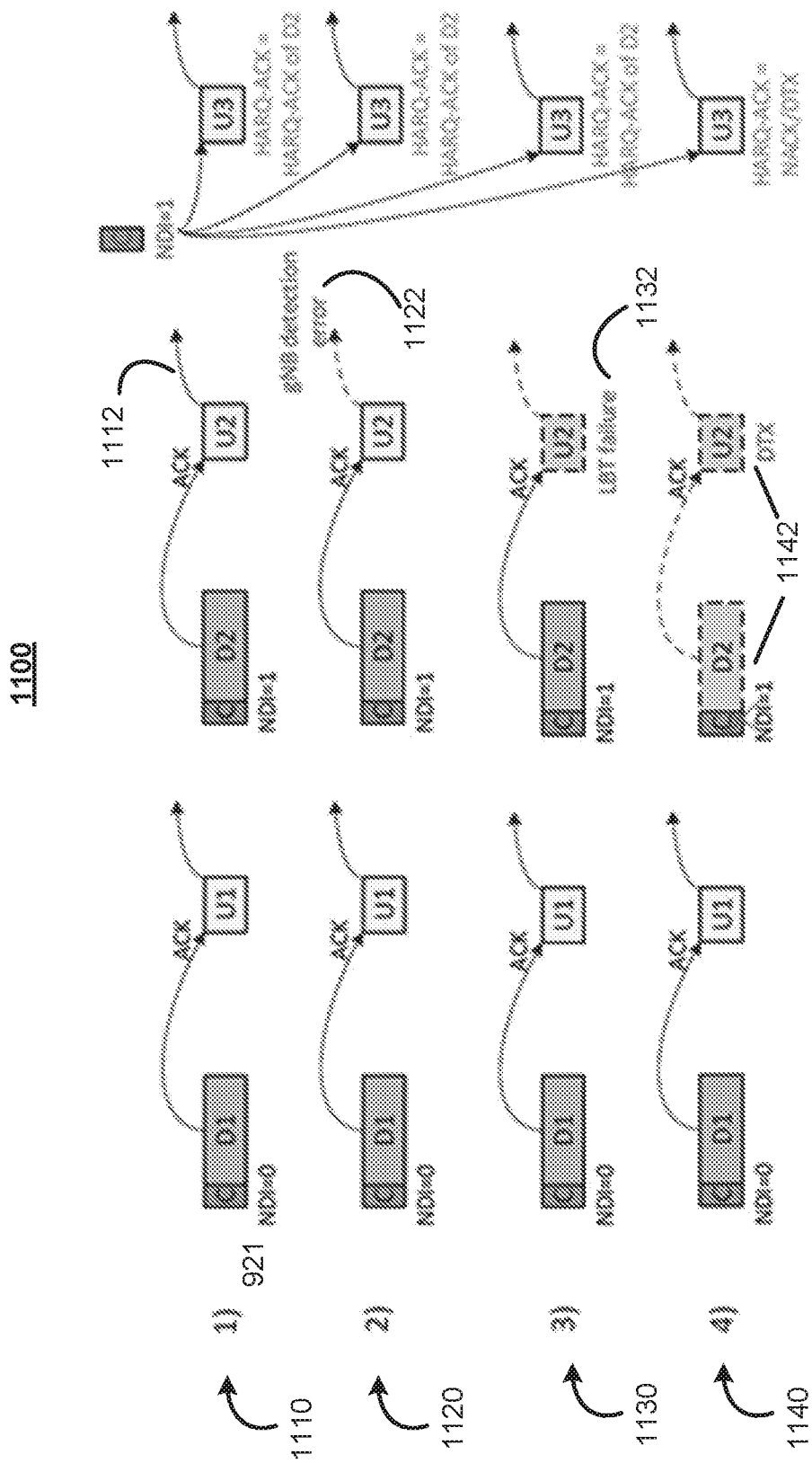
FIG. 11 depicts an illustration representing an example of cases for HARQ-ACK status of a HARQ process.

In one implementation, the triggering DCI may schedule a PDSCH or only trigger HARQ-ACK transmission. Here, the DCI can include the latest value of NDI for a HARQ process if HARQ-ACK for the HARQ process is not correctly received; otherwise, it can include a toggled NDI for the HARQ process. For case 1) in FIG. 11, given gNB is sure that there is no confusion on PDSCH transmission using this HARQ process between UE and gNB, gNB can indicate either values of NDI in the triggering DCI. Based on the NDI value, UE can know whether there is a missed PDCCH for the HARQ process. In an extreme case, 16 or 32 bits of NDI values are needed to trigger HARQ-ACK for all 16 HARQ processes with one or two TBs. For example, as shown in FIG. 11, when gNB signals NDI=1 for a HARQ process in the most recent DCI triggering HARQ-ACK transmission in PUCCH resource U3, UE can distinguish case 1)-4) by comparing the latest NDI known by the UE and the NDI (=1) signaled in the most recent DCI for a HARQ process:

UE transmits the actual HARQ-ACK for the HARQ process in the current HARQ-ACK codebook, if NDI is not toggled. It is case 1), 2) or 3). For case 1) or 2), though they are still not distinguishable by UE, UE can always transmit the actual HARQ-ACK (ACK in FIG. 11) of PDSCH D2 again to gNB so that gNB can know the D2 is correctly received; for case 3), UE can transmit the actual HARQ-ACK (ACK in FIG. 11) of D2 to gNB since it is never transmitted yet;

UE reports NACK/DTX for the HARQ process in the current HARQ-ACK codebook, if NDI is toggled. It is case 4). UE eventually realizes it must miss a PDCCH with NDI=1 scheduling D2, therefore the UE can report NACK/DTX.

In one implementation, when UE reports its HARQ-ACK to gNB in a PUCCH, UE can include the latest NDI at UE side for each HARQ process. In an extreme case, 16 or 32 bits of latest NDI are included in the HARQ-ACK codebook for all 16 HARQ processes with one for two TBs. gNB can identify case 1)-4) by comparing UE reported latest NDI in PUCCH U3 and the NDI (=1) known by gNB for a HARQ process:

It is case 1), 2) or 3) if NDI is not toggled. For case 1), it is duplicated HARQ-ACK information for the HARQ process in gNB point of view; for case 2) and 3), sometimes gNB cannot correctly distinguish these two cases, however, gNB can get the correct HARQ-ACK information (ACK in FIG. 11) for the HARQ process;

It is case 4) if NDI is toggled. gNB can know that UE must miss the PDCCH with NDI=1 scheduling PDSCH D2, therefore gNB can consider a DTX is received for D2.

Figure 12:
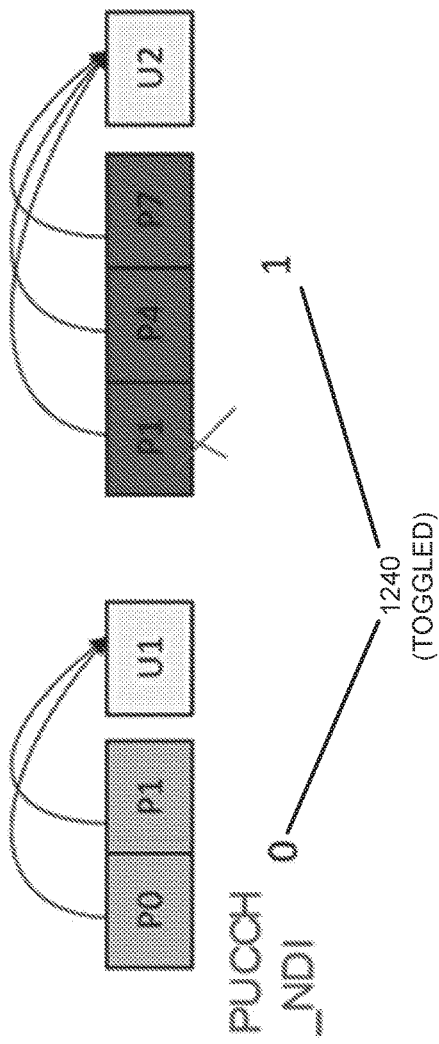
FIG. 12 depicts an illustration representing an example of a use of PUCH_NDI.
Figure 13:
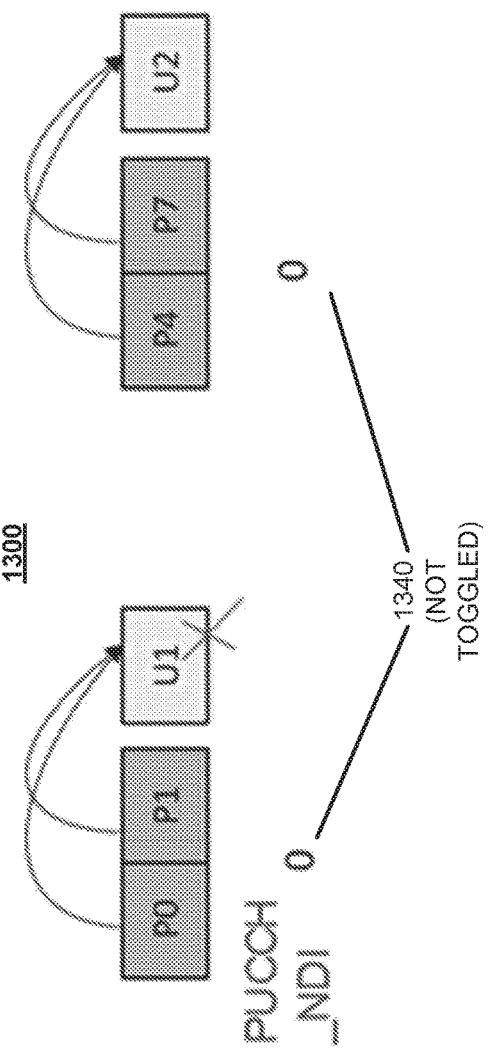
FIG. 13 depicts an illustration representing an example of a use of a PUCCH_NDI.

In one implementation, the triggering DCI may schedule a PDSCH or only trigger HARQ-ACK transmission, the DCI can include one bit information, denoted as PUCCH_NDI. PUCCH_NDI can operate in toggled/not toggled manner. PUCCH_NDI can indicate whether UE needs to report HARQ-ACK in the current PUCCH for a latest PDSCH of a HARQ process whose HARQ-ACK is expected to be transmitted in a previous PUCCH for the first time HARQ-ACK feedback. Alternatively, PUCCH_NDI can indicate if a previous PUCCH carrying HARQ-ACK is correctly received by gNB. The scheme can operate on all HARQ processes as a whole, or can operate on each subset of HARQ processes separately. Preferably, if a PUCCH is correctly received, gNB can trigger new HARQ-ACK transmission with PUCCH_NDI toggled; If PUCCH is wrong or not detected, gNB triggers HARQ-ACK retransmission with PUCCH_NDI not toggled. For a HARQ process whose HARQ-ACK is expected to be already transmitted in a previous PUCCH, UE reports a NACK/DTX for the HARQ process in the current HARQ-ACK codebook, if UE receives PUCCH_NDI toggled. It is 1) or 4). UE actually cannot distinguish case 1) and 4) for the HARQ process, but UE can always report a NACK/DTX;

If UE receives PUCCH_NDI not toggled, UE reports the actual HARQ-ACK for the HARQ process in the current HARQ-ACK codebook. If UE already transmits the previous PUCCH, it is case 2). UE knows gNB doesn't receive its transmitted PUCCH, therefore UE report the actual HARQ-ACK (ACK in FIG. 411)

again. If UE doesn't transmit the previous PUCCH, it is case 3). UE reports the actual HARQ-ACK (ACK in FIG. 11);

In FIG. 12, and otherwise described herein, the number in term P{number} means HARQ process number. As shown in FIG. 12, 1200, since PUCCH_NDI when scheduling HARQ process 4 & 7 is toggled 1240 (0 versus 1), UE can report NACK/DTX for HARQ process 0 & 1 and include actual HARQ-ACK for HARQ process 4 & 7. If UE misses a second PDSCH with HARQ process 1, though UE doesn't know its existence, UE anyway reports NACK/DTX for HARQ process 1 in PUCCH U2. On the other hand, as shown in FIG. 13, 1300, if PUCCH_NDI is not toggled 1340, UE can report actual HARQ-ACK for all 4 HARQ processes.

In one implementation, the above scheme based on PUCCH_NDI can operate on a set of PDSCHs identified with the same set index. The set index can be indicated in DCI. Different set of PDSCHs can be interleaved in time. PUCCH_NDI in DCI for PDSCHs with a different set index operates independently.

In one implementation, a subset of HARQ processes is predefined, preconfigured or configured by RRC, so that UE only reports HARQ-ACK for a subset of HARQ processes to reduce payload size for UCI on PUCCH. A single subset of HARQ processes can be predefined, preconfigured or configured by RRC. Alternatively, multiple subsets of HARQ processes can be predefined, preconfigured or configured by RRC. The subset of HARQ process is explicitly indicated in the triggering DCI. Alternatively, HARQ processes indicated in the triggering DCI implicitly indicate a subset of HARQ process, e.g. this subset contains the HARQ process in the DCI.

In one implementation, a subset of a set of PDSCHs using a set of HARQ processes can include the PDSCHs whose HARQ-ACKs are expected to transmit on the same PUCCH resource for the first time HARQ-ACK feedback. For consecutive subsets, if there is not enough gNB processing time between a PUCCH resource for the first subset(s) and one or more DCIs scheduling PDSCHs in the second subset, gNB can keep PUCCH_NDI unchanged in the above mentioned one or more DCIs. Alternatively, gNB and UE may just neglect the value of PUCCH_NDI in the above mentioned one or more DCIs. The first subset(s) may be strictly a single subset of the set of PDSCHs using the set of HARQ processes, or the first subset(s) can be actually multiple consecutive subsets having the same PUCCH_NDI. PUCCH_NDI in the above one or more DCIs can be different from PUCCH_NDI in the other DCIs of the second subset. PUCCH_NDI in the other DCIs of the second subset is used to determine HARQ-ACK transmission of all HARQ processes in the second subset. If no DCI in the $2^{nd}$ subset other than the above mentioned one or more DCIs is received, PUCCH_NDI in the above mentioned one or more DCIs can be used to determine HARQ-ACK transmission of the second subset. Alternatively, PUCCH_NDI in a later DCI using the set of HARQ processes is used to derive effective PUCCH_NDI of the second subset.

In the above mentioned one or more DCIs, gNB can indicate a valid value of PDSCH-to-HARQ-ACK-timing. If a DCI other than the above mentioned one or more DCIs is received by UE, UE can rely on PUCCH_NDI in the DCI regarding how to treat HARQ-ACK of HARQ processes used by the first subset(s). Otherwise, UE can report NACK/DTX for the HARQ processes used by the first subset(s), or UE can report actual HARQ-ACK for the HARQ processes used by the first subset(s). Alternatively, in the above mentioned one or more DCIs, gNB can set a special value of K1, e.g. no valid PDSCH-to-HARQ-ACK-timing indicated. If UE doesn't receive any other DCI except the above mentioned one or more DCI, there is no valid PDSCH-to-HARQ-ACK-timing to derive a PUCCH resource. HARQ-ACK retransmission relies on future gNB scheduling. Since UE doesn't transmit PUCCH carrying HARQ-ACK for the PDSCHs without valid PDSCH-to-HARQ-ACK-timing, an additional DCI must trigger HARQ-ACK retransmission by scheduling the same set of HARQ processes at a later time. That is, PUCCH_NDI of the later DCI equals to the PUCCH_NDI of the second subset, and also determine whether to retransmit HARQ-ACK for HARQ processes used by the first subset(s).

Figure 14:
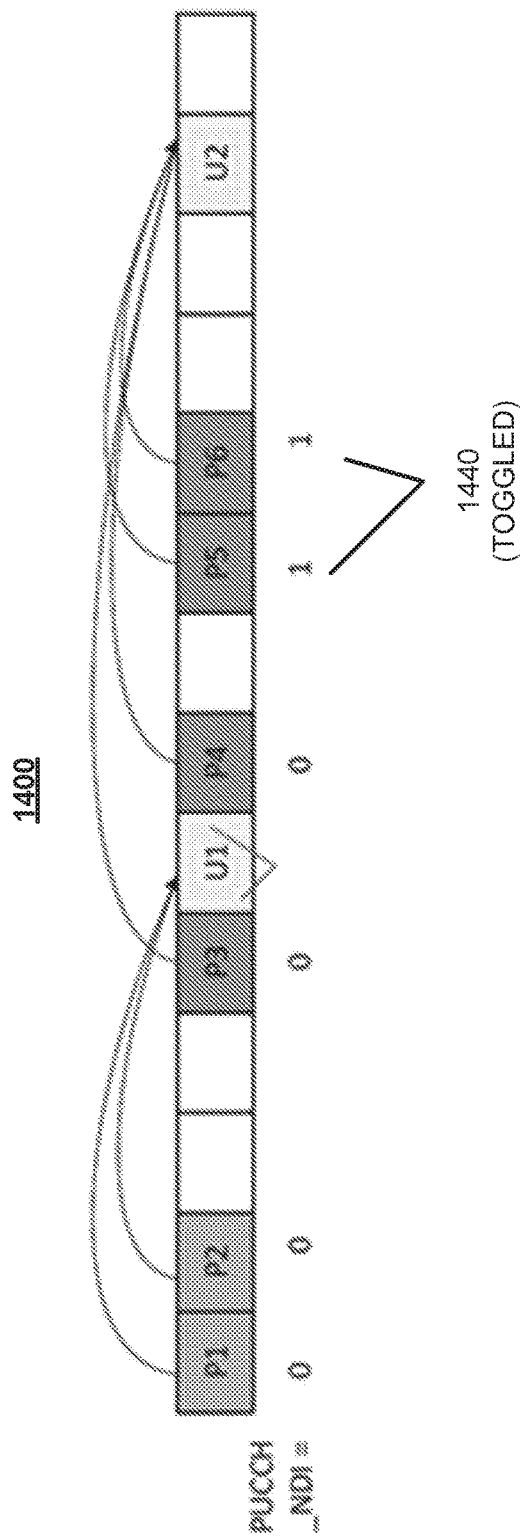
FIG. 14 depicts an illustration representing another example of HARQ-ACK transmission for a set of PDSCHs.
Figure 15:
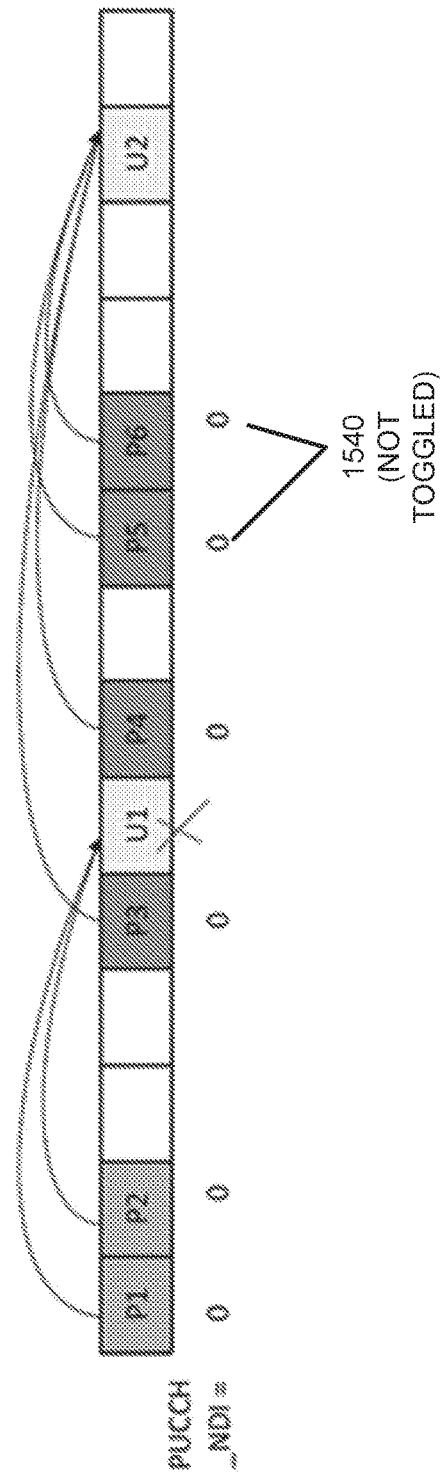
FIG. 15 depicts an illustration representing another example of HARQ-ACK transmission for a set of PDSCHs.

As shown in FIG. 14, 1400, since PUCCH_NDI when scheduling HARQ process 5 & 6 is toggled 1440 (1 versus 0), UE can report NACK/DTX for HARQ process 1 & 2 and include actual HARQ-ACK for HARQ process 3-6. On the other hand, as shown in FIG. 15, 1500, if PUCCH_NDI is not toggled 1540 for DCI scheduling HARQ process 5 & 6, UE can report actual HARQ-ACK for all HARQ processes 1-6.

In one implementation, a subset of HARQ processes is predefined, preconfigured or configured by RRC. In a DCI scheduling a PDSCH, a second HARQ process number is indicated in addition to the HARQ process number used in HARQ soft combining. The second HARQ process number is used in forming a HARQ-ACK codebook. The second HARQ process number can be a separate field, hence, it can be carried in all DCI. Alternatively, the second HARQ process number is only included in some of DCIs. For example, for a DCI without valid PDSCH-to-HARQ-ACK timing, ARI and TPC field is actually useless, and these five bits can be reinterpreted to indicate the second HARQ process number; while for a DCI with valid PDSCH-to-HARQ-ACK timing, the second HARQ process number is not indicated. By this way, though there is restriction on gNB's using a HARQ process, e.g. limited by early (re) transmission status, gNB can transform current used HARQ processes into a subset by setting a proper second HARQ process number, so as to compact HARQ-ACK payload size. In this scheme, gNB cannot manage the HARQ process in the DCI used to indicate PDSCH-to-HARQ-ACK timing, PUCCH resource and TPC. However, gNB can always manage the HARQ process in a DCI without valid PDSCH-to-HARQ-ACK timing.

Figure 16:
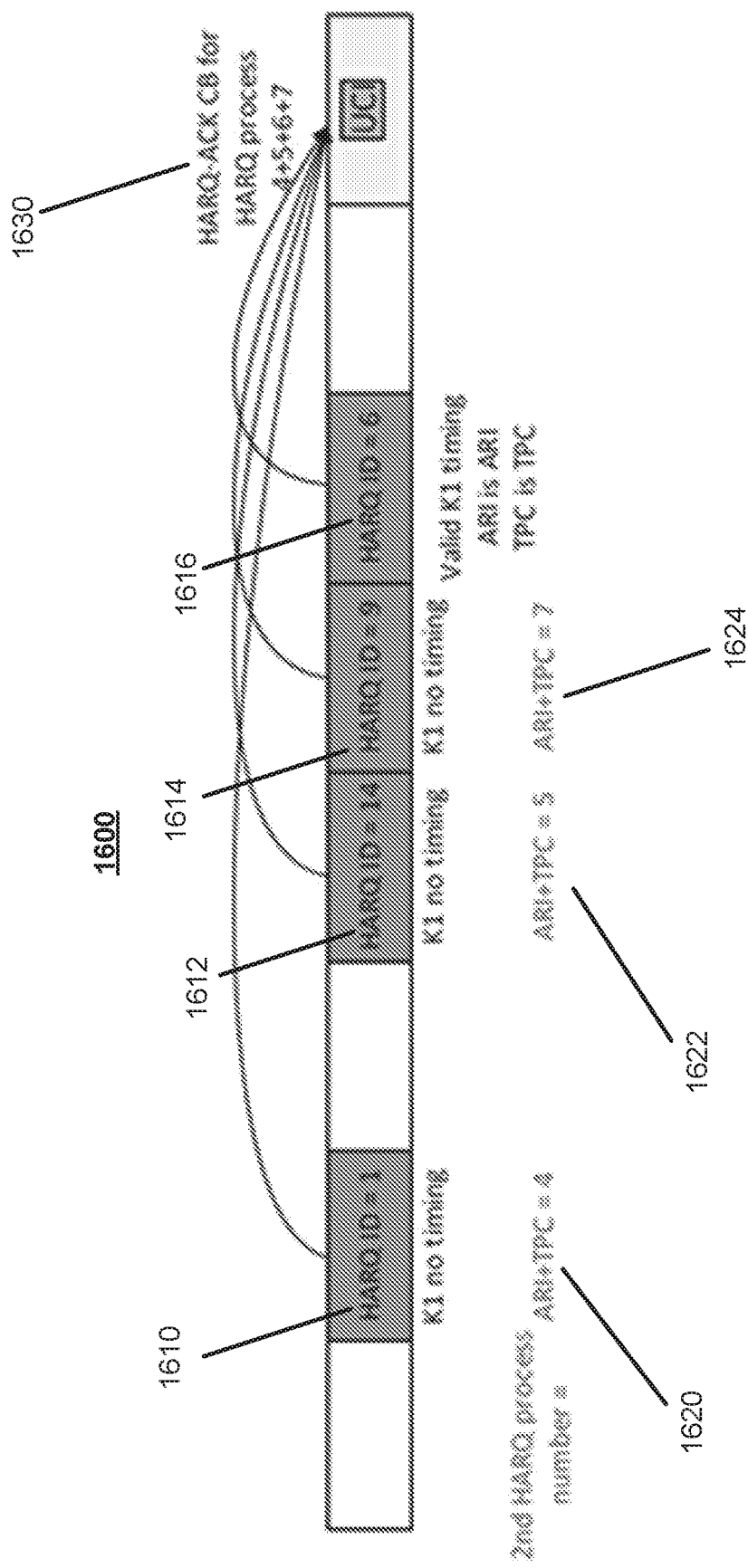
FIG. 16 depicts an illustration representing an example of a use of a second HARQ process number to form a HARQ-ACK codebook.

Assuming maximum 16 HARQ processes are configured, which is divided into 4 subsets, 0~3, 4~7, 8~11, 12~15, HARQ-ACK feedback per subset is transmitted as one PUCCH. As shown in FIG. 16, 1600, assuming gNB has to schedule HARQ process 1 1610, 14 1612, 9 1614, 6 1616 for HARQ soft combining, and assuming gNB wants to pretend subset 4-7. PDSCH scheduled by DCI with HARQ process number=6 is the one with valid K1, hence number 6 cannot be changed. In fact, there is no other field in DCI that can be used to change it to a different HARQ process number. For PDSCH scheduled by DCI with HARQ process number field=1, 14, 9, a second HARQ process number 4 1620, 5 1622, 7 1624 is indicated respectively by reusing ARI & TPC. Finally, a 4-bit HARQ-ACK codebook 420 is formed for HARQ process number 4, 5, 6 and 7.

In one implementation, a field in DCI is to trigger HARQ-ACK transmission for a subset of HARQ processes or all HARQ processes. If it is per subset HARQ-ACK transmission, it can further indicate the subset triggered. For example, as shown in Table 1, assuming 2 bit is used as the trigger, one option is to indicate HARQ-ACK transmission for 16 HARQ processes, HARQ processes 0-7 and HARQ processes 8-15. The remaining code point can indicate HARQ-ACK transmission for HARQ processes 0-3. Another option is to indicate HARQ-ACK transmission for 16 HARQ processes, HARQ processes 0-7, HARQ processes 0-5 and HARQ processes 0-3, assuming HARQ process number can be managed to form a HARQ-ACK codebook, e.g. relying on second HARQ process number as proposed in above implementation.

TABLE 1

| Trigger for subset or full set of HARQ-ACK feedback | | |
|---|---|---|
| code | option | option |
| 00 | 0-15 | 0-15 |
| 01 | 0-7 | 0-7 |
| 10 | 8-15 | 0-5 |
| 11 | 0-3 | 0-3 |

Semi-Static HARQ-ACK Transmission Based on Configured PDSCH-to-HARQ-ACK Timings

Semi-static HARQ-ACK codebook is simply formed based on configured PDSCH-to-HARQ-ACK timings, e.g., the number of HARQ-ACK is same as the possible candidates of PDSCH-to-HARQ-ACK timings, which can be configured by RRC. The semi-static UL-DL-configurations for TDD is used to further reduce the codebook size. In NR-U, it is likely some DCI scheduling a PDSCH may not include valid PDSCH-to-HARQ-ACK timing, which impacts semi-static HARQ-ACK codebook.

Figure 17:
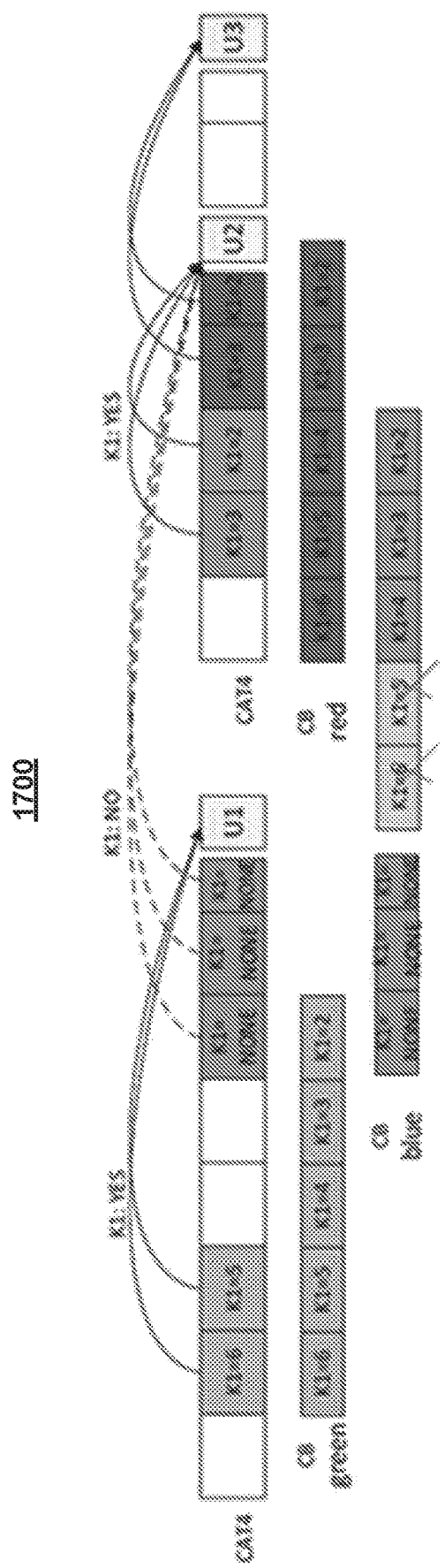
FIG. 17 depicts an illustration representing an example of a semi-static HARQ-ACK codebook considering PDSCHs without PDSCH-to-HARQ-ACK timings.

In one implementation, to account for DCI without valid PDSCH-to-HARQ-ACK timing, HARQ-ACK bits for X slots are always added to the HARQ-ACK codebook derived by valid PDSCH-to-HARQ-ACK timings. X can be configured by RRC, determined based on UE capability, or fixed in the specification. For example, the interval of X slots should be equal to or larger than UE processing time for PDSCH reception, so that UE has time to get HARQ-ACK for all possible PDSCHs located in the ending slots of a previous channel occupation time (COT) in the worst case. HARQ-ACK for the above X slots can be sorted in time, alternatively, C-DAI field can be used to order the HARQ-ACK for the PDSCH in the X slots. For example, for a DCI without valid PDSCH-to-HARQ-ACK timing, ARI and TPC field is actually useless, and these bits can be reinterpreted to indicate C-DAI, so that it doesn't increase the DCI size. As shown in FIG. 17, 1700, HARQ-ACK for 3 slots are added to 5 bit HARQ-ACK codebook derived by valid PDSCH-to-HARQ-ACK timings.

In one implementation, slot format indicator (SFI) signaled by DCI format 2_0 can be used to reduce the codebook size. For a SLIV conflicted with 'U' symbol in SFI, no HARQ-ACK is allocated. In one implementation, if DL or UL BWP switching happens, HARQ-ACK of impacted PDSCH can be removed from the semi-static HARQ-ACK codebook. In one implementation, for a slot outside gNB-initiated COT, no HARQ-ACK is allocated.

Increase Opportunities for HARQ-ACK Transmission

A DCI may schedule a PDSCH or only trigger HARQ-ACK transmission. The DCI will indicate the PUCCH resources used for HARQ-ACK transmission. The DCI can indicate a LBT type used for starting PUCCH transmission. If the indicated PUCCH is inside a COT, one-shot LBT, e.g. 25 us CCA can be used by UE to start PUCCH transmission. If the indicated PUCCH is immediately following a DL transmission within $N_S$ us, e.g. $N_S$ equals to 16, UE can transmit the PUCCH without doing LBT, denoted as LBT CAT-1. If the indicated PUCCH is outside a COT, CAT-4 LBT has to be used by UE to start PUCCH transmission. The DCI can indicate one from the three LBT types used for starting PUCCH transmission, e.g. 2 bits can be signaled in the DCI. Alternatively, UE derives the LBT type to start PUCCH transmission by the DCI and COT sharing information, e.g. slot format information (SFI) by DCI 2_0. To check a PUCCH is within a COT or not, if a 'F' symbol indicated by SFI may mean a period not belonging the COT, condition for the check is that the PUCCH is overlapped with at least one symbol indicated as 'U' symbol by SFI. Alternatively, a PUCCH overlapped with either 'F' symbol and/or 'U' symbol by SFI is considered within a COT.

In one implementation, the DCI can indicate 1-bit information on whether CAT-1 LBT is used. If the 1-bit information indicate the use of CAT-1 LBT, UE uses CAT-1 LBT to start PUCCH transmission. If not, UE checks COT sharing information. If the indicated PUCCH is within a COT, UE uses CAT-2 LBT to start PUCCH transmission; otherwise, CAT-4 LBT is used.

In one implementation, the DCI can indicate 1-bit information to differentiate CAT-1 LBT and CAT-4 LBT. If the 1-bit information indicate the use of CAT-1 LBT, UE uses CAT-1 LBT to start PUCCH transmission. If the 1-bit information indicate the use of CAT-4 LBT, UE checks COT sharing information and derives a LBT type.

In one implementation, if CAT-4 LBT is indicated by the DCI, UE checks COT sharing information and derives a LBT type to start PUCCH transmission. If the indicated PUCCH is within a COT, UE changes LBT to CAT-2 LBT to start PUCCH transmission; otherwise, CAT-4 LBT is used. gNB can indicate the boundary of CAT-1 LBT, e.g. by DCI 2_0 together with the indication of slot format. For example, the boundary can be the start of a symbol. Alternatively, the boundary can be $N_S$ us after the start of a symbol. In this case, if the indicated PUCCH start right from the boundary, UE changes LBT to CAT-1 LBT to start PUCCH transmission; if the indicated PUCCH is within a COT but not start from the boundary, UE changes LBT to CAT-2 LBT to start PUCCH transmission; otherwise, CAT-4 LBT is used. In one implementation, if CAT-2 LBT is indicated by the DCI, and if the indicated PUCCH starts right from the boundary, UE changes LBT to CAT-1 LBT to start PUCCH transmission; otherwise, CAT-2 LBT is used.

In one implementation, there exist multiple DL to UL and UL to DL switching points. Multiple DCI 2_0 can be transmitted to indicate the slot formats. A DCI 2_0 can only indicate one boundary for CAT-1 LBT. Preferably, a DCI 2_0 only indicates the first boundary for CAT-1 LBT at least $N_b$ symbols after the DCI 2_0. $N_b$ is to account for UE processing time, propagation delay and etc. $N_b$ is predefined or configured by RRC signaling. The boundary can be indicated as an offset from the timing of the DCI 2_0. The boundary can be indicated as an offset from the first 'F' symbol after the DCI 2_0. The boundary can be indicated as an offset from the first 'F' or 'U' symbol after the DCI 2_0. The boundary can be indicated as an offset from the first 'F' symbol LBT at least $N_b$ symbols after the DCI 2_0. The boundary can be indicated as an offset from the first 'F' or 'U' symbol LBT at least $N_b$ symbols after the DCI 2_0.

Figure 18:
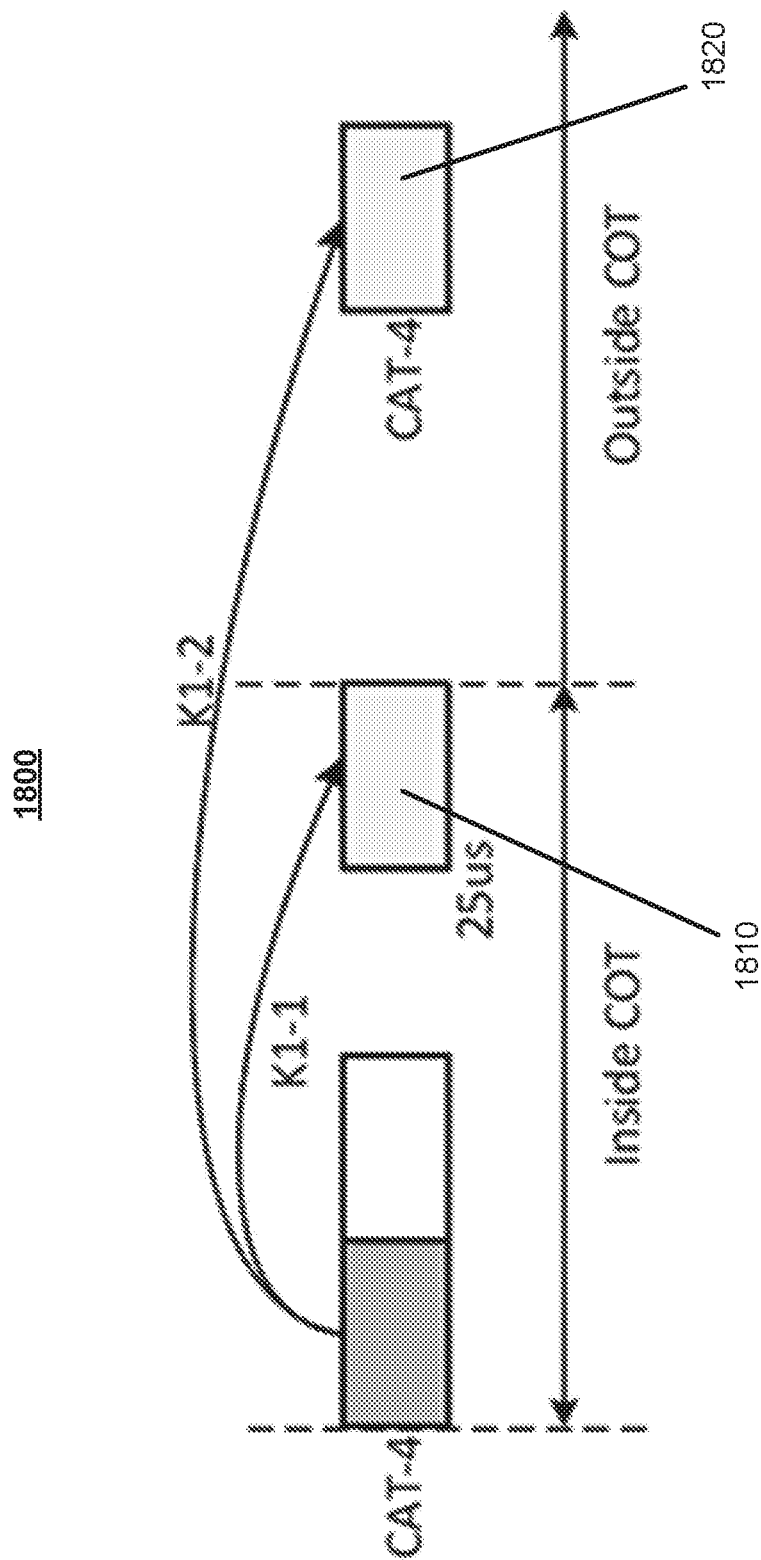
FIG. 18 depicts an illustration representing an example of a different LBT type for multiple K1 values.

To provide more opportunities of PUCCH for the mitigation of LBT failure, a DCI can indicate multiple values of K1 for PDSCH-to-HARQ-ACK timings, so that multiple PUCCH resources for HARQ-ACK transmission can be indicated by the DCI. In one implementation, the same LBT types applies to all PUCCHs corresponding to the multiple values of K1. In one implementation, UE needs to individually derive the LBT type applies to each PUCCH corresponding to the multiple values of K1. As shown in FIG. 18, 1800, the first PUCCH 1810 of the two PUCCHs 1810, 1820 indicated by the DCI is within a COT and use CAT-2 LBT. While, the second PUCCH 1820 of the two PUCCHs 1810, 1820 indicated by the DCI is outside the COT and use CAT-4 LBT.

Group Triggering HARQ-ACK Transmission and Retransmission

Figure 19:
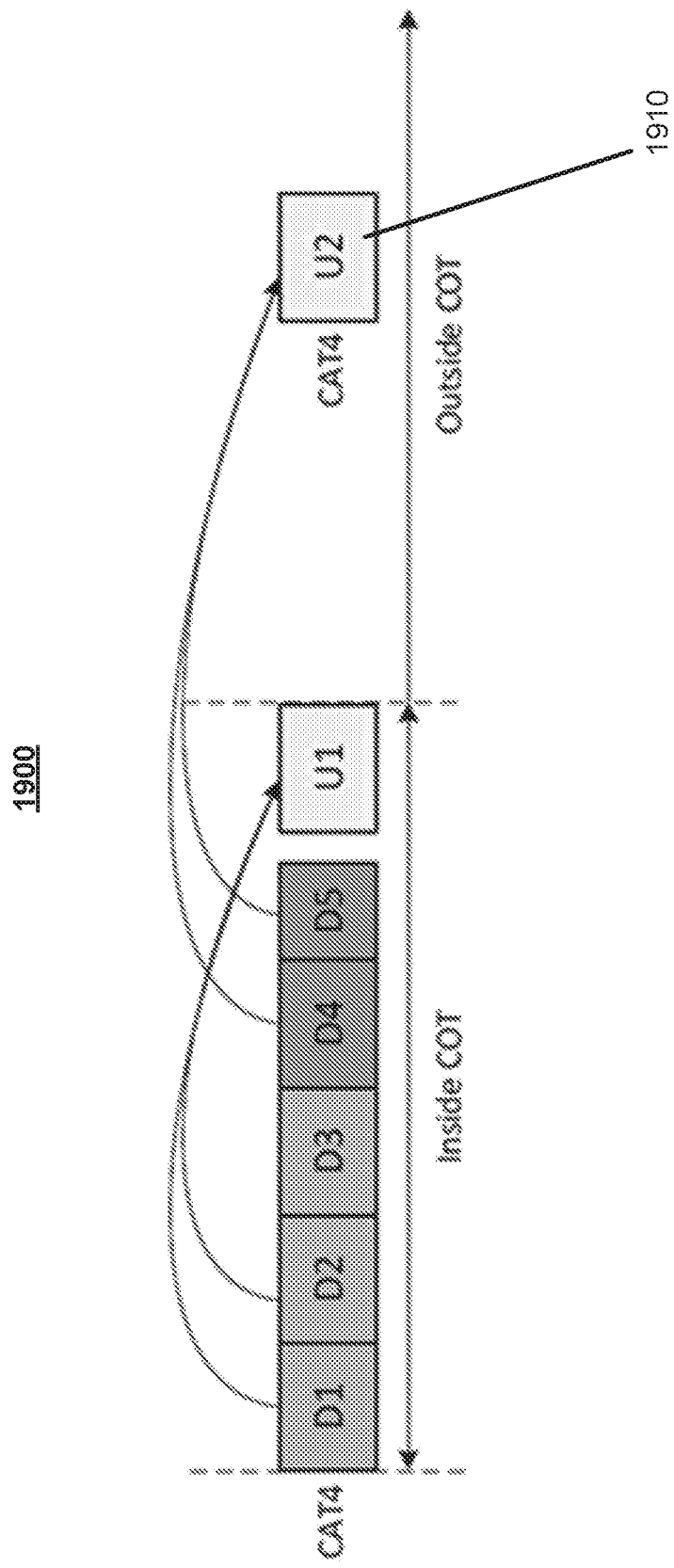
FIG. 19 depicts an illustration representing an example of a CAT-4 LBT used outside COT.

The HARQ-ACK for a PDSCH scheduled in a COT may not be able to transmit in the same COT. As shown in FIG. 19, 1900, this is caused by the limitation of UE processing time and/or propagation delay, etc. In this case, CAT-4 LBT can be used to start the PUCCH transmission carrying HARQ-ACK. However, it is general understanding that CAT-4 LBT may fails right before the PUCCH resource due to the channel contention from other devices. Methods to increase the probability for PUCCH transmission can be considered.

In one implementation, if the indicated PUCCH is inside a COT, the DCI only indicates a single value of K1 for PDSCH-to-HARQ-ACK timing, e.g. a single PUCCH is indicated. Otherwise, the DCI can indicate multiple values of K1 for PDSCH-to-HARQ-ACK timings, e.g. multiple PUCCHs are indicated with CAT-4, which increases the channel access opportunities.

To provide more opportunities of PUCCH for the mitigation of LBT failure, if gNB can initiate a second COT before the previously indicated PUCCH 1910 using CAT-4 LBT and share the second COT to UE, UE can change LBT type of U2 1910 from CAT-4 to CAT-1 or CAT-2. In one implementation, if the indicated PUCCH is within the $2^{nd}$ COT, UE changes LBT to CAT-2 LBT to start PUCCH transmission; otherwise, CAT-4 LBT is used. In one implementation, if the indicated PUCCH start right from the boundary of CAT-1 LBT, UE changes LBT to CAT-1 LBT to start PUCCH transmission; if the indicated PUCCH is within a COT but not start from the boundary, UE changes LBT to CAT-2 LBT to start PUCCH transmission; otherwise, CAT-4 LBT is used.

It is possible that, when gNB initiates a second COT, there is not enough time to share COT to a previous indicated PUCCH. Further, when gNB initiates a second COT, it is possible that the start timing of the second COT is even after the previous indicated PUCCH. In the slot carrying the previous indicated PUCCH, typically multiple PUCCHs for HARQ-ACK transmissions of different UEs are multiplexed in the slot. Due to the contention of other devices, it is possible one or multiple UEs fail in CAT-4 LBT hence the PUCCHs are dropped. To save overhead in triggering HARQ-ACK retransmission, it is beneficial that gNB can trigger the above one or multiple UEs failed in LBT for PUCCH by a group-triggering DCI (GT-DCI). DT-DCI can be DCI 2_0 which indicates slot formats and acts as a group trigger. GT-DCI can be another DCI just acting as a group trigger. The same PUCCH frequency resource as the previous indicated PUCCH for a UE can still be allocated to the UE. One issue is to determine the time resource of the new PUCCH.

In one implementation, a time offset is indicated by the GT-DCI. For a group of UEs fail in PUCCH transmission with CAT-4 LBT derived by the previous indicated PDSCH-to-HARQ-timing K1, timing of the new PUCCH is then derived by K1 and the time offset Δ. E.g. slot timing of the new PUCCH is K1+A. If the new PUCCH resource in slot K1+A is overlapped with 'F' symbol and/or 'U' symbol by SFI, UE can actually transmit the PUCCH. One special value of the offset field can be used to indicate that grouping triggering is disabled. For the group of UEs, CAT-2 LBT can be used to start new PUCCH transmissions. Alternatively, assuming DCI 2_0 of the $2^{nd}$ COT indicates the boundary of CAT-1 LBT, for the group of UEs, if the indicated PUCCH of a UE start right from the boundary of CAT-1 LBT, the UE changes LBT to CAT-1 LBT to start PUCCH transmission; otherwise, CAT-2 LBT is used.

Figure 20:
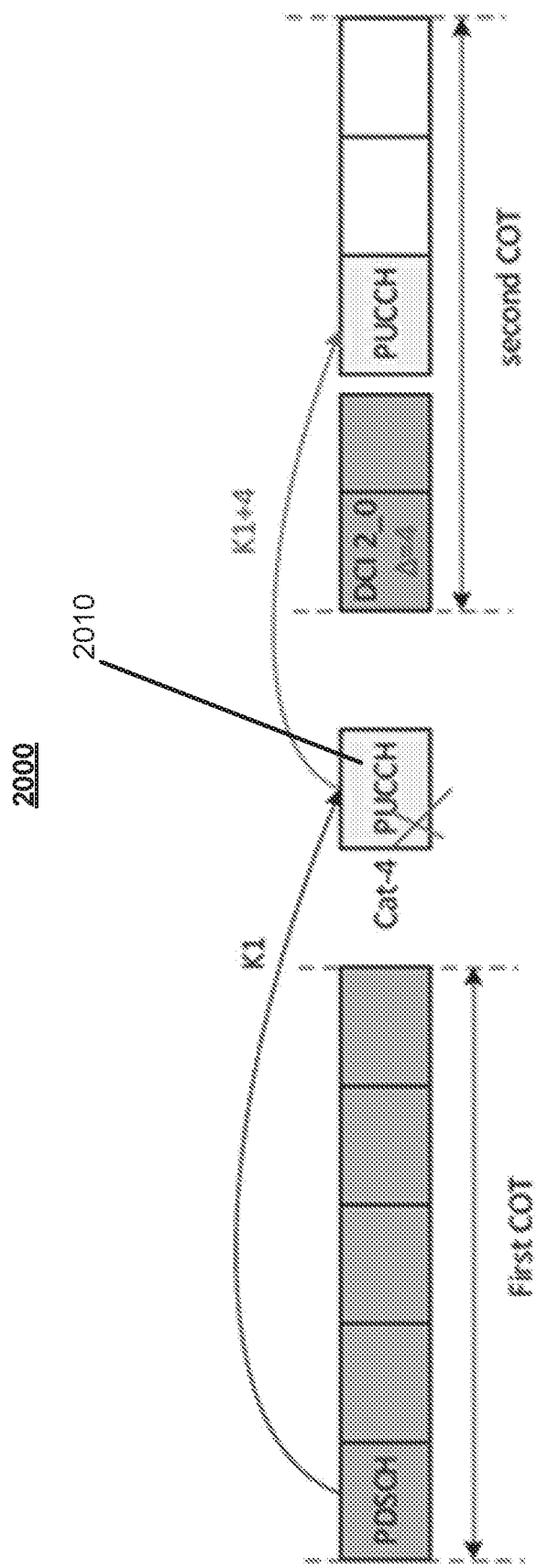
FIG. 20 depicts an illustration representing an example of a group triggering HARQ-ACK retransmission.

As shown in FIG. 20, 2000, a UE is allocated a previous PUCCH resource 2010 following PDSCH-to-HARQ-timing K1, but fails in PUCCH transmission (illustrated using an X on elements 2010). After receiving DCI 2_0 in the $2^{nd}$ COT which indicate an offset 4, UE checks and know slot corresponding to slot K1+4 is a valid uplink in the second COT. Therefore, UE can transmit PUCCH with CAT-1 or CAT-2 LBT in slot K1+4 in the same PUCCH frequency resource as the previous PUCCH.

Figure 21:
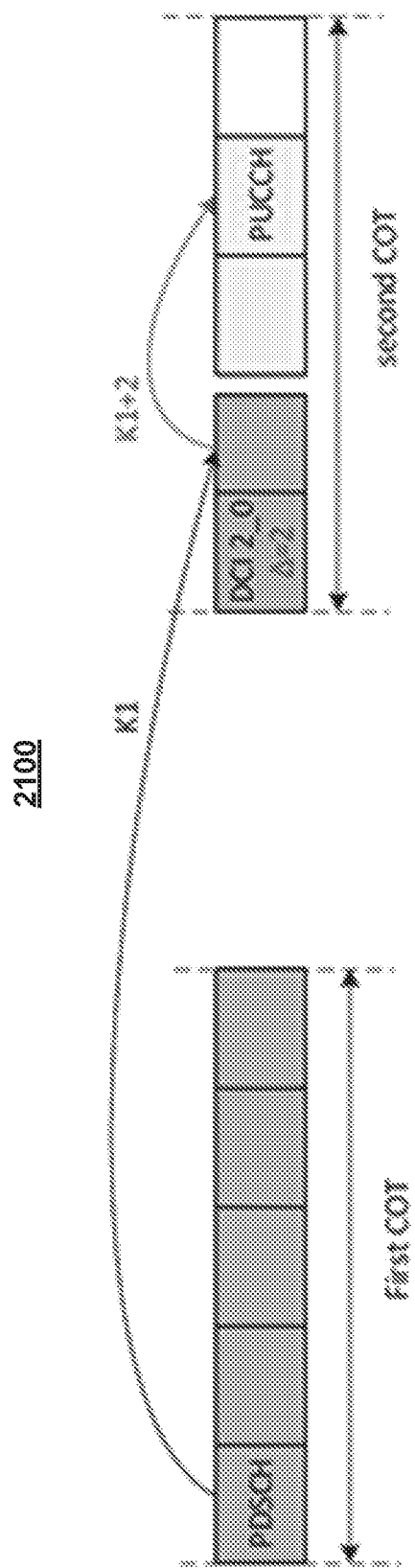
FIG. 21 depicts an illustration representing another example of a group triggering HARQ-ACK retransmission.

As shown in FIG. 21, 2100, a UE is allocated a previous PUCCH resource following PDSCH-to-HARQ-timing K1. gNB initiates a second COT and transmits DL transmissions in the beginning slot(s), which blocks the LBT operation for the previous PUCCH at UE. In fact, after decoding of DCI 2_0 in the $2^{nd}$ COT which indicates an offset 2, UE checks and know slot corresponding to slot K1+2 is a valid uplink. Therefore, UE can know that gNB intentionally shifts the previous PUCCH to a new time position. UE transmits PUCCH with CAT-1 or CAT-2 LBT in slot K1+2 in the same PUCCH frequency resource as the previous PUCCH resource.

Systems and System Components

Figure 22:
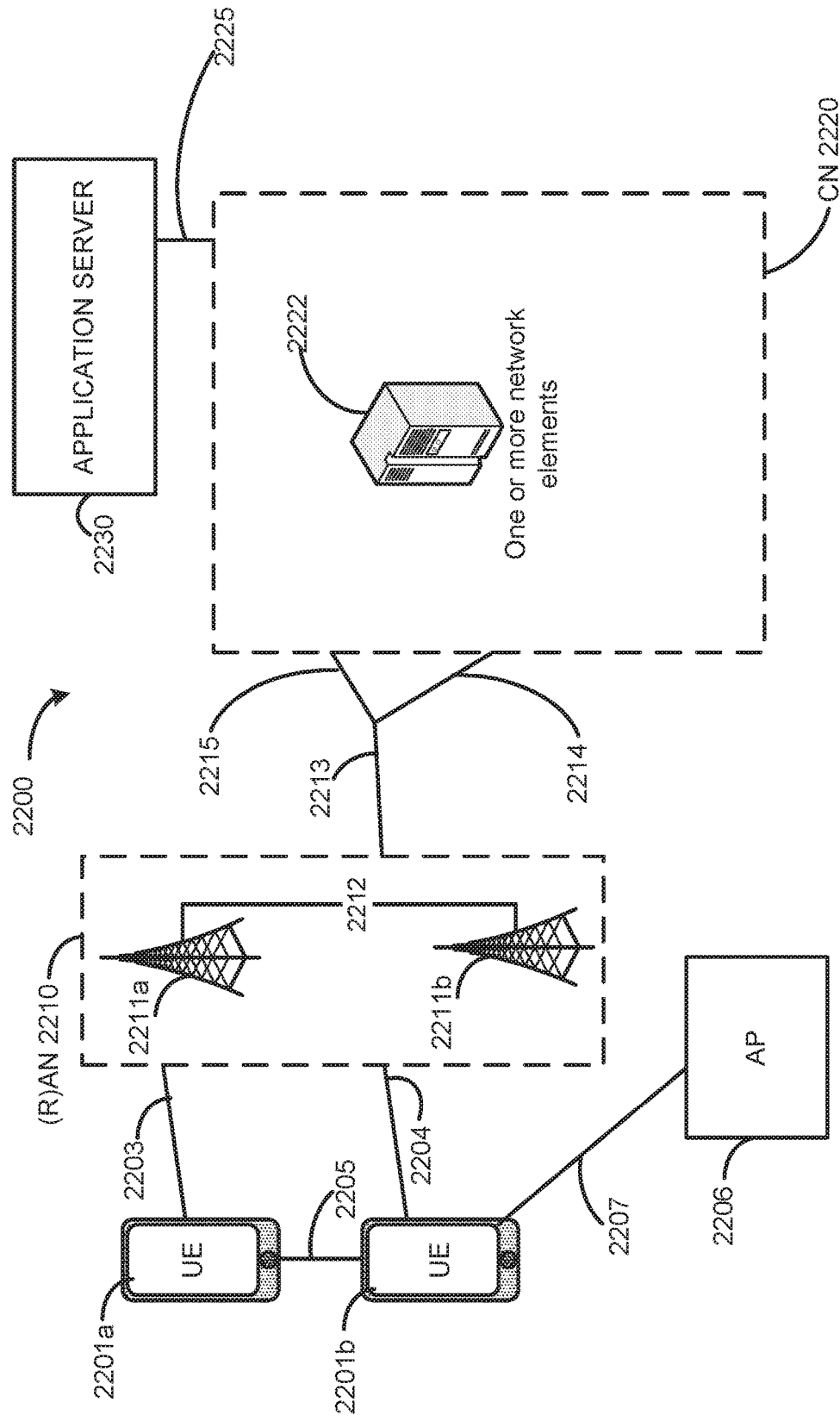
FIG. 22 illustrates an example architecture of a system of a network.

FIG. 22 illustrates an example of a wireless communication system 2200. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 2200 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 2200 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 22, the system 2200 includes UE 2201a and UE 2201b (collectively referred to as "UEs 2201" or "UE 2201"). In this example, UEs 2201 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some implementations, any of the UEs 2201 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 2201 may be configured to connect, for example, communicatively couple, with RAN 2210. In implementations, the RAN 2210 may be an NG RAN or a 5G RAN, an E-UTRAN, or a legacy RAN, such as a UTRAN or GERAN. As used herein, the term "NG RAN" or the like may refer to a RAN 2210 that operates in an NR or 5G system 2200, and the term "E-UTRAN" or the like may refer to a RAN 2210 that operates in an LTE or 4G system 2200. The UEs 2201 utilize connections (or channels) 2203 and 2204, respectively, each of which comprises a physical communications interface or layer (discussed in further detail below).

In this example, the connections 2203 and 2204 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UEs 2201 may directly exchange communication data via a ProSe interface 2205. The ProSe interface 2205 may alternatively be referred to as a SL interface 2205 and may comprise one or more logical channels, including but not limited to a PSCCH, a PSSCH, a PSDCH, and a PSBCH.

The UE 2201b is shown to be configured to access an AP 2206 (also referred to as "WLAN node 2206," "WLAN 2206," "WLAN Termination 2206," "WT 2206" or the like) via connection 2207. The connection 2207 can comprise a local wireless connection, such as a connection consistent with any IEEE 802.11 protocol, wherein the AP 2206 would comprise a wireless fidelity (Wi-Fi®) router. In this example, the AP 2206 is shown to be connected to the Internet without connecting to the core network of the wireless system (described in further detail below). In various implementations, the UE 2201b, RAN 2210, and AP 2206 may be configured to utilize LWA operation and/or LWIP operation. The LWA operation may involve the UE 2201b in RRC_CONNECTED being configured by a RAN node 2211a-b to utilize radio resources of LTE and WLAN. LWIP operation may involve the UE 2201b using WLAN radio resources (e.g., connection 2207) via IPsec protocol tunneling to authenticate and encrypt packets (e.g., IP packets) sent over the connection 2207. IPsec tunneling may include encapsulating the entirety of original IP packets and adding a new packet header, thereby protecting the original header of the IP packets.

The RAN 2210 can include one or more AN nodes or RAN nodes 2211a and 2211b (collectively referred to as "RAN nodes 2211" or "RAN node 2211") that enable the connections 2203 and 2204. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 2211 that operates in an NR or 5G system 2200 (for example, a gNB), and the term "E-UTRAN node" or the like may refer to a RAN node 2211 that operates in an LTE or 4G system 2200 (e.g., an eNB). According to various implementations, the RAN nodes 2211 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the RAN nodes 2211 may be implemented as one or more software entities running on server computers as part of a virtual network, which may be referred to as a CRAN and/or a virtual baseband unit pool (vBBUP). In these implementations, the CRAN or vBBUP may implement a RAN function split, such as a PDCP split wherein RRC and PDCP layers are operated by the CRAN/vBBUP and other L2 protocol entities are operated by individual RAN nodes 2211; a MAC/PHY split wherein RRC, PDCP, RLC, and MAC layers are operated by the CRAN/vBBUP and the PHY layer is operated by individual RAN nodes 2211; or a "lower PHY" split wherein RRC, PDCP, RLC, MAC layers and upper portions of the PHY layer are operated by the CRAN/vBBUP and lower portions of the PHY layer are operated by individual RAN nodes 2211. This virtualized framework allows the freed-up processor cores of the RAN nodes 2211 to perform other virtualized applications. In some implementations, an individual RAN node 2211 may represent individual gNB-DUs that are connected to a gNB-CU via individual F1 interfaces (not shown by FIG. 22). In these implementations, the gNB-DUs may include one or more remote radio heads or RFEMs (see, e.g., FIG. 25), and the gNB-CU may be operated by a server that is located in the RAN 2210 (not shown) or by a server pool in a similar manner as the CRAN/vBBUP. Additionally or alternatively, one or more of the RAN nodes 2211 may be next generation eNBs (ng-eNBs), which are RAN nodes that provide E-UTRA user plane and control plane protocol terminations toward the UEs 2201, and are connected to a 5GC (e.g., CN 2420 of FIG. 24) via an NG interface (discussed infra).

In V2X scenarios one or more of the RAN nodes 2211 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 2201 (vUEs 2201). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 2211 can terminate the air interface protocol and can be the first point of contact for the UEs 2201. In some implementations, any of the RAN nodes 2211 can fulfill various logical functions for the RAN 2210 including, but not limited to, radio network controller (RNC) functions such as radio bearer management, uplink and downlink dynamic radio resource management and data packet scheduling, and mobility management.

In implementations, the UEs 2201 can be configured to communicate using OFDM communication signals with each other or with any of the RAN nodes 2211 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the implementations is not limited in this respect. The OFDM signals can comprise a plurality of orthogonal subcarriers.

In some implementations, a downlink resource grid can be used for downlink transmissions from any of the RAN nodes 2211 to the UEs 2201, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various implementations, the UEs 2201 and the RAN nodes 2211 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 2201 and the RAN nodes 2211 may operate using LAA, eLAA, and/or feLAA mechanisms. In these implementations, the UEs 2201 and the RAN nodes 2211 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 2201 RAN nodes 2211, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 2201, AP 2206, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 2201 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 2201. The PDCCH carries information about the transport format and resource allocations related to the PDSCH channel, among other things. It may also inform the UEs 2201 about the transport format, resource allocation, and HARQ information related to the uplink shared channel. Typically, downlink scheduling (assigning control and shared channel resource blocks to the UE 2201b within a cell) may be performed at any of the RAN nodes 2211 based on channel quality information fed back from any of the UEs 2201. The downlink resource assignment information may be sent on the PDCCH used for (e.g., assigned to) each of the UEs 2201.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some implementations may use concepts for resource allocation for control channel information that are an extension of the above-described concepts. For example, some implementations may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 2211 may be configured to communicate with one another via interface 2212. In implementations where the system 2200 is an LTE system (e.g., when CN 2220 is an EPC 2320 as in FIG. 23), the interface 2212 may be an X2 interface 2212. The X2 interface may be defined between two or more RAN nodes 2211 (e.g., two or more eNBs and the like) that connect to EPC 2220, and/or between two eNBs connecting to EPC 2220. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 2201 from an SeNB for user data; information of PDCP PDUs that were not delivered to a UE 2201; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In implementations where the system 2200 is a 5G or NR system (e.g., when CN 2220 is an 5GC 2420 as in FIG. 24), the interface 2212 may be an Xn interface 2212. The Xn interface is defined between two or more RAN nodes 2211 (e.g., two or more gNBs and the like) that connect to 5GC 2220, between a RAN node 2211 (e.g., a gNB) connecting to 5GC 2220 and an eNB, and/or between two eNBs connecting to 5GC 2220. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 2201 in a connected mode (e.g., CM-CONNECTED) including functionality to manage the UE mobility for connected mode between one or more RAN nodes 2211. The mobility support may include context transfer from an old (source) serving RAN node 2211 to new (target) serving RAN node 2211; and control of user plane tunnels between old (source) serving RAN node 2211 to new (target) serving RAN node 2211. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 2210 is shown to be communicatively coupled to a core network—in this implementation, core network (CN) 2220. The CN 2220 may comprise a plurality of network elements 2222, which are configured to offer various data and telecommunications services to customers/subscribers (e.g., users of UEs 2201) who are connected to the CN 2220 via the RAN 2210. The components of the CN 2220 may be implemented in one physical node or separate physical nodes including components to read and execute instructions from a machine-readable or computer-readable medium (e.g., a non-transitory machine-readable storage medium). In some implementations, NFV may be utilized to virtualize any or all of the above-described network node functions via executable instructions stored in one or more computer-readable storage mediums (described in further detail below). A logical instantiation of the CN 2220 may be referred to as a network slice, and a logical instantiation of a portion of the CN 2220 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 2230 may be an element offering applications that use IP bearer resources with the core network (e.g., UMTS PS domain, LTE PS data services, etc.). The application server 2230 can also be configured to support one or more communication services (e.g., VoIP sessions, PTT sessions, group communication sessions, social networking services, etc.) for the UEs 2201 via the EPC 2220.

In implementations, the CN 2220 may be a 5GC (referred to as "5GC 2220" or the like), and the RAN 2210 may be connected with the CN 2220 via an NG interface 2213. In implementations, the NG interface 2213 may be split into two parts, an NG user plane (NG-U) interface 2214, which carries traffic data between the RAN nodes 2211 and a UPF, and the SI control plane (NG-C) interface 2215, which is a signaling interface between the RAN nodes 2211 and AMFs. Implementations where the CN 2220 is a 5GC 2220 are discussed in more detail with regard to FIG. 24.

In implementations, the CN 2220 may be a 5G CN (referred to as "5GC 2220" or the like), while in other implementations, the CN 2220 may be an EPC). Where CN 2220 is an EPC (referred to as "EPC 2220" or the like), the RAN 2210 may be connected with the CN 2220 via an S1 interface 2213. In implementations, the S1 interface 2213 may be split into two parts, an S1 user plane (S1-U) interface 2214, which carries traffic data between the RAN nodes 2211 and the S-GW, and the S1-MME interface 2215, which is a signaling interface between the RAN nodes 2211 and MMEs.

Figure 23:
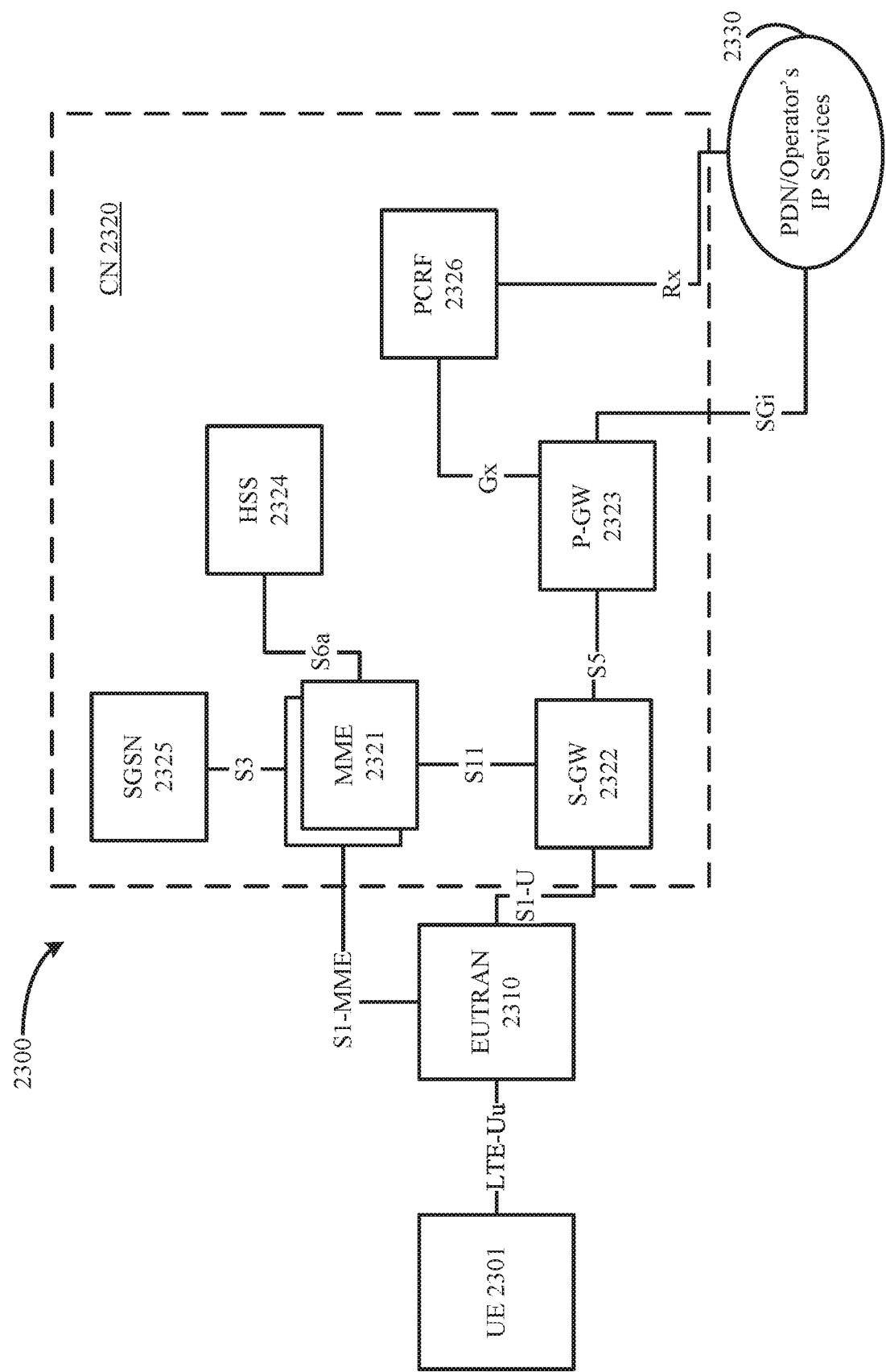
FIG. 23 illustrates an example architecture of a system including a first CN.

FIG. 23 illustrates an example architecture of a system 2300 including a first CN 2320, in accordance with various implementations. In this example, system 2300 may implement the LTE standard wherein the CN 2320 is an EPC 2320 that corresponds with CN 2220 of FIG. 22. Additionally, the UE 2301 may be the same or similar as the UEs 2201 of FIG. 22, and the E-UTRAN 2310 may be a RAN that is the same or similar to the RAN 2210 of FIG. 22, and which may include RAN nodes 2211 discussed previously. The CN 2320 may comprise MMEs 2321, an S-GW 2322, a P-GW 2323, a HSS 2324, and a SGSN 2325.

The MMEs 2321 may be similar in function to the control plane of legacy SGSN, and may implement MM functions to keep track of the current location of a UE 2301. The MMEs 2321 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. That are used to maintain knowledge about a present location of the UE 2301, provide user identity confidentiality, and/or perform other like services to users/subscribers. Each UE 2301 and the MME 2321 may include an MM or EMM sublayer, and an MM context may be established in the UE 2301 and the MME 2321 when an attach procedure is successfully completed. The MM context may be a data structure or database object that stores MM-related information of the UE 2301. The MMEs 2321 may be coupled with the HSS 2324 via an S6a reference point, coupled with the SGSN 2325 via an S3 reference point, and coupled with the S-GW 2322 via an S11 reference point.

The SGSN 2325 may be a node that serves the UE 2301 by tracking the location of an individual UE 2301 and performing security functions. In addition, the SGSN 2325 may perform Inter-EPC node signaling for mobility between 2G/3G and E-UTRAN 3GPP access networks: PDN and S-GW selection as specified by the MMEs 2321; handling of UE 2301 time zone functions as specified by the MMEs 2321; and MME selection for handovers to E-UTRAN 3GPP access network. The S3 reference point between the MMEs 2321 and the SGSN 2325 may enable user and bearer information exchange for inter-3GPP access network mobility in idle and/or active states.

The HSS 2324 may comprise a database for network users, including subscription-related information to support the network entities' handling of communication sessions. The EPC 2320 may comprise one or several HSSs 2324, depending on the number of mobile subscribers, on the capacity of the equipment, on the organization of the network, etc. For example, the HSS 2324 can provide support for routing/roaming, authentication, authorization, naming/addressing resolution, location dependencies, etc. An S6a reference point between the HSS 2324 and the MMEs 2321 may enable transfer of subscription and authentication data for authenticating/authorizing user access to the EPC 2320 between HSS 2324 and the MMEs 2321.

The S-GW 2322 may terminate the S1 interface 2213 ("SI-U" in FIG. 23) toward the RAN 2310, and routes data packets between the RAN 2310 and the EPC 2320. In addition, the S-GW 2322 may be a local mobility anchor point for inter-RAN node handovers and also may provide an anchor for inter-3GPP mobility. Other responsibilities may include lawful intercept, charging, and some policy enforcement. The S11 reference point between the S-GW 2322 and the MMEs 2321 may provide a control plane between the MMEs 2321 and the S-GW 2322. The S-GW 2322 may be coupled with the P-GW 2323 via an S5 reference point.

The P-GW 2323 may terminate an SGi interface toward a PDN 2330. The P-GW 2323 may route data packets between the EPC 2320 and external networks such as a network including the application server 2230 (alternatively referred to as an "AF") via an IP interface 2225 (see e.g., FIG. 22). In implementations, the P-GW 2323 may be communicatively coupled to an application server (application server 2230 of FIG. 22 or PDN 2330 in FIG. 23) via an IP communications interface 2225 (see, e.g., FIG. 22). The S5 reference point between the P-GW 2323 and the S-GW 2322 may provide user plane tunneling and tunnel management between the P-GW 2323 and the S-GW 2322. The S5 reference point may also be used for S-GW 2322 relocation due to UE 2301 mobility and if the S-GW 2322 needs to connect to a non-collocated P-GW 2323 for the required PDN connectivity. The P-GW 2323 may further include a node for policy enforcement and charging data collection (e.g., PCEF (not shown)). Additionally, the SGi reference point between the P-GW 2323 and the packet data network (PDN) 2330 may be an operator external public, a private PDN, or an intra operator packet data network, for example, for provision of IMS services. The P-GW 2323 may be coupled with a PCRF 2326 via a Gx reference point.

PCRF 2326 is the policy and charging control element of the EPC 2320. In a non-roaming scenario, there may be a single PCRF 2326 in the Home Public Land Mobile Network (HPLMN) associated with a UE 2301's Internet Protocol Connectivity Access Network (IP-CAN) session. In a roaming scenario with local breakout of traffic, there may be two PCRFs associated with a UE 2301's IP-CAN session, a Home PCRF (H-PCRF) within an HPLMN and a Visited PCRF (V-PCRF) within a Visited Public Land Mobile Network (VPLMN). The PCRF 2326 may be communicatively coupled to the application server 2330 via the P-GW 2323. The application server 2330 may signal the PCRF 2326 to indicate a new service flow and select the appropriate QoS and charging parameters. The PCRF 2326 may provision this rule into a PCEF (not shown) with the appropriate TFT and QCI, which commences the QoS and charging as specified by the application server 2330. The Gx reference point between the PCRF 2326 and the P-GW 2323 may allow for the transfer of QoS policy and charging rules from the PCRF 2326 to PCEF in the P-GW 2323. An Rx reference point may reside between the PDN 2330 (or "AF 2330") and the PCRF 2326.

Figure 24:
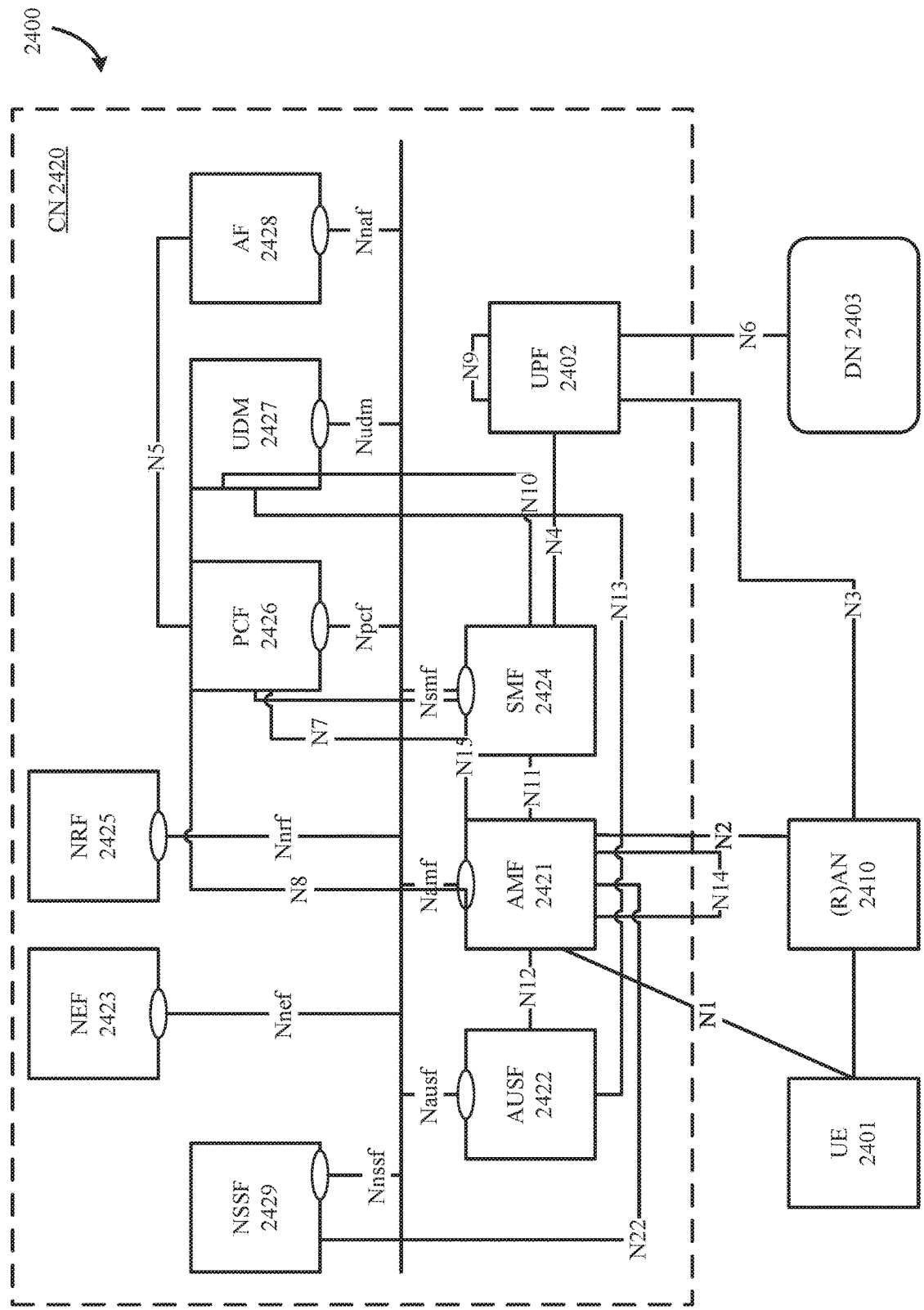
FIG. 24 illustrates an architecture of a system including a second CN.

FIG. 24 illustrates an architecture of a system 2400 including a second CN 2420 in accordance with various implementations. The system 2400 is shown to include a UE 2401, which may be the same or similar to the UEs 2201 and UE 2301 discussed previously; a (R)AN 2410, which may be the same or similar to the RAN 2210 and RAN 2310 discussed previously, and which may include RAN nodes 2211 discussed previously; and a DN 2403, which may be, for example, operator services, Internet access or 3rd party services, and a 5GC 2420. The 5GC 2420 may include an AUSF 2422; an AMF 2421; a SMF 2424; a NEF 2423; a PCF 2426; a NRF 2425; a UDM 2427; an AF 2428; a UPF 2402; and a NSSF 2429.

The UPF 2402 may act as an anchor point for intra-RAT and inter-RAT mobility, an external PDU session point of interconnect to DN 2403, and a branching point to support multi-homed PDU session. The UPF 2402 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 2402 may include an uplink classifier to support routing traffic flows to a data network. The DN 2403 may represent various network operator services, Internet access, or third party services. DN 2403 may include, or be similar to, application server 2230 discussed previously. The UPF 2402 may interact with the SMF 2424 via an N4 reference point between the SMF 2424 and the UPF 2402.

The AUSF 2422 may store data for authentication of UE 2401 and handle authentication-related functionality. The AUSF 2422 may facilitate a common authentication framework for various access types. The AUSF 2422 may communicate with the AMF 2421 via an N12 reference point between the AMF 2421 and the AUSF 2422; and may communicate with the UDM 2427 via an N13 reference point between the UDM 2427 and the AUSF 2422. Additionally, the AUSF 2422 may exhibit an Nausf service-based interface.

The AMF 2421 may be responsible for registration management (e.g., for registering UE 2401, etc.), connection management, reachability management, mobility management, and lawful interception of AMF-related events, and access authentication and authorization. The AMF 2421 may be a termination point for the N11 reference point between the AMF 2421 and the SMF 2424. The AMF 2421 may provide transport for SM messages between the UE 2401 and the SMF 2424, and act as a transparent proxy for routing SM messages. AMF 2421 may also provide transport for SMS messages between UE 2401 and an SMSF (not shown by FIG. 24). AMF 2421 may act as SEAF, which may include interaction with the AUSF 2422 and the UE 2401, receipt of an intermediate key that was established as a result of the UE 2401 authentication process. Where USIM based authentication is used, the AMF 2421 may retrieve the security material from the AUSF 2422. AMF 2421 may also include a SCM function, which receives a key from the SEA that it uses to derive access-network specific keys. Furthermore, AMF 2421 may be a termination point of a RAN CP interface, which may include or be an N2 reference point between the (R)AN 2410 and the AMF 2421; and the AMF 2421 may be a termination point of NAS (N1) signaling, and perform NAS ciphering and integrity protection.

AMF 2421 may also support NAS signaling with a UE 2401 over an N3 IWF interface. The N3IWF may be used to provide access to untrusted entities. N3IWF may be a termination point for the N2 interface between the (R)AN 2410 and the AMF 2421 for the control plane, and may be a termination point for the N3 reference point between the (R)AN 2410 and the UPF 2402 for the user plane. As such, the AMF 2421 may handle N2 signaling from the SMF 2424 and the AMF 2421 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 2401 and AMF 2421 via an N1 reference point between the UE 2401 and the AMF 2421, and relay uplink and downlink user-plane packets between the UE 2401 and UPF 2402. The N3IWF also provides mechanisms for IPsec tunnel establishment with the UE 2401. The AMF 2421 may exhibit an Namf service-based interface, and may be a termination point for an N14 reference point between two AMFs 2421 and an N17 reference point between the AMF 2421 and a 5G-EIR (not shown by FIG. 24).

The UE 2401 may need to register with the AMF 2421 in order to receive network services. RM is used to register or deregister the UE 2401 with the network (e.g., AMF 2421), and establish a UE context in the network (e.g., AMF 2421). The UE 2401 may operate in an RM-REGISTERED state or an RM-DEREGISTERED state. In the RM DEREGISTERED state, the UE 2401 is not registered with the network, and the UE context in AMF 2421 holds no valid location or routing information for the UE 2401 so the UE 2401 is not reachable by the AMF 2421. In the RM REGISTERED state, the UE 2401 is registered with the network, and the UE context in AMF 2421 may hold a valid location or routing information for the UE 2401 so the UE 2401 is reachable by the AMF 2421. In the RM-REGISTERED state, the UE 2401 may perform mobility Registration Update procedures, perform periodic Registration Update procedures triggered by expiration of the periodic update timer (e.g., to notify the network that the UE 2401 is still active), and perform a Registration Update procedure to update UE capability information or to re-negotiate protocol parameters with the network, among others.

The AMF 2421 may store one or more RM contexts for the UE 2401, where each RM context is associated with a specific access to the network. The RM context may be a data structure, database object, etc. That indicates or stores, inter alia, a registration state per access type and the periodic update timer. The AMF 2421 may also store a 5GC MM context that may be the same or similar to the (E)MM context discussed previously. In various implementations, the AMF 2421 may store a CE mode B Restriction parameter of the UE 2401 in an associated MM context or RM context. The AMF 2421 may also derive the value, when needed, from the UE's usage setting parameter already stored in the UE context (and/or MM/RM context).

CM may be used to establish and release a signaling connection between the UE 2401 and the AMF 2421 over the N1 interface. The signaling connection is used to enable NAS signaling exchange between the UE 2401 and the CN 2420, and comprises both the signaling connection between the UE and the AN (e.g., RRC connection or UE-N3IWF connection for non-3GPP access) and the N2 connection for the UE 2401 between the AN (e.g., RAN 2410) and the AMF 2421. The UE 2401 may operate in one of two CM states, CM-IDLE mode or CM-CONNECTED mode. When the UE 2401 is operating in the CM-IDLE state/mode, the UE 2401 may have no NAS signaling connection established with the AMF 2421 over the N1 interface, and there may be (R)AN 2410 signaling connection (e.g., N2 and/or N3 connections) for the UE 2401. When the UE 2401 is operating in the CM-CONNECTED state/mode, the UE 2401 may have an established NAS signaling connection with the AMF 2421 over the N1 interface, and there may be a (R)AN 2410 signaling connection (e.g., N2 and/or N3 connections) for the UE 2401. Establishment of an N2 connection between the (R)AN 2410 and the AMF 2421 may cause the UE 2401 to transition from CM-IDLE mode to CM-CONNECTED mode, and the UE 2401 may transition from the CM-CONNECTED mode to the CM-IDLE mode when N2 signaling between the (R)AN 2410 and the AMF 2421 is released.

The SMF 2424 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 2401 and a data network (DN) 2403 identified by a Data Network Name (DNN). PDU sessions may be established upon UE 2401 request, modified upon UE 2401 and 5GC 2420 request, and released upon UE 2401 and 5GC 2420 request using NAS SM signaling exchanged over the N1 reference point between the UE 2401 and the SMF 2424. Upon request from an application server, the 5GC 2420 may trigger a specific application in the UE 2401. In response to receipt of the trigger message, the UE 2401 may pass the trigger message (or relevant parts/information of the trigger message) to one or more identified applications in the UE 2401. The identified application(s) in the UE 2401 may establish a PDU session to a specific DNN. The SMF 2424 may check whether the UE 2401 requests are compliant with user subscription information associated with the UE 2401. In this regard, the SMF 2424 may retrieve and/or request to receive update notifications on SMF 2424 level subscription data from the UDM 2427.

The SMF 2424 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 2424 may be included in the system 2400, which may be between another SMF 2424 in a visited network and the SMF 2424 in the home network in roaming scenarios. Additionally, the SMF 2424 may exhibit the Nsmf service-based interface.

The NEF 2423 may provide means for securely exposing the services and capabilities provided by 3GPP network functions for third party, internal exposure/re-exposure, Application Functions (e.g., AF 2428), edge computing or fog computing systems, etc. In such implementations, the NEF 2423 may authenticate, authorize, and/or throttle the AFs. NEF 2423 may also translate information exchanged with the AF 2428 and information exchanged with internal network functions. For example, the NEF 2423 may translate between an AF-Service-Identifier and an internal 5GC information. NEF 2423 may also receive information from other network functions (NFs) based on exposed capabilities of other network functions. This information may be stored at the NEF 2423 as structured data, or at a data storage NF using standardized interfaces. The stored information can then be re-exposed by the NEF 2423 to other NFs and AFs, and/or used for other purposes such as analytics. Additionally, the NEF 2423 may exhibit an Nnef service-based interface.

The NRF 2425 may support service discovery functions, receive NF discovery requests from NF instances, and provide the information of the discovered NF instances to the NF instances. NRF 2425 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 2425 may exhibit the Nnrf service-based interface.

The PCF 2426 may provide policy rules to control plane function(s) to enforce them, and may also support unified policy framework to govern network behavior. The PCF 2426 may also implement an FE to access subscription information relevant for policy decisions in a UDR of the UDM 2427. The PCF 2426 may communicate with the AMF 2421 via an N15 reference point between the PCF 2426 and the AMF 2421, which may include a PCF 2426 in a visited network and the AMF 2421 in case of roaming scenarios. The PCF 2426 may communicate with the AF 2428 via an N5 reference point between the PCF 2426 and the AF 2428; and with the SMF 2424 via an N7 reference point between the PCF 2426 and the SMF 2424. The system 2400 and/or CN 2420 may also include an N24 reference point between the PCF 2426 (in the home network) and a PCF 2426 in a visited network. Additionally, the PCF 2426 may exhibit an Npcf service-based interface.

The UDM 2427 may handle subscription-related information to support the network entities' handling of communication sessions, and may store subscription data of UE 2401. For example, subscription data may be communicated between the UDM 2427 and the AMF 2421 via an N8 reference point between the UDM 2427 and the AMF. The UDM 2427 may include two parts, an application FE and a UDR (the FE and UDR are not shown by FIG. 24). The UDR may store subscription data and policy data for the UDM 2427 and the PCF 2426, and/or structured data for exposure and application data (including PFDs for application detection, application request information for multiple UEs 2401) for the NEF 2423. The Nudr service-based interface may be exhibited by the UDR 221 to allow the UDM 2427, PCF 2426, and NEF 2423 to access a particular set of the stored data, as well as to read, update (e.g., add, modify), delete, and subscribe to notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 2424 via an N10 reference point between the UDM 2427 and the SMF 2424. UDM 2427 may also support SMS management, wherein an SMS-FE implements the similar application logic as discussed previously. Additionally, the UDM 2427 may exhibit the Nudm service-based interface.

The AF 2428 may provide application influence on traffic routing, provide access to the NCE, and interact with the policy framework for policy control. The NCE may be a mechanism that allows the 5GC 2420 and AF 2428 to provide information to each other via NEF 2423, which may be used for edge computing implementations. In such implementations, the network operator and third party services may be hosted close to the UE 2401 access point of attachment to achieve an efficient service delivery through the reduced end-to-end latency and load on the transport network. For edge computing implementations, the 5GC may select a UPF 2402 close to the UE 2401 and execute traffic steering from the UPF 2402 to DN 2403 via the N6 interface. This may be based on the UE subscription data, UE location, and information provided by the AF 2428. In this way, the AF 2428 may influence UPF (re)selection and traffic routing. Based on operator deployment, when AF 2428 is considered to be a trusted entity, the network operator may permit AF 2428 to interact directly with relevant NFs. Additionally, the AF 2428 may exhibit an Naf service-based interface.

The NSSF 2429 may select a set of network slice instances serving the UE 2401. The NSSF 2429 may also determine allowed NSSAI and the mapping to the subscribed S-NSSAIs, if needed. The NSSF 2429 may also determine the AMF set to be used to serve the UE 2401, or a list of candidate AMF(s) 2421 based on a suitable configuration and possibly by querying the NRF 2425. The selection of a set of network slice instances for the UE 2401 may be triggered by the AMF 2421 with which the UE 2401 is registered by interacting with the NSSF 2429, which may lead to a change of AMF 2421. The NSSF 2429 may interact with the AMF 2421 via an N22 reference point between AMF 2421 and NSSF 2429; and may communicate with another NSSF 2429 in a visited network via an N31 reference point (not shown by FIG. 24). Additionally, the NSSF 2429 may exhibit an Nnssf service-based interface.

As discussed previously, the CN 2420 may include an SMSF, which may be responsible for SMS subscription checking and verification, and relaying SM messages to/from the UE 2401 to/from other entities, such as an SMS-GMSC/IWMSC/SMS-router. The SMS may also interact with AMF 2421 and UDM 2427 for a notification procedure that the UE 2401 is available for SMS transfer (e.g., set a UE not reachable flag, and notifying UDM 2427 when UE 2401 is available for SMS).

The CN 120 may also include other elements that are not shown by FIG. 24, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 24). Individual NFs may share a UDSF for storing their respective unstructured data or individual NFs may each have their own UDSF located at or near the individual NFs. Additionally, the UDSF may exhibit an Nudsf service-based interface (not shown by FIG. 24). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 24 for clarity. In one example, the CN 2420 may include an Nx interface, which is an inter-CN interface between the MME (e.g., MME 2321) and the AMF 2421 in order to enable interworking between CN 2420 and CN 2320. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 25:
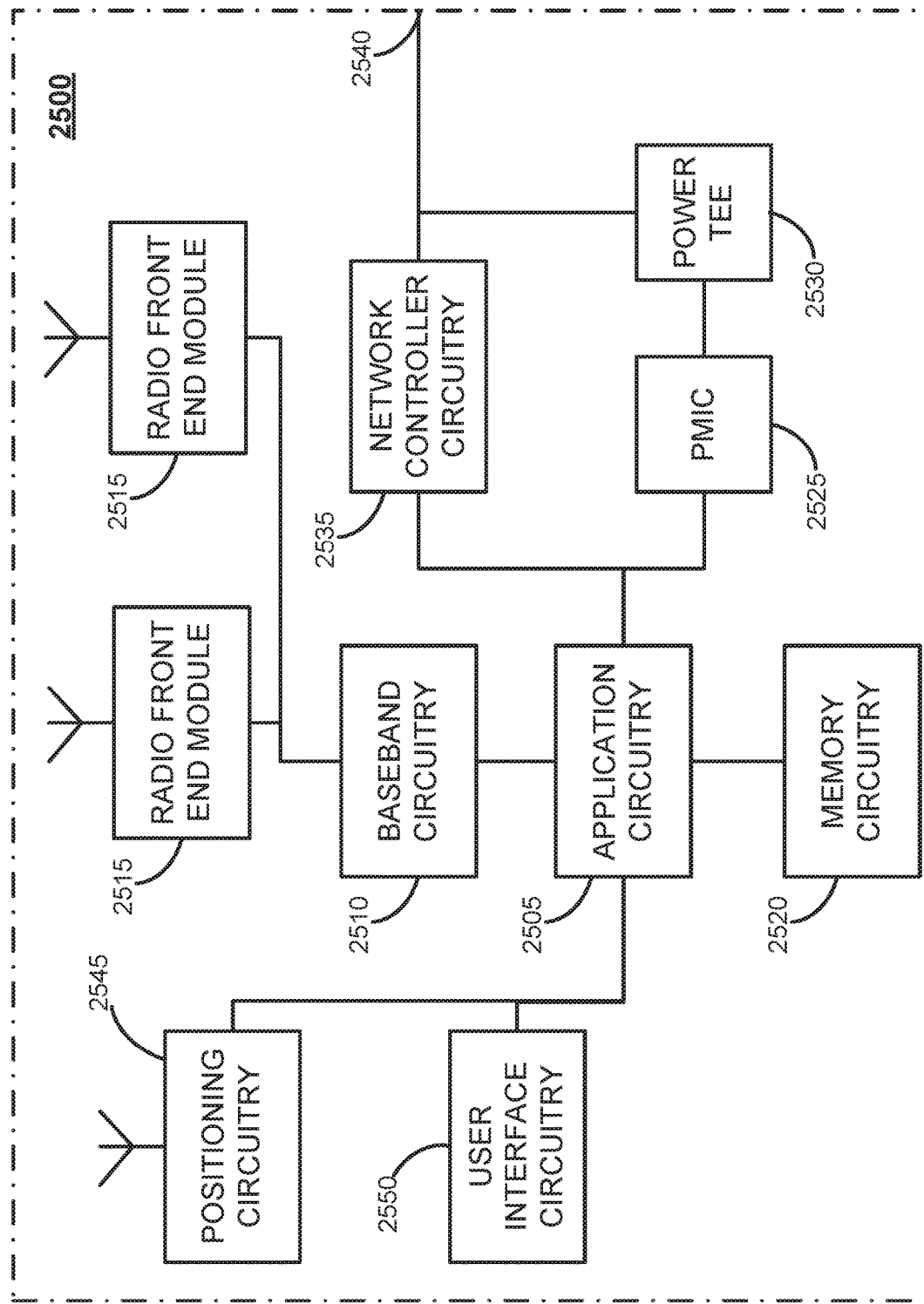
FIG. 25 illustrates an example of infrastructure equipment.

FIG. 25 illustrates an example of infrastructure equipment 2500 in accordance with various implementations. The infrastructure equipment 2500 (or "system 2500") may be implemented as a base station, radio head, RAN node such as the RAN nodes 2211 and/or AP 2206 shown and described previously, application server(s) 2230, and/or any other element/device discussed herein. In other examples, the system 2500 can be implemented in or by a UE.

The system 2500 includes application circuitry 2505, baseband circuitry 2510, one or more radio front end modules (RFEMs) 2515, memory circuitry 2520, power management integrated circuitry (PMIC) 2525, power tee circuitry 2530, network controller circuitry 2535, network interface connector 2540, satellite positioning circuitry 2545, and user interface 2550. In some implementations, the device 2500 may include additional elements such as, for example, memory/storage, display, camera, sensor, or input/output (I/O) interface. In other implementations, the components described below may be included in more than one device. For example, said circuitries may be separately included in more than one device for CRAN, vBBU, or other like implementations.

Application circuitry 2505 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 2505 may be coupled with or may include memory/storage elements and may be configured to execute instructions stored in the memory/storage to enable various applications or operating systems to run on the system 2500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2505 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some implementations, the application circuitry 2505 may comprise, or may be, a special-purpose processor/controller to operate according to the various implementations herein. As examples, the processor(s) of application circuitry 2505 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cavium™, Inc.; a MIPS-based design from MIPS Technologies, Inc. Such as MIPS Warrior P-class processors; and/or the like. In some implementations, the system 2500 may not utilize application circuitry 2505, and instead may include a special-purpose processor/controller to process IP data received from an EPC or 5GC, for example.

In some implementations, the application circuitry 2505 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 2505 may comprise logic blocks or logic fabric, and other interconnected resources that may be programmed to perform various functions, such as the procedures, methods, functions, etc. Of the various implementations discussed herein. In such implementations, the circuitry of application circuitry 2505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up-tables (LUTs) and the like.

The baseband circuitry 2510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 2510 are discussed infra with regard to FIG. 27.

User interface circuitry 2550 may include one or more user interfaces designed to enable user interaction with the system 2500 or peripheral component interfaces designed to enable peripheral component interaction with the system 2500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 2515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 2711 of FIG. 27 infra), and the RFEM may be connected to multiple antennas. In alternative implementations, both mmWave and sub-mmWave radio functions may be implemented in the same physical RFEM 2515, which incorporates both mmWave antennas and sub-mmWave.

The memory circuitry 2520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 2520 may be implemented as one or more of solder down packaged integrated circuits, socketed memory modules and plug-in memory cards.

The PMIC 2525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 2530 may provide for electrical power drawn from a network cable to provide both power supply and data connectivity to the infrastructure equipment 2500 using a single cable.

The network controller circuitry 2535 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 2500 via network interface connector 2540 using a physical connection, which may be electrical (commonly referred to as a "copper interconnect"), optical, or wireless. The network controller circuitry 2535 may include one or more dedicated processors and/or FPGAs to communicate using one or more of the aforementioned protocols. In some implementations, the network controller circuitry 2535 may include multiple controllers to provide connectivity to other networks using the same or different protocols.

The positioning circuitry 2545 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2545 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 2545 may include a Micro-Technology for Positioning, Navigation, and Timing (Micro-PNT) IC that uses a master timing clock to perform position tracking/estimation without GNSS assistance. The positioning circuitry 2545 may also be part of, or interact with, the baseband circuitry 2510 and/or RFEMs 2515 to communicate with the nodes and components of the positioning network. The positioning circuitry 2545 may also provide position data and/or time data to the application circuitry 2505, which may use the data to synchronize operations with various infrastructure (e.g., RAN nodes 2211, etc.), or the like.

The components shown by FIG. 25 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 26:
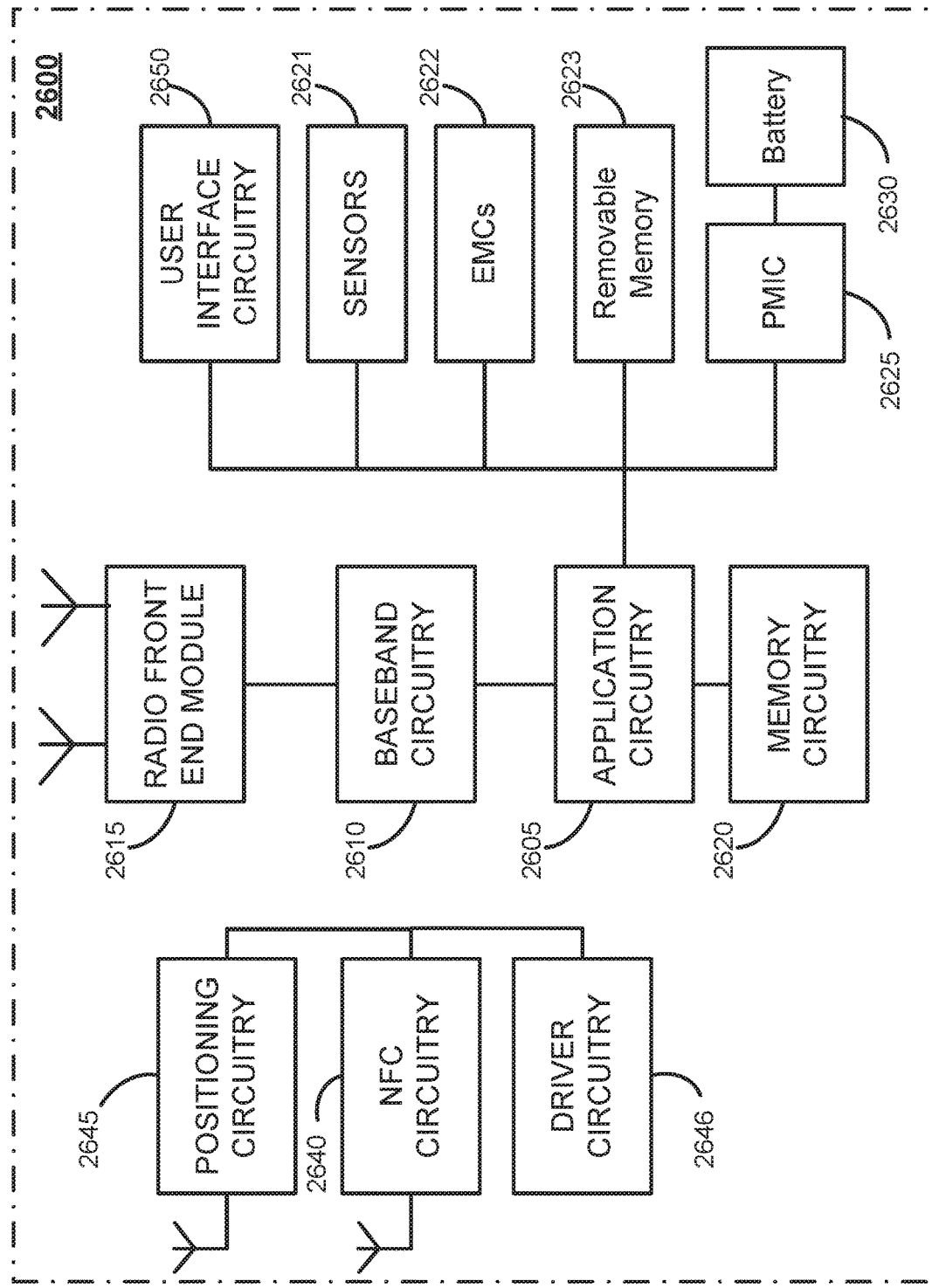
FIG. 26 illustrates an example of a platform.

FIG. 26 illustrates an example of a platform 2600 (or "device 2600") in accordance with various implementations. In implementations, the computer platform 2600 may be suitable for use as UEs 2201, 2301, 2401, application servers 2230, and/or any other element/device discussed herein. The platform 2600 may include any combinations of the components shown in the example. The components of platform 2600 may be implemented as integrated circuits (ICs), portions thereof, discrete electronic devices, or other modules, logic, hardware, software, firmware, or a combination thereof adapted in the computer platform 2600, or as components otherwise incorporated within a chassis of a larger system. The block diagram of FIG. 26 is intended to show a high level view of components of the computer platform 2600. However, some of the components shown may be omitted, additional components may be present, and different arrangement of the components shown may occur in other implementations.

Application circuitry 2605 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 2605 may be coupled with or may include memory/storage elements and may be configured to execute instructions stored in the memory/storage to enable various applications or operating systems to run on the system 2600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2505 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry 2505 may comprise, or may be, a special-purpose processor/controller to operate according to the various implementations herein.

As examples, the processor(s) of application circuitry 2605 may include an Apple A-series processor. The processors of the application circuitry 2605 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 2605 may be a part of a system on a chip (SoC) in which the application circuitry 2605 and other components are formed into a single integrated circuit.

Additionally or alternatively, application circuitry 2605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 2605 may comprise logic blocks or logic fabric, and other interconnected resources that may be programmed to perform various functions, such as the procedures, methods, functions, etc. Of the various implementations discussed herein. In such implementations, the circuitry of application circuitry 2605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up tables (LUTs) and the like.

The baseband circuitry 2610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 2610 are discussed infra with regard to FIG. 27.

The RFEMs 2615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 2711 of FIG. 27 infra), and the RFEM may be connected to multiple antennas. In alternative implementations, both mmWave and sub-mmWave radio functions may be implemented in the same physical RFEM 2615, which incorporates both mmWave antennas and sub-mmWave.

The memory circuitry 2620 may include any number and type of memory devices used to provide for a given amount of system memory. As examples, the memory circuitry 2620 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 2620 may be developed in accordance with a Joint Electron Devices Engineering Council (JEDEC) low power double data rate (LPDDR)-based design, such as LPDDR2, LPDDR3, LPDDR4, or the like. Memory circuitry 2620 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 2620 may be on-die memory or registers associated with the application circuitry 2605. To provide for persistent storage of information such as data, applications, operating systems and so forth, memory circuitry 2620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 2600 may incorporate the three-dimensional (3D) cross-point (XPOINT) memories from Intel® and Micron®.

Removable memory circuitry 2623 may include devices, circuitry, enclosures/housings, ports or receptacles, etc. Used to couple portable data storage devices with the platform 2600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 2600 may also include interface circuitry (not shown) that is used to connect external devices with the platform 2600. The external devices connected to the platform 2600 via the interface circuitry include sensor circuitry 2621 and electro-mechanical components (EMCs) 2622, as well as removable memory devices coupled to removable memory circuitry 2623.

The sensor circuitry 2621 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 2622 include devices, modules, or subsystems whose purpose is to enable platform 2600 to change its state, position, and/or orientation, or move or control a mechanism or (sub)system. Additionally, EMCs 2622 may be configured to generate and send messages/signaling to other components of the platform 2600 to indicate a current state of the EMCs 2622. Examples of the EMCs 2622 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In implementations, platform 2600 is configured to operate one or more EMCs 2622 based on one or more captured events and/or instructions or control signals received from a service provider and/or various clients.

In some implementations, the interface circuitry may connect the platform 2600 with positioning circuitry 2645. The positioning circuitry 2645 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 2645 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 2645 may include a Micro-PNT IC that uses a master timing clock to perform position tracking/estimation without GNSS assistance. The positioning circuitry 2645 may also be part of, or interact with, the baseband circuitry 2510 and/or RFEMs 2615 to communicate with the nodes and components of the positioning network. The positioning circuitry 2645 may also provide position data and/or time data to the application circuitry 2605, which may use the data to synchronize operations with various infrastructure (e.g., radio base stations), for turn-by-turn navigation applications, or the like.

In some implementations, the interface circuitry may connect the platform 2600 with Near-Field Communication (NFC) circuitry 2640. NFC circuitry 2640 is configured to provide contactless, short-range communications based on radio frequency identification (RFID) standards, wherein magnetic field induction is used to enable communication between NFC circuitry 2640 and NFC-enabled devices external to the platform 2600 (e.g., an "NFC touchpoint"). NFC circuitry 2640 comprises an NFC controller coupled with an antenna element and a processor coupled with the NFC controller. The NFC controller may be a chip/IC providing NFC functionalities to the NFC circuitry 2640 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 2640, or initiate data transfer between the NFC circuitry 2640 and another active NFC device (e.g., a smartphone or an NFC-enabled POS terminal) that is proximate to the platform 2600.

The driver circuitry 2646 may include software and hardware elements that operate to control particular devices that are embedded in the platform 2600, attached to the platform 2600, or otherwise communicatively coupled with the platform 2600. The driver circuitry 2646 may include individual drivers allowing other components of the platform 2600 to interact with or control various input/output (I/O) devices that may be present within, or connected to, the platform 2600. For example, driver circuitry 2646 may include a display driver to control and allow access to a display device, a touchscreen driver to control and allow access to a touchscreen interface of the platform 2600, sensor drivers to obtain sensor readings of sensor circuitry 2621 and control and allow access to sensor circuitry 2621, EMC drivers to obtain actuator positions of the EMCs 2622 and/or control and allow access to the EMCs 2622, a camera driver to control and allow access to an embedded image capture device, audio drivers to control and allow access to one or more audio devices.

The power management integrated circuitry (PMIC) 2625 (also referred to as "power management circuitry 2625") may manage power provided to various components of the platform 2600. In particular, with respect to the baseband circuitry 2610, the PMIC 2625 may control power-source selection, voltage scaling, battery charging, or DC-to-DC conversion. The PMIC 2625 may often be included when the platform 2600 is capable of being powered by a battery 2630, for example, when the device is included in a UE 2201, 2301, 2401.

In some implementations, the PMIC 2625 may control, or otherwise be part of, various power saving mechanisms of the platform 2600. For example, if the platform 2600 is in an RRC_Connected state, where it is still connected to the RAN node as it expects to receive traffic shortly, then it may enter a state known as Discontinuous Reception Mode (DRX) after a period of inactivity. During this state, the platform 2600 may power down for brief intervals of time and thus save power. If there is no data traffic activity for an extended period of time, then the platform 2600 may transition off to an RRC_Idle state, where it disconnects from the network and does not perform operations such as channel quality feedback, handover, etc. The platform 2600 goes into a very low power state and it performs paging where again it periodically wakes up to listen to the network and then powers down again. The platform 2600 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 2630 may power the platform 2600, although in some examples the platform 2600 may be mounted deployed in a fixed location, and may have a power supply coupled to an electrical grid. The battery 2630 may be a lithium ion battery, a metal-air battery, such as a zinc-air battery, an aluminum-air battery, a lithium-air battery, and the like. In some implementations, such as in V2X applications, the battery 2630 may be a typical lead-acid automotive battery.

In some implementations, the battery 2630 may be a "smart battery," which includes or is coupled with a Battery Management System (BMS) or battery monitoring integrated circuitry. The BMS may be included in the platform 2600 to track the state of charge (SoCh) of the battery 2630. The BMS may be used to monitor other parameters of the battery 2630 to provide failure predictions, such as the state of health (SoH) and the state of function (SoF) of the battery 2630. The BMS may communicate the information of the battery 2630 to the application circuitry 2605 or other components of the platform 2600. The BMS may also include an analog-to-digital (ADC) convertor that allows the application circuitry 2605 to directly monitor the voltage of the battery 2630 or the current flow from the battery 2630. The battery parameters may be used to determine actions that the platform 2600 may perform, such as transmission frequency, network operation, sensing frequency, and the like.

A power block, or other power supply coupled to an electrical grid may be coupled with the BMS to charge the battery 2630. In some examples, the power block XS30 may be replaced with a wireless power receiver to obtain the power wirelessly, for example, through a loop antenna in the computer platform 2600. In these examples, a wireless battery charging circuit may be included in the BMS. The specific charging circuits chosen may depend on the size of the battery 2630, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 2650 includes various input/output (I/O) devices present within, or connected to, the platform 2600, and includes one or more user interfaces designed to enable user interaction with the platform 2600 and/or peripheral component interfaces designed to enable peripheral component interaction with the platform 2600. The user interface circuitry 2650 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2600. The output device circuitry may also include speakers or other audio emitting devices, printer(s), and/or the like. In some implementations, the sensor circuitry 2621 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 2600 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/D systems may be included, such as an I2C interface, an SPI interface, point-to-point interfaces, and a power bus, among others.

Figure 27:
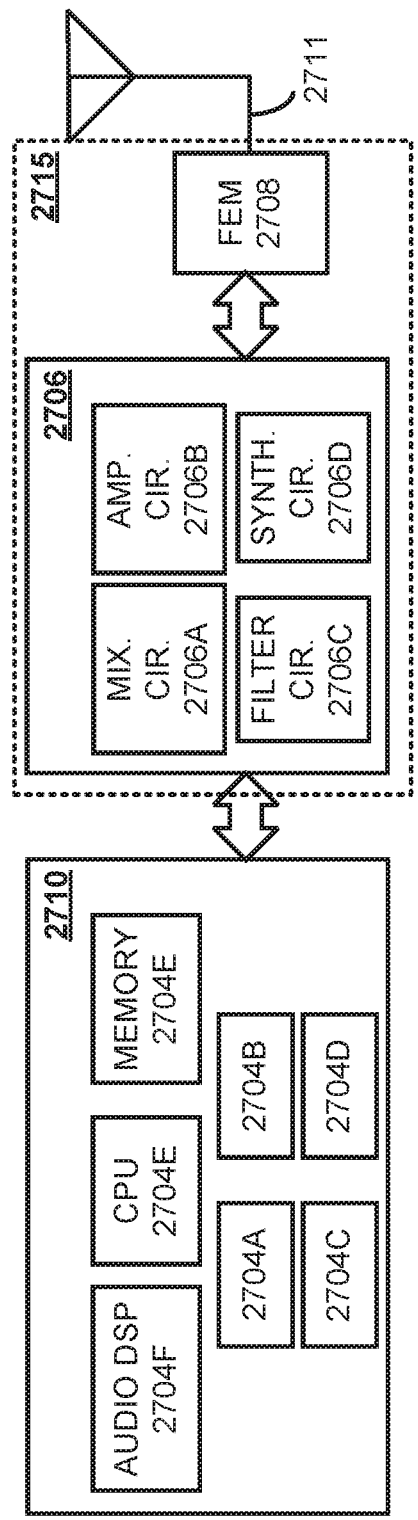
FIG. 27 illustrates example components of baseband circuitry and radio front end modules (RFEM).

FIG. 27 illustrates example components of baseband circuitry 2710 and radio front end modules (RFEM) 2715 in accordance with various implementations. The baseband circuitry 2710 corresponds to the baseband circuitry 2510 and 2610 of FIGS. 25 and 26, respectively. The RFEM 2715 corresponds to the RFEM 2515 and 2615 of FIGS. 25 and 26, respectively. As shown, the RFEMs 2715 may include Radio Frequency (RF) circuitry 2706, front-end module (FEM) circuitry 2708, antenna array 2711 coupled together at least as shown.

The baseband circuitry 2710 includes circuitry and/or control logic configured to carry out various radio/network protocol and radio control functions that enable communication with one or more radio networks via the RF circuitry 2706. The radio control functions may include, but are not limited to, signal modulation/demodulation, encoding/decoding, radio frequency shifting, etc. In some implementations, modulation/demodulation circuitry of the baseband circuitry 2710 may include Fast-Fourier Transform (FFT), precoding, or constellation mapping/demapping functionality. In some implementations, encoding/decoding circuitry of the baseband circuitry 2710 may include convolution, tail-biting convolution, turbo, Viterbi, or Low Density Parity Check (LDPC) encoder/decoder functionality. Implementations of modulation/demodulation and encoder/decoder functionality are not limited to these examples and may include other suitable functionality in other implementations. The baseband circuitry 2710 is configured to process baseband signals received from a receive signal path of the RF circuitry 2706 and to generate baseband signals for a transmit signal path of the RF circuitry 2706. The baseband circuitry 2710 is configured to interface with application circuitry 2505/XS205 (see FIGS. 25 and 26) for generation and processing of the baseband signals and for controlling operations of the RF circuitry 2706. The baseband circuitry 2710 may handle various radio control functions.

The aforementioned circuitry and/or control logic of the baseband circuitry 2710 may include one or more single or multi-core processors. For example, the one or more processors may include a 3G baseband processor 2704A, a 4G/LTE baseband processor 2704B, a 5G/NR baseband processor 2704C, or some other baseband processor(s) 2704D for other existing generations, generations in development or to be developed in the future (e.g., sixth generation (6G), etc.). In other implementations, some or all of the functionality of baseband processors 2704A-D may be included in modules stored in the memory 2704G and executed via a Central Processing Unit (CPU) 2704E. In other implementations, some or all of the functionality of baseband processors 2704A-D may be provided as hardware accelerators (e.g., FPGAs, ASICs, etc.) loaded with the appropriate bit streams or logic blocks stored in respective memory cells. In various implementations, the memory 2704G may store program code of a real-time OS (RTOS), which when executed by the CPU 2704E (or other baseband processor), is to cause the CPU 2704E (or other baseband processor) to manage resources of the baseband circuitry 2710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 2710 includes one or more audio digital signal processor(s) (DSP) 2704F. The audio DSP(s) 2704F include elements for compression/decompression and echo cancellation and may include other suitable processing elements in other implementations.

In some implementations, each of the processors 2704A-XT104E include respective memory interfaces to send/receive data to/from the memory 2704G. The baseband circuitry 2710 may further include one or more interfaces to communicatively couple to other circuitries/devices, such as an interface to send/receive data to/from memory external to the baseband circuitry 2710; an application circuitry interface to send/receive data to/from the application circuitry 2505/XS205 of FIGS. 25-XT); an RF circuitry interface to send/receive data to/from RF circuitry 2706 of FIG. 27; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 2625.

In alternate implementations (which may be combined with the above described implementations), baseband circuitry 2710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 2710 may include protocol processing circuitry with one or more instances of control circuitry (not shown) to provide control functions for the digital baseband circuitry and/or radio frequency circuitry (e.g., the radio front end modules 2715).

Although not shown by FIG. 27, in some implementations, the baseband circuitry 2710 includes individual processing device(s) to operate one or more wireless communication protocols (e.g., a "multi-protocol baseband processor" or "protocol processing circuitry") and individual processing device(s) to implement PHY layer functions. In these implementations, the PHY layer functions include the aforementioned radio control functions. In these implementations, the protocol processing circuitry operates or implements various protocol layers/entities of one or more wireless communication protocols. In a first example, the protocol processing circuitry may operate LTE protocol entities and/or 5G/NR protocol entities when the baseband circuitry 2710 and/or RF circuitry 2706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 2710 and/or RF circuitry 2706 are part of a Wi-Fi communication system. In the second example, the protocol processing circuitry would operate Wi-Fi MAC and logical link control (LLC) functions. The protocol processing circuitry may include one or more memory structures (e.g., 2704G) to store program code and data for operating the protocol functions, as well as one or more processing cores to execute the program code and perform various operations using the data. The baseband circuitry 2710 may also support radio communications for more than one wireless protocol.

The various hardware elements of the baseband circuitry 2710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 2710 may be suitably combined in a single chip or chipset, or disposed on a same circuit board. In another example, some or all of the constituent components of the baseband circuitry 2710 and RF circuitry 2706 may be implemented together such as, for example, a system on a chip (SoC) or System-in-Package (SiP). In another example, some or all of the constituent components of the baseband circuitry 2710 may be implemented as a separate SoC that is communicatively coupled with and RF circuitry 2706 (or multiple instances of RF circuitry 2706). In yet another example, some or all of the constituent components of the baseband circuitry 2710 and the application circuitry 2505/XS205 may be implemented together as individual SoCs mounted to a same circuit board (e.g., a "multi-chip package").

In some implementations, the baseband circuitry 2710 may provide for communication compatible with one or more radio technologies. For example, in some implementations, the baseband circuitry 2710 may support communication with an E-UTRAN or other WMAN, a WLAN, a WPAN. Implementations in which the baseband circuitry 2710 is configured to support radio communications of more than one wireless protocol may be referred to as multi-mode baseband circuitry.

RF circuitry 2706 may enable communication with wireless networks using modulated electromagnetic radiation through a non-solid medium. In various implementations, the RF circuitry 2706 may include switches, filters, amplifiers, etc. To facilitate the communication with the wireless network. RF circuitry 2706 may include a receive signal path, which may include circuitry to down-convert RF signals received from the FEM circuitry 2708 and provide baseband signals to the baseband circuitry 2710. RF circuitry 2706 may also include a transmit signal path, which may include circuitry to up-convert baseband signals provided by the baseband circuitry 2710 and provide RF output signals to the FEM circuitry 2708 for transmission.

In some implementations, the receive signal path of the RF circuitry 2706 may include mixer circuitry 2706a, amplifier circuitry 2706b and filter circuitry 2706c. In some implementations, the transmit signal path of the RF circuitry 2706 may include filter circuitry 2706c and mixer circuitry 2706a. RF circuitry 2706 may also include synthesizer circuitry 2706d for synthesizing a frequency for use by the mixer circuitry 2706a of the receive signal path and the transmit signal path. In some implementations, the mixer circuitry 2706a of the receive signal path may be configured to down-convert RF signals received from the FEM circuitry 2708 based on the synthesized frequency provided by synthesizer circuitry 2706d. The amplifier circuitry 2706b may be configured to amplify the down-converted signals and the filter circuitry 2706c may be a low-pass filter (LPF) or band-pass filter (BPF) configured to remove unwanted signals from the down-converted signals to generate output baseband signals. Output baseband signals may be provided to the baseband circuitry 2710 for further processing. In some implementations, the output baseband signals may be zero-frequency baseband signals, although this is not a requirement. In some implementations, mixer circuitry 2706a of the receive signal path may comprise passive mixers, although the scope of the implementations is not limited in this respect.

In some implementations, the mixer circuitry 2706a of the transmit signal path may be configured to up-convert input baseband signals based on the synthesized frequency provided by the synthesizer circuitry 2706d to generate RF output signals for the FEM circuitry 2708. The baseband signals may be provided by the baseband circuitry 2710 and may be filtered by filter circuitry 2706c.

In some implementations, the mixer circuitry 2706a of the receive signal path and the mixer circuitry 2706a of the transmit signal path may include two or more mixers and may be arranged for quadrature downconversion and upconversion, respectively. In some implementations, the mixer circuitry 2706a of the receive signal path and the mixer circuitry 2706a of the transmit signal path may include two or more mixers and may be arranged for image rejection (e.g., Hartley image rejection). In some implementations, the mixer circuitry 2706a of the receive signal path and the mixer circuitry 2706a of the transmit signal path may be arranged for direct downconversion and direct upconversion, respectively. In some implementations, the mixer circuitry 2706a of the receive signal path and the mixer circuitry 2706a of the transmit signal path may be configured for super-heterodyne operation.

In some implementations, the output baseband signals and the input baseband signals may be analog baseband signals, although the scope of the implementations is not limited in this respect. In some alternate implementations, the output baseband signals and the input baseband signals may be digital baseband signals. In these alternate implementations, the RF circuitry 2706 may include analog-to-digital converter (ADC) and digital-to-analog converter (DAC) circuitry and the baseband circuitry 2710 may include a digital baseband interface to communicate with the RF circuitry 2706.

In some dual-mode implementations, a separate radio IC circuitry may be provided for processing signals for each spectrum, although the scope of the implementations is not limited in this respect.

In some implementations, the synthesizer circuitry 2706d may be a fractional-N synthesizer or a fractional N/N+1 synthesizer, although the scope of the implementations is not limited in this respect as other types of frequency synthesizers may be suitable. For example, synthesizer circuitry 2706d may be a delta-sigma synthesizer, a frequency multiplier, or a synthesizer comprising a phase-locked loop with a frequency divider.

The synthesizer circuitry 2706d may be configured to synthesize an output frequency for use by the mixer circuitry 2706a of the RF circuitry 2706 based on a frequency input and a divider control input. In some implementations, the synthesizer circuitry 2706d may be a fractional N/N+1 synthesizer.

In some implementations, frequency input may be provided by a voltage controlled oscillator (VCO), although that is not a requirement. Divider control input may be provided by either the baseband circuitry 2710 or the application circuitry 2505/XS205 depending on the desired output frequency. In some implementations, a divider control input (e.g., N) may be determined from a look-up table based on a channel indicated by the application circuitry 2505/XS205.

Synthesizer circuitry 2706d of the RF circuitry 2706 may include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some example implementations, the DLL may include a set of cascaded, tunable, delay elements, a phase detector, a charge pump and a D-type flip-flop. In these implementations, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 2706d may be configured to generate a carrier frequency as the output frequency, while in other implementations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency (fLO). In some implementations, the RF circuitry 2706 may include an IQ/polar converter.

FEM circuitry 2708 may include a receive signal path, which may include circuitry configured to operate on RF signals received from antenna array 2711, amplify the received signals and provide the amplified versions of the received signals to the RF circuitry 2706 for further processing. FEM circuitry 2708 may also include a transmit signal path, which may include circuitry configured to amplify signals for transmission provided by the RF circuitry 2706 for transmission by one or more of antenna elements of antenna array 2711. In various implementations, the amplification through the transmit or receive signal paths may be done solely in the RF circuitry 2706, solely in the FEM circuitry 2708, or in both the RF circuitry 2706 and the FEM circuitry 2708.

In some implementations, the FEM circuitry 2708 may include a TX/RX switch to switch between transmit mode and receive mode operation. The FEM circuitry 2708 may include a receive signal path and a transmit signal path. The receive signal path of the FEM circuitry 2708 may include an LNA to amplify received RF signals and provide the amplified received RF signals as an output (e.g., to the RF circuitry 2706). The transmit signal path of the FEM circuitry 2708 may include a power amplifier (PA) to amplify input RF signals (e.g., provided by RF circuitry 2706), and one or more filters to generate RF signals for subsequent transmission by one or more antenna elements of the antenna array 2711.

The antenna array 2711 comprises one or more antenna elements, each of which is configured convert electrical signals into radio waves to travel through the air and to convert received radio waves into electrical signals. For example, digital baseband signals provided by the baseband circuitry 2710 is converted into analog RF signals (e.g., modulated waveform) that will be amplified and transmitted via the antenna elements of the antenna array 2711 including one or more antenna elements (not shown). The antenna elements may be omnidirectional, direction, or a combination thereof. The antenna elements may be formed in a multitude of arranges as are known and/or discussed herein. The antenna array 2711 may comprise microstrip antennas or printed antennas that are fabricated on the surface of one or more printed circuit boards. The antenna array 2711 may be formed in as a patch of metal foil (e.g., a patch antenna) in a variety of shapes, and may be coupled with the RF circuitry 2706 and/or FEM circuitry 2708 using metal transmission lines or the like.

Processors of the application circuitry 2505/XS205 and processors of the baseband circuitry 2710 may be used to execute elements of one or more instances of a protocol stack. For example, processors of the baseband circuitry 2710, alone or in combination, may be used execute Layer 3, Layer 2, or Layer 1 functionality, while processors of the application circuitry 2505/XS205 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 28:
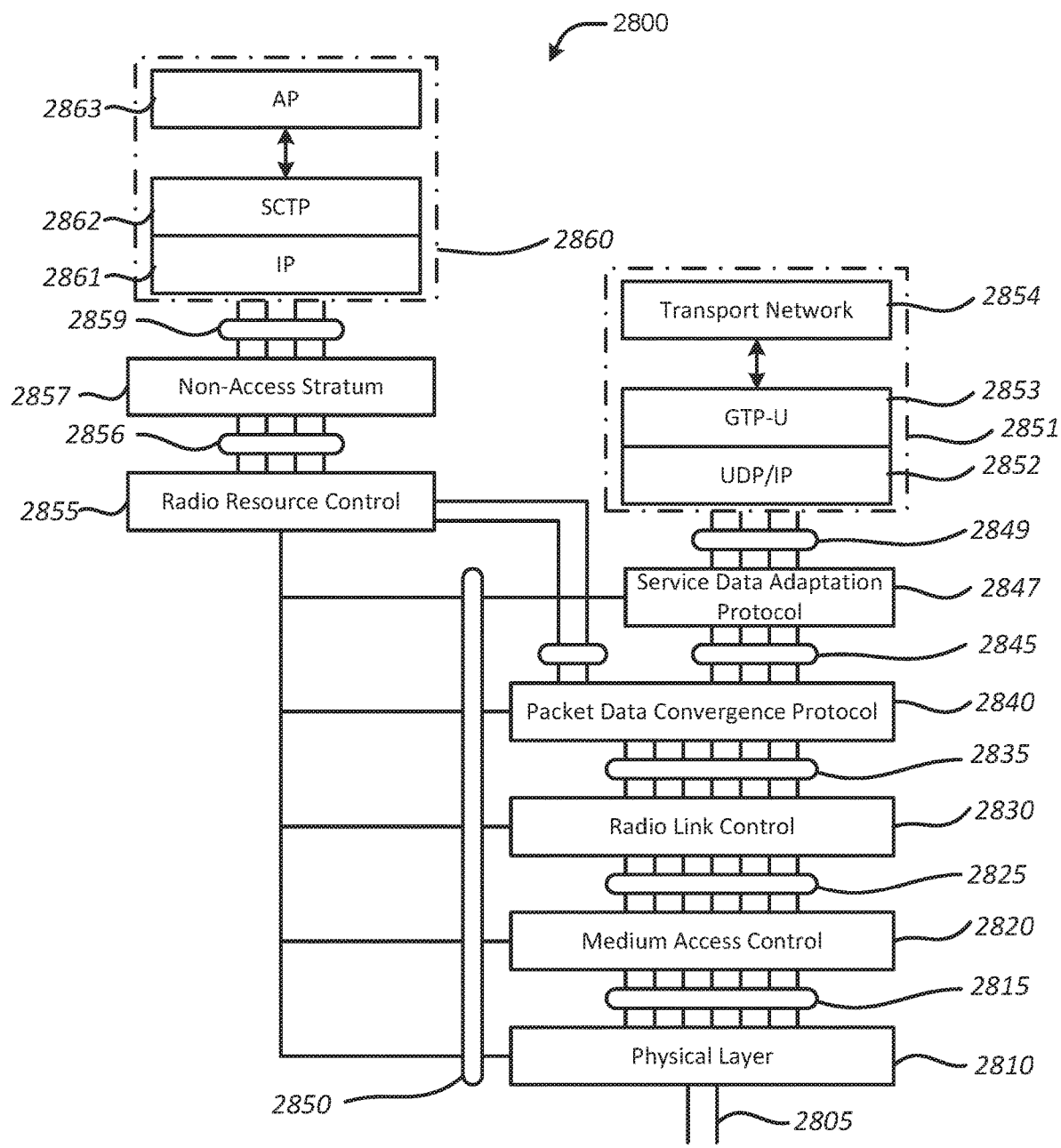
FIG. 28 illustrates various protocol functions that may be implemented in a wireless communication device.

FIG. 28 illustrates various protocol functions that may be implemented in a wireless communication device according to various implementations. In particular, FIG. 28 includes an arrangement 2800 showing interconnections between various protocol layers/entities. The following description of FIG. 28 is provided for various protocol layers/entities that operate in conjunction with the 5G/NR system standards and LTE system standards, but some or all of the aspects of FIG. 28 may be applicable to other wireless communication network systems as well.

The protocol layers of arrangement 2800 may include one or more of PHY 2810, MAC 2820, RLC 2830, PDCP 2840, SDAP 2847, RRC 2855, and NAS layer 2857, in addition to other higher layer functions not illustrated. The protocol layers may include one or more service access points (e.g., items 2859, 2856, 2850, 2849, 2845, 2835, 2825, and 2815 in FIG. 28) that may provide communication between two or more protocol layers.

The PHY 2810 may transmit and receive physical layer signals 2805 that may be received from or transmitted to one or more other communication devices. The physical layer signals 2805 may comprise one or more physical channels, such as those discussed herein. The PHY 2810 may further perform link adaptation or adaptive modulation and coding (AMC), power control, cell search (e.g., for initial synchronization and handover purposes), and other measurements used by higher layers, such as the RRC 2855. The PHY 2810 may still further perform error detection on the transport channels, forward error correction (FEC) coding/decoding of the transport channels, modulation/demodulation of physical channels, interleaving, rate matching, mapping onto physical channels, and MIMO antenna processing. In implementations, an instance of PHY 2810 may process requests from and provide indications to an instance of MAC 2820 via one or more PHY-SAP 2815. According to some implementations, requests and indications communicated via PHY-SAP 2815 may comprise one or more transport channels.

Instance(s) of MAC 2820 may process requests from, and provide indications to, an instance of RLC 2830 via one or more MAC-SAPs 2825. These requests and indications communicated via the MAC-SAP 2825 may comprise one or more logical channels. The MAC 2820 may perform mapping between the logical channels and transport channels, multiplexing of MAC SDUs from one or more logical channels onto TBs to be delivered to PHY 2810 via the transport channels, de-multiplexing MAC SDUs to one or more logical channels from TBs delivered from the PHY 2810 via transport channels, multiplexing MAC SDUs onto TBs, scheduling information reporting, error correction through HARQ, and logical channel prioritization.

Instance(s) of RLC 2830 may process requests from and provide indications to an instance of PDCP 2840 via one or more radio link control service access points (RLC-SAP) 2835. These requests and indications communicated via RLC-SAP 2835 may comprise one or more RLC channels. The RLC 2830 may operate in a plurality of modes of operation, including: Transparent Mode (TM), Unacknowledged Mode (UM), and Acknowledged Mode (AM). The RLC 2830 may execute transfer of upper layer protocol data units (PDUs), error correction through automatic repeat request (ARQ) for AM data transfers, and concatenation, segmentation and reassembly of RLC SDUs for UM and AM data transfers. The RLC 2830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 2840 may process requests from and provide indications to instance(s) of RRC 2855 and/or instance(s) of SDAP 2847 via one or more packet data convergence protocol service access points (PDCP-SAP) 2845. These requests and indications communicated via PDCP-SAP 2845 may comprise one or more radio bearers. The PDCP 2840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 2847 may process requests from and provide indications to one or more higher layer protocol entities via one or more SDAP-SAP 2849. These requests and indications communicated via SDAP-SAP 2849 may comprise one or more QoS flows. The SDAP 2847 may map QoS flows to DRBs, and vice versa, and may also mark QFIs in DL and UL packets. A single SDAP entity 2847 may be configured for an individual PDU session. In the UL direction, the NG-RAN 2210 may control the mapping of QoS Flows to DRB(s) in two different ways, reflective mapping or explicit mapping. For reflective mapping, the SDAP 2847 of a UE 2201 may monitor the QFIs of the DL packets for each DRB, and may apply the same mapping for packets flowing in the UL direction. For a DRB, the SDAP 2847 of the UE 2201 may map the UL packets belonging to the QoS flows(s) corresponding to the QoS flow ID(s) and PDU session observed in the DL packets for that DRB. To enable reflective mapping, the NG-RAN 2410 may mark DL packets over the Uu interface with a QoS flow ID. The explicit mapping may involve the RRC 2855 configuring the SDAP 2847 with an explicit QoS flow to DRB mapping rule, which may be stored and followed by the SDAP 2847. In implementations, the SDAP 2847 may only be used in NR implementations and may not be used in LTE implementations.

The RRC 2855 may configure, via one or more management service access points (M-SAP), aspects of one or more protocol layers, which may include one or more instances of PHY 2810, MAC 2820, RLC 2830, PDCP 2840 and SDAP 2847. In implementations, an instance of RRC 2855 may process requests from and provide indications to one or more NAS entities 2857 via one or more RRC-SAPs 2856. The main services and functions of the RRC 2855 may include broadcast of system information (e.g., included in MIBs or SIBs related to the NAS), broadcast of system information related to the access stratum (AS), paging, establishment, maintenance and release of an RRC connection between the UE 2201 and RAN 2210 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 2857 may form the highest stratum of the control plane between the UE 2201 and the AMF 2421. The NAS 2857 may support the mobility of the UEs 2201 and the session management procedures to establish and maintain IP connectivity between the UE 2201 and a P-GW in LTE systems.

According to various implementations, one or more protocol entities of arrangement 2800 may be implemented in UEs 2201, RAN nodes 2211, AMF 2421 in NR implementations or MME 2321 in LTE implementations, UPF 2402 in NR implementations or S-GW 2322 and P-GW 2323 in LTE implementations, or the like to be used for control plane or user plane communications protocol stack between the aforementioned devices. In such implementations, one or more protocol entities that may be implemented in one or more of UE 2201, gNB 2211, AMF 2421, etc. May communicate with a respective peer protocol entity that may be implemented in or on another device using the services of respective lower layer protocol entities to perform such communication. In some implementations, a gNB-CU of the gNB 2211 may host the RRC 2855, SDAP 2847, and PDCP 2840 of the gNB that controls the operation of one or more gNB-DUs, and the gNB-DUs of the gNB 2211 may each host the RLC 2830, MAC 2820, and PHY 2810 of the gNB 2211.

In a first example, a control plane protocol stack may comprise, in order from highest layer to lowest layer, NAS 2857, RRC 2855, PDCP 2840, RLC 2830, MAC 2820, and PHY 2810. In this example, upper layers 2860 may be built on top of the NAS 2857, which includes an IP layer 2861, an SCTP 2862, and an application layer signaling protocol (AP) 2863.

In NR implementations, the AP 2863 may be an NG application protocol layer (NGAP or NG-AP) 2863 for the NG interface 2213 defined between the NG-RAN node 2211 and the AMF 2421, or the AP 2863 may be an Xn application protocol layer (XnAP or Xn-AP) 2863 for the Xn interface 2212 that is defined between two or more RAN nodes 2211.

The NG-AP 2863 may support the functions of the NG interface 2213 and may comprise Elementary Procedures (EPs). An NG-AP EP may be a unit of interaction between the NG-RAN node 2211 and the AMF 2421. The NG-AP 2863 services may comprise two groups: UE-associated services (e.g., services related to a UE 2201) and non-UE-associated services (e.g., services related to the whole NG interface instance between the NG-RAN node 2211 and AMF 2421). These services may include functions including, but not limited to: a paging function for the sending of paging requests to NG-RAN nodes 2211 involved in a particular paging area; a UE context management function for allowing the AMF 2421 to establish, modify, and/or release a UE context in the AMF 2421 and the NG-RAN node 2211; a mobility function for UEs 2201 in ECM-CONNECTED mode for intra-system HOs to support mobility within NG-RAN and inter-system HOs to support mobility from/to EPS systems; a NAS Signaling Transport function for transporting or rerouting NAS messages between UE 2201 and AMF 2421; a NAS node selection function for determining an association between the AMF 2421 and the UE 2201; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 2211 via CN 2220; and/or other like functions.

The XnAP 2863 may support the functions of the Xn interface 2212 and may comprise XnAP basic mobility procedures and XnAP global procedures. The XnAP basic mobility procedures may comprise procedures used to handle UE mobility within the NG RAN 2211 (or E-UTRAN 2310), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 2201, such as Xn interface setup and reset procedures, NG-RAN update procedures, cell activation procedures, and the like.

In LTE implementations, the AP 2863 may be an SI Application Protocol layer (SI-AP) 2863 for the S1 interface 2213 defined between an E-UTRAN node 2211 and an MME, or the AP 2863 may be an X2 application protocol layer (X2AP or X2-AP) 2863 for the X2 interface 2212 that is defined between two or more E-UTRAN nodes 2211.

The S1 Application Protocol layer (S1-AP) 2863 may support the functions of the S1 interface, and similar to the NG-AP discussed previously, the S1-AP may comprise S1-AP EPs. An S1-AP EP may be a unit of interaction between the E-UTRAN node 2211 and an MME 2321 within an LTE CN 2220. The S1-AP 2863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 2863 may support the functions of the X2 interface 2212 and may comprise X2AP basic mobility procedures and X2AP global procedures. The X2AP basic mobility procedures may comprise procedures used to handle UE mobility within the E-UTRAN 2220, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 2201, such as X2 interface setup and reset procedures, load indication procedures, error indication procedures, cell activation procedures, and the like.

The SCTP layer (alternatively referred to as the SCTP/IP layer) 2862 may provide guaranteed delivery of application layer messages (e.g., NGAP or XnAP messages in NR implementations, or S1-AP or X2AP messages in LTE implementations). The SCTP 2862 may ensure reliable delivery of signaling messages between the RAN node 2211 and the AMF 2421/MME 2321 based, in part, on the IP protocol, supported by the IP 2861. The Internet Protocol layer (IP) 2861 may be used to perform packet addressing and routing functionality. In some implementations the IP layer 2861 may use point-to-point transmission to deliver and convey PDUs. In this regard, the RAN node 2211 may comprise L2 and L1 layer communication links (e.g., wired or wireless) with the MME/AMF to exchange information.

In a second example, a user plane protocol stack may comprise, in order from highest layer to lowest layer, SDAP 2847, PDCP 2840, RLC 2830, MAC 2820, and PHY 2810. The user plane protocol stack may be used for communication between the UE 2201, the RAN node 2211, and UPF 2402 in NR implementations or an S-GW 2322 and P-GW 2323 in LTE implementations. In this example, upper layers 2851 may be built on top of the SDAP 2847, and may include a user datagram protocol (UDP) and IP security layer (UDP/IP) 2852, a General Packet Radio Service (GPRS) Tunneling Protocol for the user plane layer (GTP-U) 2853, and a User Plane PDU layer (UP PDU) 2863.

The transport network layer 2854 (also referred to as a "transport layer") may be built on IP transport, and the GTP-U 2853 may be used on top of the UDP/IP layer 2852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 2853 may be used for carrying user data within the GPRS core network and between the radio access network and the core network. The user data transported can be packets in any of IPv4, IPv6, or PPP formats, for example. The UDP/IP 2852 may provide checksums for data integrity, port numbers for addressing different functions at the source and destination, and encryption and authentication on the selected data flows. The RAN node 2211 and the S-GW 2322 may utilize an SI-U interface to exchange user plane data via a protocol stack comprising an L1 layer (e.g., PHY 2810), an L2 layer (e.g., MAC 2820, RLC 2830, PDCP 2840, and/or SDAP 2847), the UDP/IP layer 2852, and the GTP-U 2853. The S-GW 2322 and the P-GW 2323 may utilize an S5/S8a interface to exchange user plane data via a protocol stack comprising an L1 layer, an L2 layer, the UDP/IP layer 2852, and the GTP-U 2853. As discussed previously, NAS protocols may support the mobility of the UE 2201 and the session management procedures to establish and maintain IP connectivity between the UE 2201 and the P-GW 2323.

Moreover, although not shown by FIG. 28, an application layer may be present above the AP 2863 and/or the transport network layer 2854. The application layer may be a layer in which a user of the UE 2201, RAN node 2211, or other network element interacts with software applications being executed, for example, by application circuitry 2505 or application circuitry 2605, respectively. The application layer may also provide one or more interfaces for software applications to interact with communications systems of the UE 2201 or RAN node 2211, such as the baseband circuitry 2710. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 29:
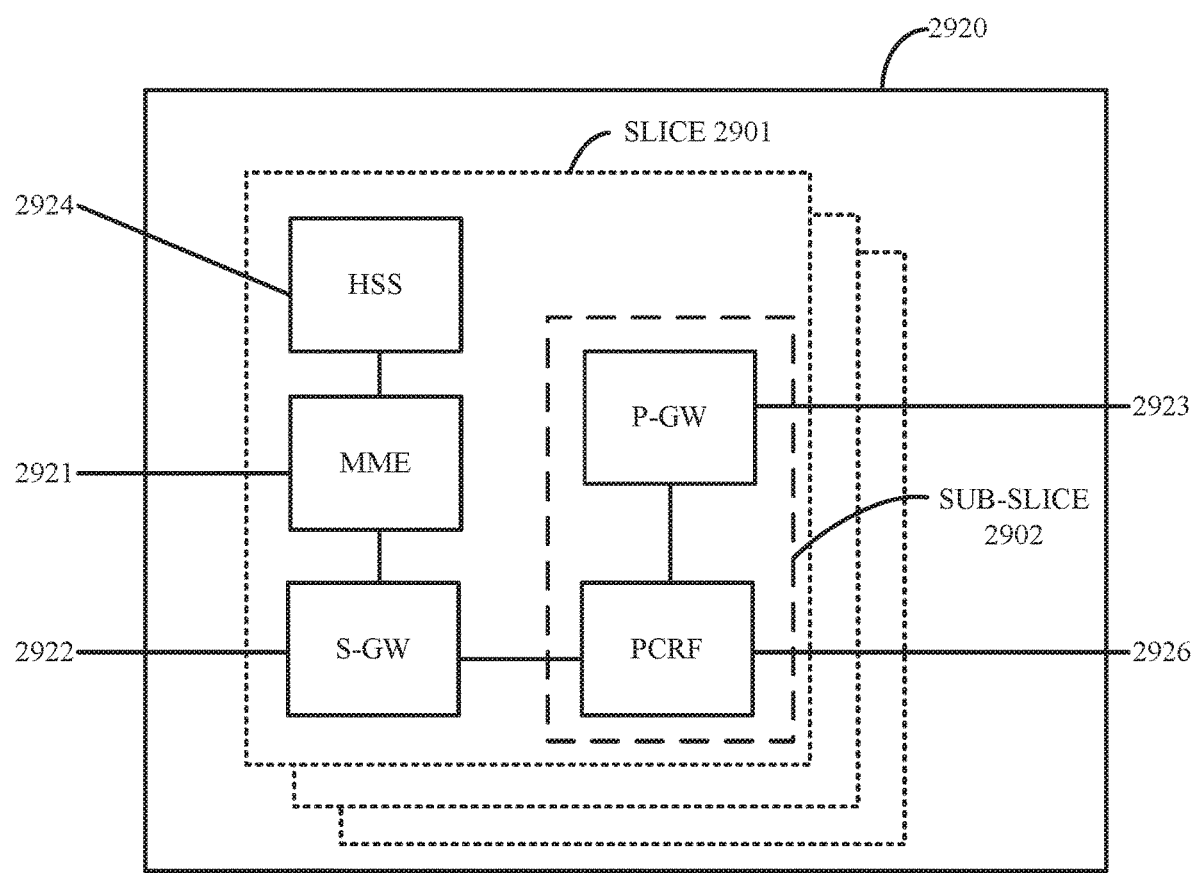
FIG. 29 illustrates components of a core network.

FIG. 29 illustrates components of a core network in accordance with various implementations. The components of the CN 2320 may be implemented in one physical node or separate physical nodes including components to read and execute instructions from a machine-readable or computer-readable medium (e.g., a non-transitory machine-readable storage medium). In implementations, the components of CN 2420 may be implemented in a same or similar manner as discussed herein with regard to the components of CN 2320. In some implementations, NFV is utilized to virtualize any or all of the above-described network node functions via executable instructions stored in one or more computer-readable storage mediums (described in further detail below). A logical instantiation of the CN 2320 may be referred to as a network slice 2901, and individual logical instantiations of the CN 2320 may provide specific network capabilities and network characteristics. A logical instantiation of a portion of the CN 2320 may be referred to as a network sub-slice 2902 (e.g., the network sub-slice 2902 is shown to include the P-GW 2323 and the PCRF 2326).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 24), a network slice always comprises a RAN part and a CN part. The support of network slicing relies on the principle that traffic for different slices is handled by different PDU sessions. The network can realize the different network slices by scheduling and also by providing different L1/L2 configurations. The UE 2401 provides assistance information for network slice selection in an appropriate RRC message, if it has been provided by NAS. While the network can support large number of slices, the UE need not support more than 8 slices simultaneously.

A network slice may include the CN 2420 control plane and user plane NFs, NG-RANs 2410 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 2401 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 2421 instance serving an individual UE 2401 may belong to each of the network slice instances serving that UE.

Network Slicing in the NG-RAN 2410 involves RAN slice awareness. RAN slice awareness includes differentiated handling of traffic for different network slices, which have been pre-configured. Slice awareness in the NG-RAN 2410 is introduced at the PDU session level by indicating the S-NSSAI corresponding to a PDU session in all signaling that includes PDU session resource information. How the NG-RAN 2410 supports the slice enabling in terms of NG-RAN functions (e.g., the set of network functions that comprise each slice) is implementation dependent. The NG-RAN 2410 selects the RAN part of the network slice using assistance information provided by the UE 2401 or the 5GC 2420, which unambiguously identifies one or more of the pre-configured network slices in the PLMN. The NG-RAN 2410 also supports resource management and policy enforcement between slices as per SLAs. A single NG-RAN node may support multiple slices, and the NG-RAN 2410 may also apply an appropriate RRM policy for the SLA in place to each supported slice. The NG-RAN 2410 may also support QoS differentiation within a slice.

The NG-RAN 2410 may also use the UE assistance information for the selection of an AMF 2421 during an initial attach, if available. The NG-RAN 2410 uses the assistance information for routing the initial NAS to an AMF 2421. If the NG-RAN 2410 is unable to select an AMF 2421 using the assistance information, or the UE 2401 does not provide any such information, the NG-RAN 2410 sends the NAS signaling to a default AMF 2421, which may be among a pool of AMFs 2421. For subsequent accesses, the UE 2401 provides a temp ID, which is assigned to the UE 2401 by the 5GC 2420, to enable the NG-RAN 2410 to route the NAS message to the appropriate AMF 2421 as long as the temp ID is valid. The NG-RAN 2410 is aware of, and can reach, the AMF 2421 that is associated with the temp ID. Otherwise, the method for initial attach applies.

The NG-RAN 2410 supports resource isolation between slices. NG-RAN 2410 resource isolation may be achieved by means of RRM policies and protection mechanisms that should avoid that shortage of shared resources if one slice breaks the service level agreement for another slice. In some implementations, it is possible to fully dedicate NG-RAN 2410 resources to a certain slice. How NG-RAN 2410 supports resource isolation is implementation dependent.

Some slices may be available only in part of the network. Awareness in the NG-RAN 2410 of the slices supported in the cells of its neighbors may be beneficial for inter-frequency mobility in connected mode. The slice availability may not change within the UE's registration area. The NG-RAN 2410 and the 5GC 2420 are responsible to handle a service request for a slice that may or may not be available in a given area. Admission or rejection of access to a slice may depend on factors such as support for the slice, availability of resources, support of the requested service by NG-RAN 2410.

The UE 2401 may be associated with multiple network slices simultaneously. In case the UE 2401 is associated with multiple slices simultaneously, only one signaling connection is maintained, and for intra-frequency cell reselection, the UE 2401 tries to camp on the best cell. For inter-frequency cell reselection, dedicated priorities can be used to control the frequency on which the UE 2401 camps. The 5GC 2420 is to validate that the UE 2401 has the rights to access a network slice. Prior to receiving an Initial Context Setup Request message, the NG-RAN 2410 may be allowed to apply some provisional/local policies, based on awareness of a particular slice that the UE 2401 is requesting to access. During the initial context setup, the NG-RAN 2410 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 30:
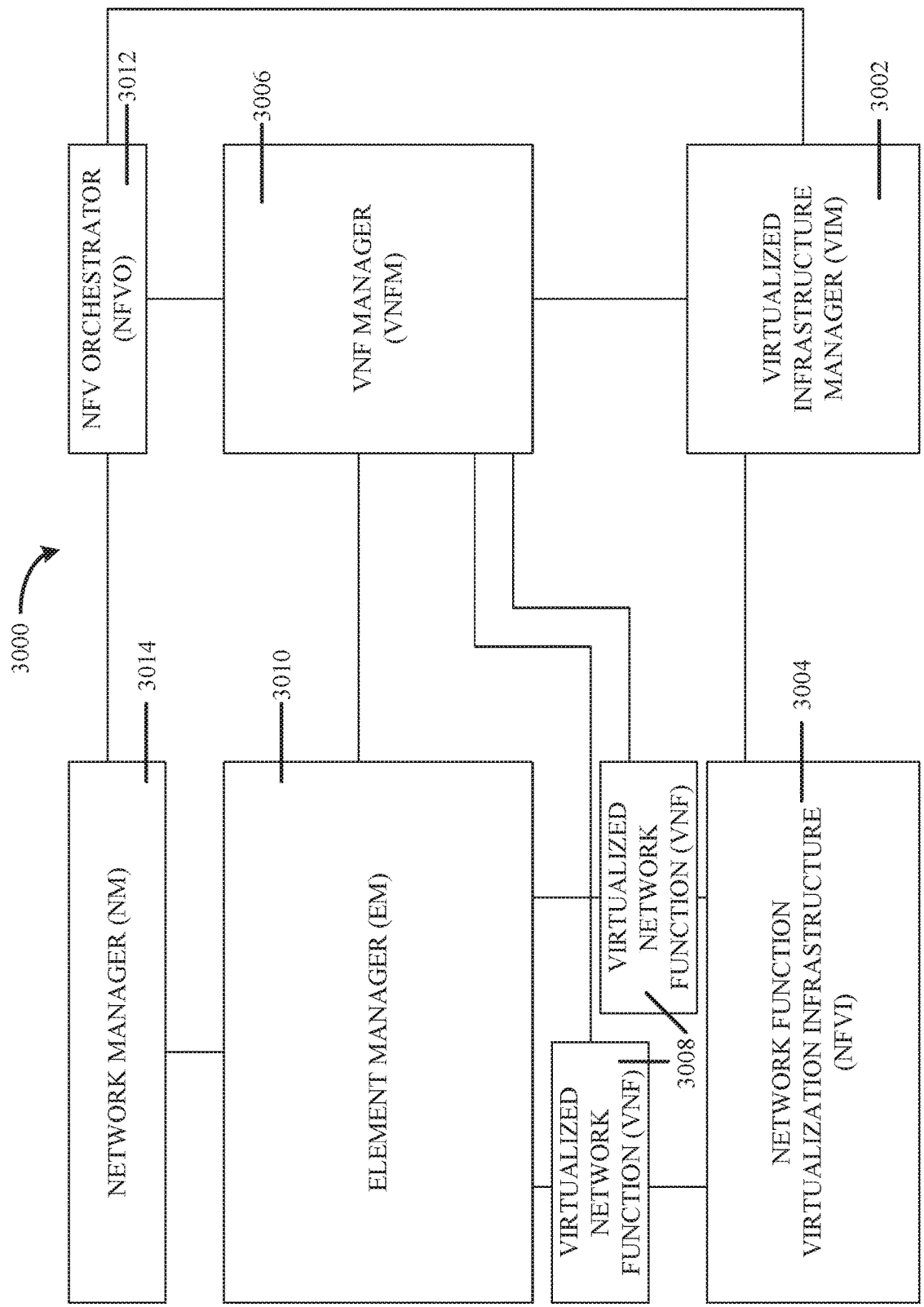
FIG. 30 illustrates components of a system to support NFV.

FIG. 30 is a block diagram illustrating components, according to some example implementations, of a system 3000 to support NFV. The system 3000 is illustrated as including a VIM 3002, an NFVI 3004, an VNFM 3006, VNFs 3008, an EM 3010, an NFVO 3012, and a NM 3014.

The VIM 3002 manages the resources of the NFVI 3004. The NFVI 3004 can include physical or virtual resources and applications (including hypervisors) used to execute the system 3000. The VIM 3002 may manage the life cycle of virtual resources with the NFVI 3004 (e.g., creation, maintenance, and tear down of VMs associated with one or more physical resources), track VM instances, track performance, fault and security of VM instances and associated physical resources, and expose VM instances and associated physical resources to other management systems.

The VNFM 3006 may manage the VNFs 3008. The VNFs 3008 may be used to execute EPC components/functions. The VNFM 3006 may manage the life cycle of the VNFs 3008 and track performance, fault and security of the virtual aspects of VNFs 3008. The EM 3010 may track the performance, fault and security of the functional aspects of VNFs 3008. The tracking data from the VNFM 3006 and the EM 3010 may comprise, for example, PM data used by the VIM 3002 or the NFVI 3004. Both the VNFM 3006 and the EM 3010 can scale up/down the quantity of VNFs of the system 3000.

The NFVO 3012 may coordinate, authorize, release and engage resources of the NFVI 3004 in order to provide the requested service (e.g., to execute an EPC function, component, or slice). The NM 3014 may provide a package of end-user functions with the responsibility for the management of a network, which may include network elements with VNFs, non-virtualized network functions, or both (management of the VNFs may occur via the EM 3010).

Figure 31:
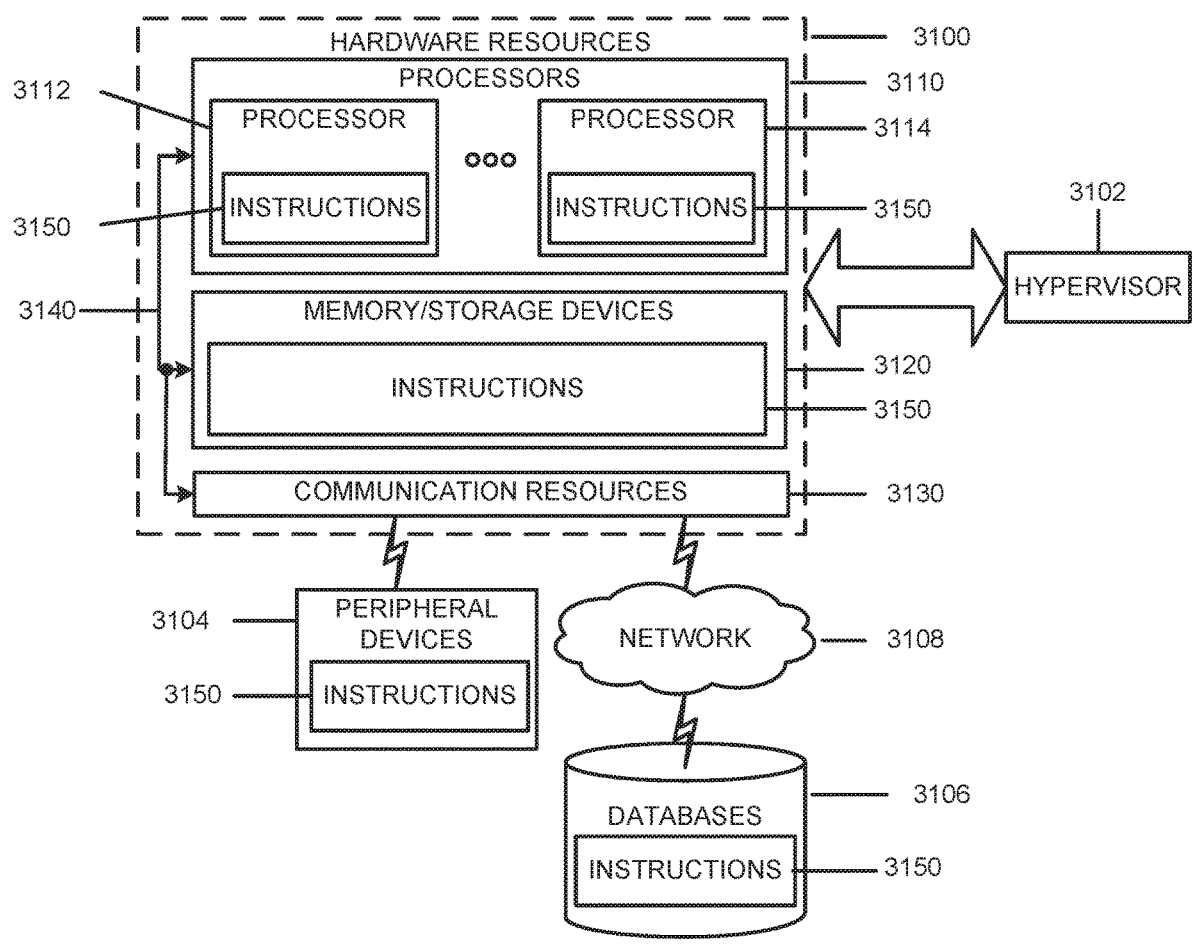
FIG. 31 illustrates components able to read instructions from a machine-readable or computer-readable medium (e.g., a non-transitory machine-readable storage medium) and perform any one or more of the methodologies discussed herein.

FIG. 31 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 31 shows a diagrammatic representation of hardware resources 3100 including one or more processors (or processor cores) 3110, one or more memory/storage devices 3120, and one or more communication resources 3130, each of which may be communicatively coupled via a bus 3140. For implementations where node virtualization (e.g., NFV) is utilized, a hypervisor 3102 may be executed to provide an execution environment for one or more network slices/sub-slices to utilize the hardware resources 3100.

The processors 3110 may include, for example, a processor 3112 and a processor 3114. The processor(s) 3110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 3120 may include main memory, disk storage, or any suitable combination thereof. The memory/storage devices 3120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 3130 may include interconnection or network interface components or other suitable devices to communicate with one or more peripheral devices 3104 or one or more databases 3106 via a network 3108. For example, the communication resources 3130 may include wired communication components (e.g., for coupling via USB), cellular communication components, NFC components, Bluetooth® (or Bluetooth® Low Energy) components, Wi-Fi® components, and other communication components.

Instructions 3150 may comprise software, a program, an application, an applet, an app, or other executable code for causing at least any of the processors 3110 to perform any one or more of the methodologies discussed herein. The instructions 3150 may reside, completely or partially, within at least one of the processors 3110 (e.g., within the processor's cache memory), the memory/storage devices 3120, or any suitable combination thereof. Furthermore, any portion of the instructions 3150 may be transferred to the hardware resources 3100 from any combination of the peripheral devices 3104 or the databases 3106. Accordingly, the memory of processors 3110, the memory/storage devices 3120, the peripheral devices 3104, and the databases 3106 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Example Procedures

Figure 32:
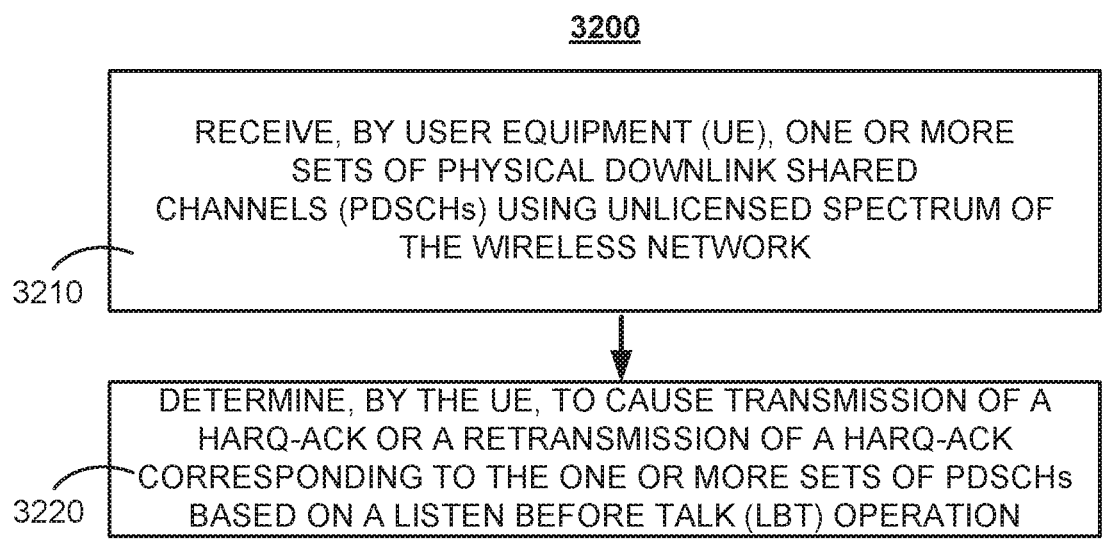
FIG. 32 illustrates a flowchart of an example of a process for enhancing a HARQ-ACK timing procedure executed by UE.

FIG. 32 illustrates a flowchart of an example of a process 3200 for enhancing a HARQ-ACK timing procedure executed by UE. The process 3200 can include receiving, by user equipment (UE), one or more sets of physical downlink shared channels (PDSCHs) using unlicensed spectrum of the wireless network (3210) and determining, by the UE, to cause transmission of a HARQ-ACK or a retransmission of a HARQ-ACK corresponding to the one or more sets of PDSCHs based on a listen before talke (LBT) operation (3220).

Figure 33:
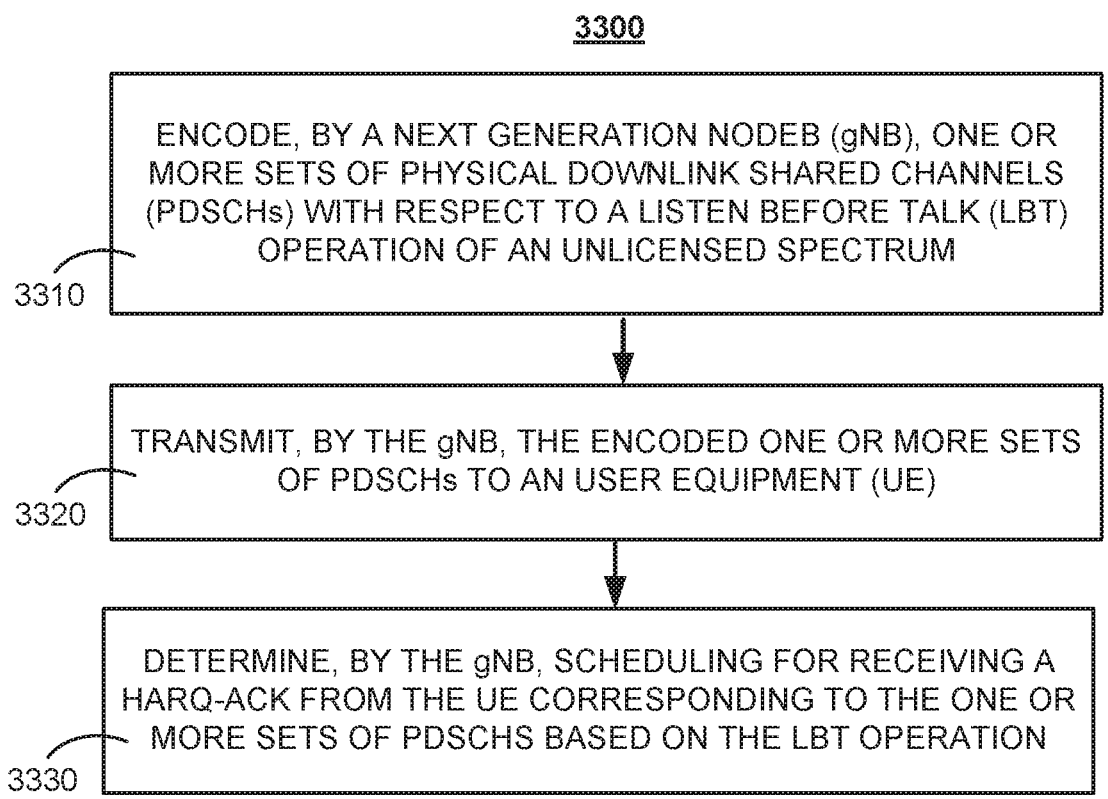
FIG. 33 illustrates a flowchart of an example of a process for enhancing a HARQ-ACK timing procedure executed by a gNB.

FIG. 33 illustrates a flowchart of an example of a process 3300 for enhancing a HARQ-ACK timing procedure executed by a gNB. The process 3300 can include encoding, by a gNB, one or more sets of physical downlink shared channels (PDSCHs) with respect to a listen before talk (LBT) operation of an unlicensed spectrum (3310), transmitting, by the gNB, the encoded one or more sets of PDSCHs to user equipment (UE) (3320), and determining, by the gNB, scheduling for receiving a HARQ-ACK from the UE corresponding to the one or more sets of PDSCHs based on the LBT operation (3330).

Figure 34:
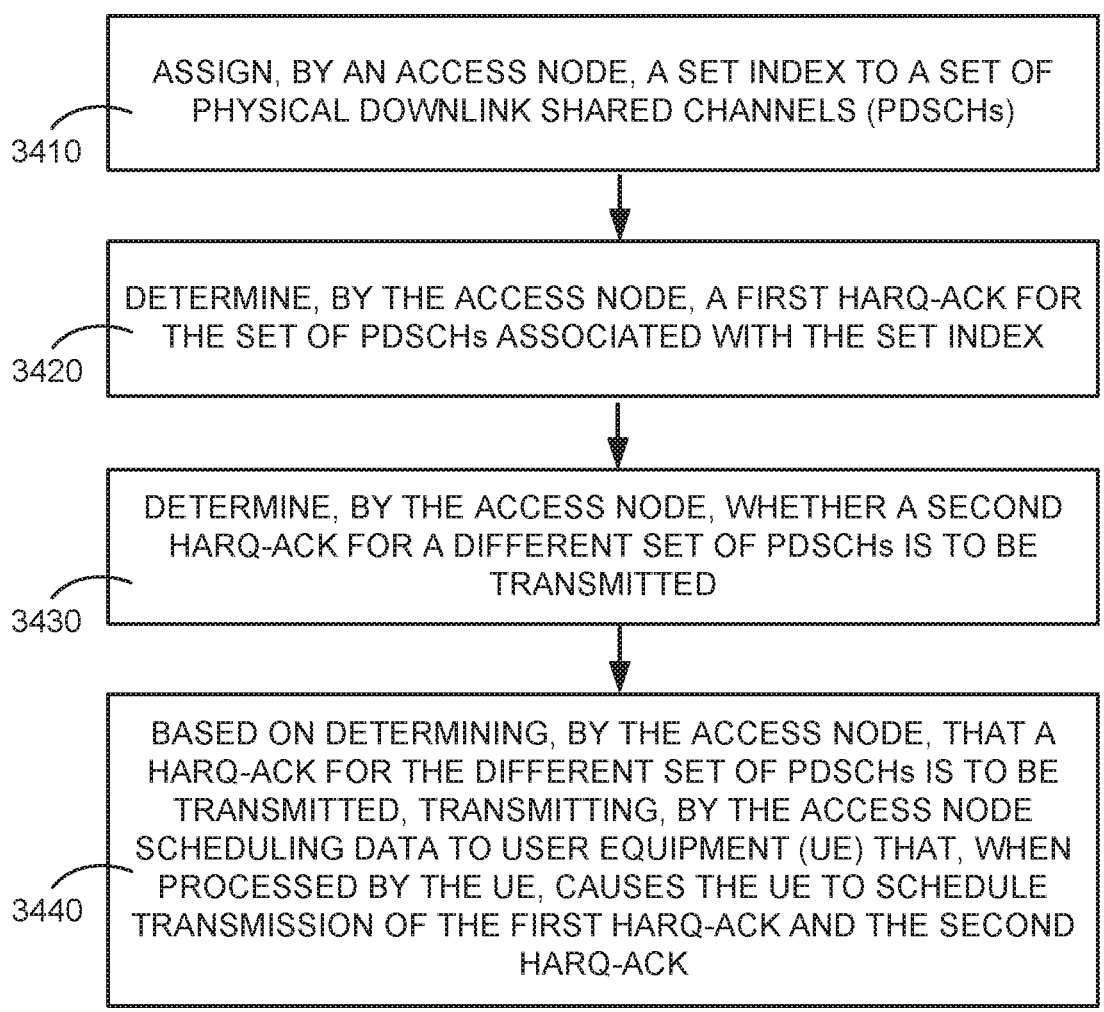
FIG. 34 illustrates a flowchart of another example of a process for enhancing a HARQ-ACK timing procedure executed by a gNB.

FIG. 34 illustrates a flowchart of another example of a process 3400 for enhancing a HARQ-ACK timing procedure executed by a gNB. The process 3400 can include assigning, by an access node, a set index to a set of physical downlink shared channels (PDSCHs) (3410), determining, by the access node, a first HARQ-ACK for the set of PDSCHs associated with the set index (3420), determining, by the acces node, whether a second HARQ-ACK for a different set of PDSCHs is to be transmitted (3430), and based on determining, by the access node, that a HARQ-ACK for the different set of PDSCHs is to be transmitted transmitting, by the access node, scheduling data to user equipment (UE) that, when processed by the UE, causes the UE to schedule transmission of the first HARQ-ACK and the second HARQ-ACK. In some implementations, the access node can be a gNB.

Additional Example Procedures

Example 1 may include this disclosure provides details on transmission and retransmission of HARQ-ACK.

Example 2 may include the method of example 1 or some other example herein, wherein gNB triggers HARQ-ACK transmission for a current set of PDSCH and, if needed, a previous set of PDSCH.

Example 3 may include the method of example 2 or some other example herein, wherein a DCI indicates a current set index and a previous set index, C-DAI is incremented based on the last DCI of the previous set, T-DAI indicates the total number of DCIs until now in the previous set and the current set.

Example 4 may include the method of example 1 or some other example herein, wherein a set index is assigned to a set of PDSCHs, and HARQ-ACK is determined for the set of PDSCHs with same set index.

Example 5 may include the method of example 4 or some other example herein, wherein the set of PDSCHs includes PDSCHs with allocated PUCCH resource for the first time, PDSCHs never assigned a PUCCH resource and/or PDSCHs already assigned a PUCCH resource at an earlier time but failed in HARQ-ACK transmission.

Example 6 may include the method of example 4 or some other example herein, wherein a DCI indicates a set index and a reset indicator; C-DAI is incremented across all DCIs with the same set index with reset indicator not toggled, the first DCI with reset indicator toggled has C-DAI equal to 1; T-DAI indicates the total number of DCIs till now across all DCIs with the same set index with reset indicator not toggled.

Example 7 may include the method of example 4 or some other example herein, wherein a normal DCI triggers HARQ-ACK transmission for one or multiple sets of PDSCHs, while a fallback DCI triggers HARQ-ACK transmission for one set of PDSCHs, or a fallback DCI triggers HARQ-ACK transmission for all sets of PDSCHs.

Example 8 may include the method of example 4 or some other example herein, when a PUSCH is scheduled to a UE by a DCI, HARQ-ACK transmission on PUSCH is done by one of the following schemes, if one-shot HARQ-ACK feedback is indicated by the DCI, HARQ-ACKs for all the HARQ processes is reported by the UE, otherwise, the UE transmits HARQ-ACKs on PUSCH only if the PUSCH is overlapped with a PUCCH for HARQ-ACK; or HARQ-ACK transmission on PUSCH is triggered by the DCI; or HARQ-ACK transmission on PUSCH is triggered if the PUSCH is overlapped with a PUCCH for HARQ-ACK transmission.

Example 9 may include the method of example 4 or some other example herein, wherein one bit is added in DCI to indicate reporting the HARQ-ACK for earlier PDSCHs only, T-DAI is reinterpreted to indicate the set index of the set of PDSCHs.

Example 10 may include the method of example 4 or some other example herein, wherein if there is not enough gNB processing time between a previous PUCCH and the current DCIs scheduling PDSCHs who's HARQ-ACK is on a current PUCCH, two indication of C-DAI/T-DAI are indicated in the DCI, one C-DAI/T-DAI counts number of all PDSCHs, while the other C-DAI/T-DAI only counts the number of PDSCHs scheduled by current DCIs.

Example 11 may include the method of example 4 or some other example herein, wherein if there is not enough gNB processing time between a previous PUCCH and the current DCIs scheduling PDSCHs who's HARQ-ACK is on a current PUCCH, C-DAI/T-DAI in the current DCIs counts number of all PDSCHs.

Example 12 may include the method of examples 10-11 or some other example herein, wherein reset indicator in a later DCI scheduling the set of PDSCHs is used to determine HARQ-ACK transmission of the set of PDSCHs.

Example 13 may include the method of example 1 or some other example herein, wherein for semi-static HARQ-ACK transmission based on HARQ processes, UE reports ACK for a HARQ process only one time.

Example 14 may include the method of example 1 or some other example herein, wherein for semi-static HARQ-ACK transmission based on HARQ processes, a triggering DCI includes the latest value of NDI for a HARQ process if HARQ-ACK for the HARQ process is not correctly received; otherwise includes a toggled NDI for the HARQ process.

Example 15 may include the method of example 1 or some other example herein, wherein for semi-static HARQ-ACK transmission based on HARQ processes, when UE reports its HARQ-ACK, UE includes the latest NDI at UE side for each HARQ process.

Example 16 may include the method of example 1 or some other example herein, wherein for semi-static HARQ-ACK transmission based on HARQ processes, the DCI includes one bit information indicating one of the following, whether to report HARQ-ACK for a latest PDSCH of a HARQ process whose HARQ-ACK is expected to transmit in a previous PUCCH for the first time HARQ-ACK feedback; or, If a previous PUCCH carrying HARQ-ACK is correctly received by gNB.

Example 17 may include the method of example 1 or some other example herein, wherein if there is not enough gNB processing time between a previous PUCCH and the current DCIs scheduling PDSCHs who's HARQ-ACK is on a current PUCCH, PUCCH_NDI in a later DCI scheduling the set of HARQ processes is used to determine HARQ-ACK transmission of the set of HARQ processes.

Example 18 may include the method of examples 13-17 or some other example herein, wherein the schemes operate on all HARQ process as a whole, or operate on a subset of HARQ processes separately.

Example 19 may include the method of example 18 or some other example herein, wherein a subset of HARQ processes is explicitly indicated in the triggering DCI; or, HARQ process indicated in the triggering DCI implicitly indicate a subset of HARQ processes.

Example 20 may include the method of example 18 or some other example herein, wherein in a DCI, a second HARQ process number is included and is used in forming a HARQ-ACK codebook.

Example 21 may include the method of example 1 or some other example herein, wherein for semi-static HARQ-ACK transmission based on configured PDSCH-to-HARQ-ACK timing, HARQ-ACK bits for X slots are additionally added to the HARQ-ACK codebook to account for DCI without valid PDSCH-to-HARQ-ACK timing.

Example 21a may include the method of example 21 or some other example herein, wherein SFI is used to reduce the codebook size; if DL or UL BWP switching happens, impacted HARQ-ACK is removed; for a slot outside gNB-initiated COT, no HARQ-ACK is allocated.

Example 22 may include the method of example 1 or some other example herein, wherein a DCI indicate 1-bit information on LBT type for PUCCH.

Example 22a may include the method of example 1 or some other example herein, wherein for a group of UEs fail in PUCCH transmission with CAT-4 LBT derived by a previous indicated PDSCH-to-HARQ-ACK-timing K1, timing of a new PUCCH is derived by K1 and the time offset Δ, K1+Δ, Δ is signaled in a group-triggering DCI.

Example 23 may include a method for a user equipment (UE) in a wireless network including a next generation NodeB (gNB) and the UE, the method comprising: receiving or causing to receive one or more sets of Physical Downlink Shared Channels (PDSCHs) with respect to a listen before talk (LBT) operation on an unlicensed spectrum; and determining a transmission or a retransmission of a Hybrid Automatic Repeat Request (HARQ) acknowledge (ACK) from the UE corresponding to the one or more sets of PDSCHs based on the LBT operation.

Example 24 may include the method of example 23 and/or some other example herein, wherein the unlicensed spectrum is a part of an unlicensed spectrum via Licensed-Assisted Access (LAA), or an unlicensed spectrum via carrier aggregation (CA).

Example 25 may include the method of example 23 and/or some other example herein, wherein the transmission or the retransmission of the HARQ-ACK is based on a dynamic HARQ-ACK codebook or a semi-static HARQ-ACK codebook.

Example 26 may include the method of example 23 and/or some other example herein, wherein a set index is assigned to the one or more sets of PDSCHs, and the HARQ-ACK is determined based on the set of PDSCHs with a corresponding set index.

Example 27 may include the method of example 23 and/or some other example herein, wherein the one or more sets of PDSCHs include a current set of PDSCH and a previous set of PDSCH.

Example 28 may include the method of example 27 and/or some other example herein, wherein a Downlink Control Information (DCI) indicates a current set index and a previous set index, C-DAI is incremented based on a last DCI of the previous set, T-DAI indicates a total number of DCIs until now in the previous set and the current set.

Example 29 may include the method of example 27 and/or some other example herein, wherein a DCI indicates a set index and a reset indicator; C-DAI is incremented across all DCIs with the same set index with reset indicator not toggled, the first DCI with reset indicator toggled has C-DAI equal to 1; T-DAI indicates the total number of DCIs till now across all DCIs with the same set index with reset indicator not toggled.

Example 30 may include the method of example 27 or some other example herein, wherein one bit is included in DCI to indicate reporting the HARQ-ACK for earlier PDSCHs only, T-DAI is reinterpreted to indicate the set index of the set of PDSCHs.

Example 30a may include the method of example 27 or some other example herein, wherein if there is not enough gNB processing time between a previous PUCCH and the current DCIs scheduling PDSCHs who's HARQ-ACK is on a current PUCCH, two indicatioin of C-DAI/T-DAI are indicated in the DCI, one C-DAI/T-DAI counts number of all PDSCHs, while the other C-DAI/T-DAI only counts the number of PDSCHs scheduled by current DCIs.

Example 31 may include the method of example 27 or some other example herein, wherein if there is not enough gNB processing time between a previous PUCCH and the current DCIs scheduling PDSCHs who's HARQ-ACK is on a current PUCCH, C-DAI/T-DAI in the current DCIs counts number of all PDSCHs.

Example 32a may include the method of any one of examples 23-31 or some other example herein, wherein the determining the transmission or retransmission of the HARQ ACK includes receiving a normal DCI to trigger HARQ-ACK transmission for one or more of the sets of PDSCHs, and receiving a fallback DCI to trigger HARQ-ACK transmission for one of the sets of PDSCHs.

Example 32b may include the method of any one of examples 23-31 or some other example herein, wherein the determining the transmission or retransmission of the HARQ ACK includes receiving a fallback DCI to trigger HARQ-ACK transmission for one or more of the sets of PDSCHs.

Example 32c may include the method of any one of examples 23-32b or some other example herein, further comprising: receiving a DCI to schedule a PUSCH, HARQ-ACK transmission on the PUSCH is determined according to one of the following: if one-shot HARQ-ACK feedback is indicated by the DCI, HARQ-ACKs for all associated HARQ processes are reported by the UE, otherwise, the UE transmits HARQ-ACKs on PUSCH only if the PUSCH is overlapped with a PUCCH for HARQ-ACK; or HARQ-ACK transmission on PUSCH is triggered by the DCI; or HARQ-ACK transmission on PUSCH is triggered if the PUSCH is overlapped with a PUCCH for HARQ-ACK transmission.

Example 33 may include the method of any of the examples 23-32c and/or some other example herein, wherein the method is performed by an apparatus that is implemented in or employed by the UE.

Example 34 may include a method for a next generation NodeB (gNB) in a wireless network including the gNB and a user equipment (UE), the method comprising: encoding, for transmission to the UE, one or more sets of Physical Downlink Shared Channels (PDSCHs) with respect to a listen before talk (LBT) operation on an unlicensed spectrum; and determining scheduling for receiving a Hybrid Automatic Repeat Request (HARQ) acknowledge (ACK) from the UE corresponding to the one or more sets of PDSCHs based on the LBT operation.

Example 35 may include the method of example 34 and/or some other example herein, wherein the unlicensed spectrum is a part of an unlicensed spectrum via Licensed-Assisted Access (LAA), or an unlicensed spectrum via carrier aggregation (CA).

Example 36 may include the method of example 34 and/or some other example herein, wherein the transmission or the retransmission of the HARQ-ACK is based on a dynamic HARQ-ACK codebook or a semi-static HARQ-ACK codebook.

Example 37 may include the method of example 34 and/or some other example herein, further comprising: initiating the LBT operation; and determining a shared channel occupancy time (COT) for the LBT operation.

Example 38 may include the method of example 34 and/or some other example herein, further comprising: receiving or causing to receive a transmission or a retransmission of the HARQ-ACK from the UE in response to the one or more sets of PDSCHs.

Example 39 may include the method of example 34 and/or some other example herein, further comprising: assigning a set index to the one or more sets of PDSCHs, and the HARQ-ACK is determined based on the set of PDSCHs with a corresponding set index.

Example 40 may include the method of example 34 and/or some other example herein, wherein the HARQ-ACK is transmitted based on a dynamic HARQ-ACK codebook or a semi-static HARQ-ACK codebook.

Example 41 may include the method of example 34 and/or some other example herein, wherein the one or more sets of PDSCHs include a current set of PDSCH and a previous set of PDSCH.

Example 41a may include the method of example 41 and/or some other example herein, wherein a Downlink Control Information (DCI) indicates a current set index and a previous set index, C-DAI is incremented based on a last DCI of the previous set, T-DAI indicates a total number of DCIs until now in the previous set and the current set.

Example 42a may include the method of any one of examples 34-41a or some other example herein, further comprising encoding for transmission to the UE a normal DCI to trigger HARQ-ACK transmission for one or more of the sets of PDSCHs, and a fallback DCI to trigger HARQ-ACK transmission for one of the sets of PDSCHs.

Example 42b may include the method of any one of examples 34-41a or some other example herein, further comprising encoding, for transmission to the UE, a fallback DCI to trigger HARQ-ACK transmission for one or more of the sets of PDSCHs.

Example 42c may include the method of any one of examples 23-32b or some other example herein, further comprising: encoding, for transmission to the UE, a DCI to schedule a PUSCH, wherein the scheduling for the HARQ-ACK on the PUSCH is determined according to one of the following: if one-shot HARQ-ACK feedback is indicated by the DCI, HARQ-ACKs for all associated HARQ processes are reported by the UE, otherwise, the UE transmits HARQ-ACKs on PUSCH only if the PUSCH is overlapped with a PUCCH for HARQ-ACK; or HARQ-ACK transmission on PUSCH is triggered by the DCI; or HARQ-ACK transmission on PUSCH is triggered if the PUSCH is overlapped with a PUCCH for HARQ-ACK transmission.

Example 43 may include the method of example 34-42c and/or some other example herein, wherein the method is performed by an apparatus that is implemented in or employed by the gNB.

Example Z01 may include an apparatus comprising means to perform one or more elements of a method described in or related to any of examples 1-43, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-43, or any other method or process described herein.

Example Z03 may include an apparatus comprising logic, modules, or circuitry to perform one or more elements of a method described in or related to any of examples 1-43, or any other method or process described herein.

Example Z04 may include a method, technique, or process as described in or related to any of examples 1-43, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-43, or portions thereof.

Example Z06 may include a signal as described in or related to any of examples 1-43, or portions or parts thereof.

Example Z07 may include a datagram, packet, frame, segment, protocol data unit (PDU), or message as described in or related to any of examples 1-43, or portions or parts thereof, or otherwise described in the present disclosure.

Example Z08 may include a signal encoded with data as described in or related to any of examples 1-43, or portions or parts thereof, or otherwise described in the present disclosure.

Example Z09 may include a signal encoded with a datagram, packet, frame, segment, protocol data unit (PDU), or message as described in or related to any of examples 1-43, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-43, or portions thereof.

Example Z11 may include a computer program comprising instructions, wherein execution of the program by a processing element is to cause the processing element to carry out the method, techniques, or process as described in or related to any of examples 1-43, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of implementations to the precise form disclosed. Modifications and variations are possible in light of the above teachings or may be acquired from practice of various implementations.

The invention claimed is:

1. A method for enhancing hybrid automatic repeat request (HARQ) acknowledgment (ACK) timing procedures, the method comprising:
   assigning a set index to a set of physical downlink shared channels (PDSCHs);
   determining a first HARQ-ACK for the set of PDSCHs associated with the set index;
   determining whether a second HARQ-ACK for a different set of PDSCHs is to be transmitted; and
   based on determining that a HARQ-ACK for the different set of PDSCHs is to be transmitted, transmitting scheduling data to a user equipment (UE) that, when processed by the UE, causes the UE to schedule transmission of the first HARQ-ACK and the second HARQ-ACK,
   wherein a number of PDSCHs counted by one or more counter downlink assignment index (C-DAI)/total DAI (T-DAI) is based on whether access node processing time between a previous physical uplink control channel (PUCCH) and current downlink control information (DCI) scheduling PDSCHs having a HARQ-ACK on a current PUCCH falls below a predetermined threshold level of processing time.

2. The method of claim 1,
   wherein the scheduling data is downlink control information (DCI), and
   wherein the DCI includes data representing the set index and a previous set index, a C-DAI that is incremented based on a last DCI of the previous set index, and a T-DAI that indicates a total number of DCIs in the set index and the previous set.

3. The method of claim 1,
   wherein the set of PDSCHs includes PDSCHs with allocated PUCCH resource for a first time, PDSCHs that were never assigned a PUCCH resource, or PDSCHs already assigned a PUCCH resource at an earlier time but failed in trigger successful HARQ-ACK transmission.

4. The method of claim 1,
   wherein the scheduling data is one or more DCIs, and
   wherein a first DCI of the DCIs triggers HARQ-ACK transmission for one or multiple sets of PDSCHs and a different DCI of the DCIs (i) triggers HARQ-ACK transmission for one set of PDSCHs or (ii) triggers HARQ-ACK transmission for all sets of PDSCHs.

5. The method of claim 1,
   wherein the scheduling data is one or more DCIs, and
   wherein one particular DCI of the DCIs includes data representing the set index and a reset indicator, a C-DAI that is incremented across each DCI with the set index with the reset indicator not toggled,
   wherein the reset indicator of the particular DCI is toggled and the particular DCI has C-DAI equal to 1 and a T-DAI indicating a total number of DCIs associated with the same set index and having a reset indicator not toggled.

6. The method of claim 1,
   wherein the scheduling data is a DCI,
   wherein a physical uplink shared channel (PUSCH) is scheduled to a UE by a DCI, and
   wherein HARQ-ACK transmission by the UE on PUSCH (i) is triggered by the DCI or (ii) HARQ-ACK transmission by the UE on PUSCH is triggered if the PUSCH is overlapped with a PUCCH for HARQ-ACK transmission.

7. The method of claim 1,
   wherein one bit is added in a DCI to indicate reporting the HARQ-ACK for earlier PDSCHs and T-DAI is reinterpreted to indicate the set index of the set of PDSCHs.

8. The method of claim 1,
   wherein one bit is added in a DCI to indicate whether to report HARQ-ACK for a latest PDSCH of a HARQ process whose HARQ-ACK is expected to transmit in a previous PUCCH for a first time HARQ-ACK feedback.

9. The method of claim 1,
   wherein one bit is added in a DCI to indicate whether a previous PUCCH carrying HARQ-ACK was correctly received by an access node.

10. The method of claim 1, wherein a reset indicator, in a DCI scheduling the set of PDSCHs, is used to determine HARQ-ACK transmission of the set of PDSCHs.

11. The method of claim 1, wherein for a semi-static HARQ-ACK transmission, receiving an ACK transmitted by the UE for a HARQ process only one time.

12. The method of claim 1, wherein for semi-static HARQ-ACK transmission:
    determining whether HARQ-ACK was correctly received; and
    based on determining that the HARQ-ACK was not correctly received, updating a triggering DCI to include a most recently assigned value of new data indicator (NDI) for a HARQ process.

13. The method of claim 1, wherein for semi-static HARQ-ACK transmission:
    determining whether HARQ-ACK was correctly received; and
    based on determining that the HARQ-ACK was correctly received, updating a triggering DCI to include a toggled NDI for the HARQ process.

14. The method of claim 1, wherein assigning the set index to the set of PDSCHs comprises assigning, by an access node, the set index to the set of PDSCHs.

15. A system for enhancing hybrid automatic repeat request (HARQ) acknowledgment (ACK) timing procedures, the system comprising one or more processors configured to perform operations comprising:
    assigning a set index to a set of physical downlink shared channels (PDSCHs);
    determining a first HARQ-ACK for the set of PDSCHs associated with the set index;
    determining whether a second HARQ-ACK for a different set of PDSCHs is to be transmitted; and
    based on determining that a HARQ-ACK for the different set of PDSCHs is to be transmitted, transmitting scheduling data to a user equipment (UE) that, when processed by the UE, causes the UE to schedule transmission of the first HARQ-ACK and the second HARQ-ACK,
    wherein a number of PDSCHs counted by one or more counter downlink assignment index (C-DAI)/total DAI (T-DAI) is based on whether access node processing time between a previous physical uplink control channel (PUCCH) and current downlink control information (DCI) scheduling PDSCHs having a HARQ-ACK on a current PUCCH falls below a predetermined threshold level of processing time.

16. The system of claim 15,
wherein the scheduling data is downlink control information (DCI), and
wherein the DCI includes data representing the set index and a previous set index, a C-DAI that is incremented based on a last DCI of the previous set index, and a T-DAI that indicates a total number of DCIs in the set index and the previous set.

17. The system of claim 15,
wherein the set of PDSCHs includes PDSCHs with allocated PUCCH resource for a first time, PDSCHs that were never assigned a PUCCH resource, or PDSCHs already assigned a PUCCH resource at an earlier time but failed in trigger successful HARQ-ACK transmission.

18. The system of claim 15,
wherein the scheduling data is one or more DCIs, and
wherein a first DCI of the DCIs triggers HARQ-ACK transmission for one or multiple sets of PDSCHs and a different DCI of the DCIs (i) triggers HARQ-ACK transmission for one set of PDSCHs or (ii) triggers HARQ-ACK transmission for all sets of PDSCHs.

19. One or more non-transitory computer-readable media storing instructions that, when executed, cause one or more processors to perform operations for enhancing hybrid automatic repeat request (HARQ) acknowledgment (ACK) timing procedures, the operations comprising:
assigning a set index to a set of physical downlink shared channels (PDSCHs);
determining a first HARQ-ACK for the set of PDSCHs associated with the set index;
determining whether a second HARQ-ACK for a different set of PDSCHs is to be transmitted; and
based on determining that a HARQ-ACK for the different set of PDSCHs is to be transmitted, transmitting scheduling data to a user equipment (UE) that, when processed by the UE, causes the UE to schedule transmission of the first HARQ-ACK and the second HARQ-ACK,
wherein a number of PDSCHs counted by one or more counter downlink assignment index (C-DAI)/total DAI (T-DAI) is based on whether access node processing time between a previous physical uplink control channel (PUCCH) and current downlink control information (DCI) scheduling PDSCHs having a HARQ-ACK on a current PUCCH falls below a predetermined threshold level of processing time.

20. The one or more non-transitory computer-readable media of claim 19, wherein the scheduling data is downlink control information (DCI), and
wherein the DCI includes data representing the set index and a previous set index, a C-DAI that is incremented based on a last DCI of the previous set index, and a T-DAI that indicates a total number of DCIs in the set index and the previous set.

\* \* \* \* \*